United States Patent
Rhoads

(10) Patent No.: US 10,591,581 B2
(45) Date of Patent: *Mar. 17, 2020

(54) SPACE-TIME CALIBRATION SYSTEM AND METHOD

(71) Applicant: Digimarc Corporation, Beaverton, OR (US)

(72) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/785,336

(22) Filed: Oct. 16, 2017

(65) Prior Publication Data

US 2018/0210066 A1 Jul. 26, 2018

Related U.S. Application Data

(63) Continuation of application No. 12/373,944, filed as application No. PCT/US2007/025172 on Dec. 7, 2007, now Pat. No. 9,791,545.

(60) Provisional application No. 60/873,891, filed on Dec. 7, 2006.

(51) Int. Cl.
 *G01S 5/26* (2006.01)
 *G01S 5/18* (2006.01)

(52) U.S. Cl.
 CPC . *G01S 5/26* (2013.01); *G01S 5/18* (2013.01)

(58) Field of Classification Search
 CPC ..... G01S 5/18; G01S 5/26; G01S 5/02; G01S 19/04; G01S 19/32; G01S 19/35; G06F 13/122; G06F 12/0866

USPC .......................................................... 709/224
See application file for complete search history.

(56) References Cited

U.S. PATENT DOCUMENTS

| | | | |
|---|---|---|---|
| 4,193,073 A | 3/1980 | Kohnen | |
| 4,405,986 A | 9/1983 | Gray | |
| 5,045,861 A | 9/1991 | Duffett-Smith | |
| 5,173,710 A * | 12/1992 | Kelley | G01S 5/0009 342/463 |
| 5,838,279 A | 11/1998 | Duffett-Smith | |
| 6,084,547 A | 7/2000 | Sanderford | |
| 6,094,168 A | 7/2000 | Duffett-Smith | |
| 6,167,275 A | 12/2000 | Oros | |
| 6,275,705 B1 | 8/2001 | Drane | |
| 6,529,165 B1 | 3/2003 | Duffett-Smith | |

(Continued)

OTHER PUBLICATIONS

P. Enge et al., Special Issue on Global Positioning System, Proceedings of the IEEE, vol. 87(1), pp. 3-15, Jan. 1999.

(Continued)

*Primary Examiner* — Tu T Nguyen
(74) *Attorney, Agent, or Firm* — Digimarc Corporation

(57) ABSTRACT

A space-time calibration system and method implement space-time solutions, in which, in one preferred embodiment, a single node determines its own space-time solutions based on other network nodes with which the single node communicates. In other preferred embodiments, space-time solutions for the node can be generated using other resources in the network. The disclosed system and method enable reliable, precise object positioning particularly for environments where the Global Positioning System (GPS) is blocked or subject to interference such as within the urban core.

19 Claims, 72 Drawing Sheets

(56) References Cited

U.S. PATENT DOCUMENTS

| | | |
|---|---|---|
| 6,650,877 B1 | 11/2003 | Tarbouriech |
| 6,694,142 B1 | 2/2004 | Kuwahara |
| 6,784,827 B2 | 8/2004 | Hirt |
| 6,806,830 B2 | 10/2004 | Panasik |
| 6,894,644 B2 | 5/2005 | Duffett-Smith |
| 6,937,569 B1 | 8/2005 | Sarkar |
| 6,937,866 B2 | 8/2005 | Duffett-Smith |
| 7,224,984 B2 | 5/2007 | Agrawala |
| 7,260,407 B2 | 8/2007 | Duffett-Smith |
| 7,302,269 B1 | 11/2007 | Crawford |
| 7,315,745 B2 | 1/2008 | Duffett-Smith |
| 7,359,719 B1 | 4/2008 | Duffett-Smith |
| 7,382,804 B2 | 6/2008 | Alapuranen |
| 7,508,883 B2 | 3/2009 | Duffett-Smith |
| 7,593,736 B1 | 9/2009 | Duffett-Smith |
| 7,826,837 B1 | 11/2010 | Sylvester |
| 7,876,266 B2 | 1/2011 | Rhoads |
| 7,983,185 B2 | 7/2011 | Rhoads |
| 8,421,675 B2 | 4/2013 | Rhoads |
| 8,451,763 B2 | 5/2013 | Brundage |
| 8,463,290 B2 | 6/2013 | Rhoads |
| 9,014,162 B2 | 4/2015 | Brundage |
| 2001/0004601 A1 | 6/2001 | Drane |
| 2003/0001776 A1 | 1/2003 | Hannah |
| 2003/0046022 A1 | 3/2003 | Silverman |
| 2003/0054838 A1 | 3/2003 | Carrez |
| 2003/0080902 A1 | 5/2003 | Roberts |
| 2003/0119524 A1 | 6/2003 | Carlsson |
| 2003/0220117 A1 | 11/2003 | Duffett-Smith |
| 2004/0002344 A1 | 1/2004 | Moeglein |
| 2004/0046693 A1 | 3/2004 | Ogino |
| 2004/0137915 A1 | 7/2004 | Diener |
| 2004/0143672 A1 | 7/2004 | Padmanabham |
| 2004/0242234 A1 | 12/2004 | Klenner |
| 2005/0137786 A1 | 6/2005 | Breed |
| 2005/0281363 A1 | 12/2005 | Qi |
| 2007/0001903 A1 | 1/2007 | Smith |
| 2007/0040739 A1 | 2/2007 | Small |
| 2007/0066231 A1 | 3/2007 | Duffett-Smith |
| 2007/0099671 A1 | 5/2007 | Gruchala |
| 2007/0200759 A1 | 8/2007 | Heidari-Bateni |
| 2007/0247368 A1 | 10/2007 | Wu |
| 2009/0061899 A1 | 3/2009 | Hwang |
| 2009/0073030 A1 | 3/2009 | Hansen |
| 2009/0111482 A1 | 4/2009 | Rowe |
| 2009/0213828 A1 | 8/2009 | Brundage |
| 2009/0233621 A1 | 9/2009 | Rhoads |
| 2009/0273518 A1 | 11/2009 | Duffet-Smith |
| 2009/0281729 A1 | 11/2009 | Duffett-Smith |
| 2009/0313370 A1 | 12/2009 | Rhoads |
| 2010/0045531 A1 | 2/2010 | Rhoads |
| 2010/0135178 A1 | 6/2010 | Aggarwal |
| 2010/0202300 A1 | 8/2010 | Rhoads |
| 2013/0316728 A1 | 11/2013 | Bradley |

OTHER PUBLICATIONS

M.S. Braasch et al., GPS receiver architectures and measurements, Proceedings of the IEEE, vol. 87(1), pp. 48-64, Jan. 1999.

P. Misra et al., GPS performance in navigation, Proceedings of the IEEE, vol. 87(1), pp. 65-85, Jan. 1999.

Navstar GPS Space Segment/Navigation User Interfaces, Navstar Global Positioning System, Interface Specification, IS-GPS-200, Revision D. ARINC Engineering Services, LLC, Dec. 2004.

International Searching Authority, International Search Report and Written Opinion, International Patent Application No. PCT/US07/25172, dated Apr. 16, 2008, 9 pages.

Jun. 1, 2010 Office Action on U.S. Appl. No. 12/355,436.

Aug. 27, 2010 Amendment of U.S. Appl. No. 12/355,436.

H Feng et al., Positioning models and systems based on digital television broadcasting signals, Frontiers of Electrical and Electronic Engineering in China, vol. 2(4), p. 410-414, 2007.

US. Joint Planning and Development Office (JPDO), Air Navigation Services Working Group, FAA's 'Surveillance/Positioning Backup Strategy Alternatives Analysis.' Paper No. 08-003, Jul. 15, 2008.

US. Federal Aviation Administration, 'Fact Sheet—NextGen.' Feb. 14, 2007, available at http://www.faa.govinews/fact_sheets/news._story.cfm?newsID=814-5.

Appeal Brief dated May 3, 2012, and Examiner's Answer dated Jul. 24, 2012, in U.S. Appl. No. 12/373,944.

Notice of Allowance dated Jun. 13, 2012, in U.S. Appl. No. 12/429,030.

Notice of Allowance and Issue Fee Due dated Jul. 25, 2012 in U.S. Appl. No. 12/426,787.

Examiner's Answer dated Jul. 24, 2012, in U.S. Appl. No. 12/373,944.

Office Action dated Mar. 8, 2016, in U.S. Appl. No. 12/373,944.

Ciurana et al, "A Ranging Method With IEEE 802.11 Data Frames for Indoor Localization", WCNC 2007 proceedings.

Bahillo et al., "Indoor Location Based on IEEE 802.11 Round-Trip Time Measurements with Two-Step NLOS Mitigation", Progress in Electromagnetics Research B, vol. 15, 285-306, 2009.

U.S. Appl. No. 61/116,996, filed Nov. 21, 2008.

Office Action dated Nov. 28, 2014, in U.S. Appl. No. 13/833,679.

* cited by examiner

RESULTING H-MATRIX ORGANIZATION
(BASELINE EMBODIMENT EXAMPLE)

NOTE: THIS IS A CONSEQUENCE OF
    A) g-vector organization
    B) f-vector organization
    C) interpolation methods used for fractional counts
    D) "frayed edge" explicit treatments
    E) explicit "Kalman-esque" filtering within H
    F) "launched ping" vs. "received ping" binary choice Abstracted Space Time Calibration Unit ("SCU")

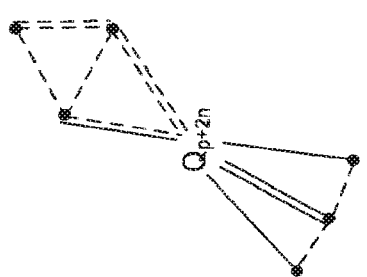
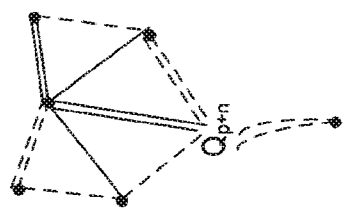
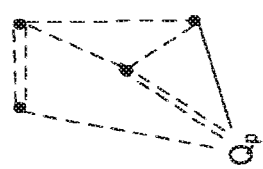
Figure 20

```
INFO_LOOP (ALL_STRUCTS){
    QUERY NODE CHANGE
        IF CHANGE
            UPDATE INFO_START
    QUERY CROSS CHANGE LOCAL GROUP
        IF CHANGE
            UPDATE ALL_STRUCTS
    LINQS_LOOP
            DATA_LOOP
            //
            SOLUTION_LOOP
            //
    //
    WAIT (TYPICAL 1 TO 10 SECOND GROSS
                  CHANGE INTERVALS)
} // END INFO_LOOP
```

Figure 22

```
LINQS_LOOP (ALL_STRUCTS){
    QUERY NODE AND LOCAL GROUP CHANGE → 0,1
        IF 1: UPDATE LINQS_STRUCT
    QUERY COARSE VECTOR BOUNDARIES → 0,1
        IF 1: RE-COMPUTE/RE-BUFFER COARSE VECTORS
            UPDATE H, H⁻¹, SOLUTIONS_STRUCT
    QUERY INTERMITTENT LINQS → 0,1
        IF 1: QUERY EXPECTED (0) / ANOMALOUS (0)
            IF 1: MINOR ANOMALOUS
                UPDATE H, H⁻¹, SOLUTIONS_STRUCT
            MAJOR ANOMALOUS
                BREAK LINQS_LOOP
//

DATA_LOOP
//
SOLUTION_LOOP
//
WAIT (TYPICALLY 10 ms – 100 ms LOOP TIME)
PACKAGE & SCHEDULE PUNG
}
```

Figure 23

```
SOLUTIONS_LOOP (ALL_STRUCTS){
    QUERY SOLUTIONS_FAMILY
        QUERY DATA SUFFICIENCY → 0,1
            IF 0:
                MINOR ANOMALY: TWEAK H, H⁻¹, ETC.
                MAJOR ANOMALY: BREAK SOLUTIONS_LOOP
                RETURN FLAG MAJOR_ANOMALY

STEP  SOLUTIONS_FAMILY
          FAMILY TYPE – CHOOSE H⁻¹
              CRUNCH VECTORS
          //
    //
    STEP  SOLUTIONS_FAMILY
          FILTER (POSSIBLY CROSS-FAMILY)
    //
    STEP  SOLUTIONS_FAMILY
          PLACE EXTERNAL REFERENCE FRAME
          SOLUTIONS_OUTPUT
    //
}
```

Figure 24

```
DATA_LOOP (ALL_STRUCTS){
    QUERY ALL_LINQS_STATUS → 0,2
        IF 0: MINOR ANOMALY – UPDATE ALL STRUCTS HERE
              MAJOR ANOMALY – BREAK DATA LOOP
                            – RETURN – LINQS_ANOMALY
        //
    RAW DATA_COLLECT (ALL LINQS)
        SWITCH (PING_DRIVERS)
            PRE-PROCESS/COMPRESS RAW DATA
            QUERY DATA_QUALITY → 0,1
                IF 0: MINOR → UPDATE
                      MAJOR → BREAK
    //
    //
    PACKAGE_PUNG ( ALL_LINQS)
}
```

Figure 25

N-row darrival$_A$(a,b)

{0000...00[-k$_x$(1-R$_B$')]0[-k$_y$(1-R$_B$')][1-R$_B$]00...00[-k$_x$R$_B$']0[-k$_y$R$_B$']0[R$_B$]00..

Car B harmonic block N
5 elements

Car B harmonic block N+1
5 elements

...00[-k$_x$(1-R$_A$')][k$_x$R$_A$'][-k$_y$(1-R$_A$')][k$_y$R$_A$'][1-R$_A$]00...00 0000[R$_A$]00...00}

Car A harmonic block N+2
5 elements

Car A harmonic block N+3
5 elements (Referring to Figure 13, there are 150 elements in this row, with 12 non-zero elements)

Figure 30

ONE PING, ISOLATING ONE LINEAR
INTERPOLATION UPON THE F-VECTOR SOLUTION,
WITH THE INTERPOLATION BEING A CLASSIC
W, (1-W) WEIGHTING IN THE H MATRIX $$\begin{bmatrix} \cdots 0\ 0\ 0\ W_i\ (1-W_i)\ 0\ 0 \cdots \end{bmatrix} \begin{bmatrix} \vdots \\ g_i \\ \vdots \end{bmatrix} = \begin{bmatrix} \vdots \\ f_j \\ f_{j+1} \\ \vdots \end{bmatrix}$$

Figure 33

MEWE Definition
(Multiple Epoch Waveform Equation)

$$darrival(a,b) = \sum \sum w(a,i) \, dS_{ai} + \sum w(b,j) \, dS_{Bj} + \sum w(a,b,k) \, dS_{ABK}$$

- Coarse Epoch Car A
- Coarse Epoch Car B
- Common path delay between cars A and B at coarse epoch (a,b)

Darrival → DATA
W → waveform interpolants
dS → Solution points associated with waveform interpolants
I → number of interpolants used (e.g., "2" for linear, "4" for simple cubic spline, etc.)
A → number of solution parametric waveforms for car A
B → number of solution parametric waveforms for car B
Coarse epoch (a,b) → can be roughly defined as (a+b)/2 or the midpoint of a,b.

Figure 44

FOR EXAMPLE:

1 LOCATION SOLN PER HARMONIC BLK
2 CLK SOLNS PER HARMONIC BLK
5 NODES

SPACE-TIME CALIBRATION SYSTEM AND METHOD

TECHNICAL FIELD

This disclosure relates to embodiments of a "PhaseNet" technique, which is shorthand for implementation of space-time solutions, in which, in one preferred embodiment, a single node determines its own space-time solutions based on other network nodes with which the single node communicates. In other preferred embodiments, space-time solutions for the node can be generated using other resources in the network. PhaseNet enables reliable, precise object positioning particularly for environments where the Global Positioning System (GPS) is blocked or subject to interference such as within the urban core.

BACKGROUND INFORMATION

Current techniques for positioning within the urban environment include the following:
Cellular:
 GPS, A-GPS, Time of Arrival, Radio Fingerprinting, Cell Global Identity, and Enhanced Cell ID.
WiFi:
 Radio Fingerprinting, WiFi TOA, and Wireless Access Point Wardriving.
GPS:
 DGPS, WAAS, A-GPS, and Laser Augmentation.

GPS is a space-based satellite constellation that provides constant, global geopositioning to the end user. A user's GPS device processes signals from three or more GPS satellites, and by way of trilateration provides latitude and longitude data. GPS may be global, but it is not ubiquitous because foliage, building edifices, and bridges all block GPS signals. The absence of GPS signals in places such as the urban core is problematic because high value applications for reliable positioning abound, yet no reliable solution exists. The urban core in major cities is also known as the "urban canyon," because skyscrapers on both sides of the streets block GPS signals. Another common problem is multipath distortion in which signals bounce off many surfaces before reaching the user, resulting in vastly inaccurate positioning data.

PhaseNet is original equipment manufacturer (OEM) "plumbing level" technology that is integrated into device and infrastructure products such as those sold by Motorola, Cisco, D-Link, Nokia, Ericsson, HP, Agilent, and Intel. This OEM technology is primarily in the form of software modules, but it also includes custom hardware for Military "MILSPEC" and custom applications. Additionally, hardware reference designs for very minor chip level modifications (IP) at the transceiver level can improve the performance. Because of its interoperability, PhaseNet can include any number of the additional positioning methods listed above; however, PhaseNet can reside independent of these and still provide sub-meter positioning to the end user.

To overcome the limitations of the GPS system mentioned above, a GPS extension can be provided by PhaseNet. Furthermore, PhaseNet can create an entirely independent navigational capability by embedding positioning data into wireless networks that abound in the urban canyon. PhaseNet is an interoperable architecture; hence, it implements a capability to effectively coordinate disparate devices operating at different frequencies, and with different standards and protocols. This architecture is reliable, precise, scalable, dynamic, broad baseline, plug-and-play, secure and cost-effective.

Potential users include city visitors relying on in-car navigation systems that show onscreen location data provided by GPS. GPS fails when a traveler crosses the threshold into the urban canyon where unreliable signals show inaccurate navigation data or may be blocked entirely. However, urban drivers are well within reception of reliable WiFi, WiMax or cellular networks and PhaseNet positioning data embedded in the corresponding wireless signals provide the necessary positioning data.

First responders tending to an emergency on a city sidewalk, copier technicians needing proof of performance for 50 copiers on various floors of a downtown building, courier dispatch wanting to know the location of a the driver, and city workers ensuring a backhoe is not cutting gas or fiber optic lines are all examples of situations in which PhaseNet service can substitute for inadequate GPS capability.

The abundance of WiFi in urban settings provides an excellent example of how PhaseNet may leverage a robust and abundant signal source. For example, increasing deployments of individual WiFi access points by businesses and consumers make it difficult to walk through a downtown area without detecting WiFi signals. WiFi "sniffers" typically installed on personal computer (PC) operating systems constantly look out for WiFi sources. PhaseNet positioning data can be added to the inbound and outbound packets sent from these access points to alert the user that a WiFi spot is available. These PhaseNet positioning data are located outside the firewall, enabling users to receive the data even if they are not logged onto a network, thus enabling both secured and unsecured access points to provide positioning data.

SUMMARY OF THE DISCLOSURE

Reliable sub-meter positioning performance and sub-nanosecond timing calibration are readily obtained using this PhaseNet based methodology. The method entails weaving positioning data into the fabric of wireless networks. More specifically, the method entails embedding PhaseNet data into the communications channel of the various wireless networks that proliferate throughout our environment. WiMax, WiFi, Cellular, Mesh Networks, Ad Hoc Networks, First Responder Radio, and Spaceborne systems such as Iridium and the GPS constellation itself are all potential PhaseNet carriers. Wireline networks are also potential PhaseNet carriers for use in areas such as wireline IT networks synchronization, geodetic remote sensing, and fiber optic backbone calibration.

Consequently, an end user having only a laptop, PDA, VoIP phone or other device with a WiFi network connection receives positioning data without the need for a costly GPS chip. Cities are deploying metropolitan-wide industrial grade WiFi networks that enable a WiFi user to maintain continuous WiFi access while moving almost anywhere within the city. The development of metropolitan-wide WiFi networks in more than 250 cities will by 2009 create a very large user base for WiFi-based positioning devices.

Just as WiFi provides positioning signals, WiMax, cellular, broadcast television, digital radio, satellite, and mesh networks are potential PhaseNet signal carriers. This "last-mile" wireless broadband solution is like cellular service in that base stations provide the signals to the user for broad baseline service. Individually, each signal type can provide robust positioning. If all the signals are synthesized, then the resulting 'signal soup' enables almost any communicating device to be a reliable, precision locator without requiring an embedded GPS chip.

BRIEF DESCRIPTION OF THE DRAWINGS

FIG. 20 is a diagram showing an example of network nodes evolving over time through arbitrary states of network connectivity.

FIG. 22 is pseudo-code representing an outer repetitive process driving the main operation of a given node.

FIG. 23 is pseudo-code representing maintenance of an active understanding of local node group topologies such as those shown in FIG. 19.

FIG. 24 is pseudo-code for generating f vector solutions.

FIG. 25 is pseudo-code representing managing the operation of ping, pong, and pong data collection and dissemination, as well as monitoring communication link quality.

FIGS. 29 and 30 are, respectively, waveforms and expressions representing solution waveforms of three harmonic blocks.

FIG. 33 represents harmonic block organization structures for the f and g vectors of the example depicted in FIG. 31.

FIG. 44 presents multiple-epoch waveform equations (MWMEs) in parametric form.

DETAILED DESCRIPTION OF PREFERRED EMBODIMENTS

This disclosure describes a simple example of an overall PhaseNet embodiment that explicitly uses sound waves as opposed to electromagnetic waves to communicate between PhaseNet nodes. It also explicitly affords a tutorial treatment of how PhaseNet works, most notably in the use of relatively common "low and medium tech" methods, without sacrificing critical underlying engineering principles required for enabling electromagnetic-based PhaseNet operations as well. The extrapolation of audio principles to electromagnetic (EM) methods is a generally straightforward exercise, with the details of count-stamping circuitry and hardware being the primary physical difference between audio-based and electromagnetic-based implementations. The details of how the physical system-agnostic principles work on leading-edge satellite systems or terrestrial wireless and cell networks can all reference back to this simple enabling example using audio.

Figure 1:
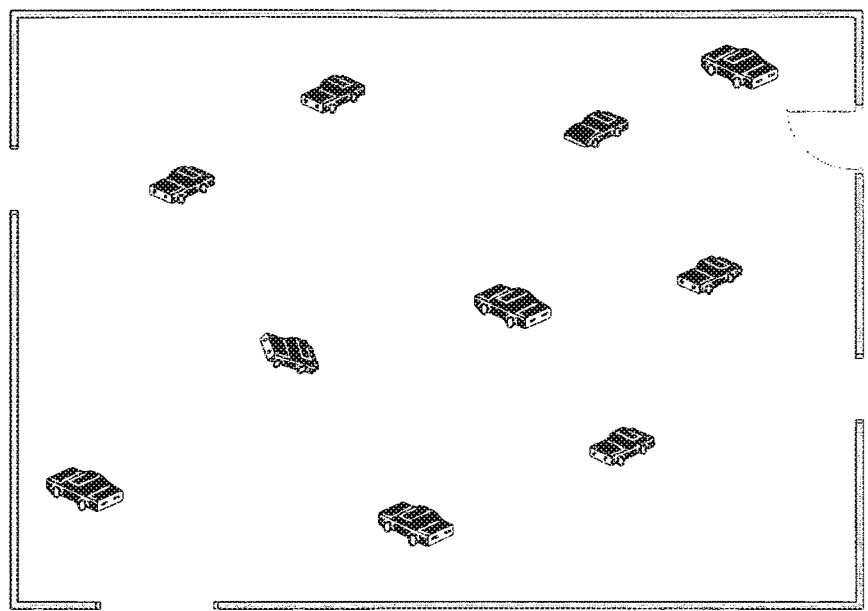
FIG. 1 is a pictorial diagram of a preferred baseline embodiment that includes 10 cars traveling within a defined space to facilitate description of the operation and implementation of the disclosed space-time calibration technique.

FIG. 1 depicts an example of a preferred embodiment that entails ten randomly distributed robotic cars moving within a defined space, e.g., a gymnasium. These cars are equipped with conventional drive and steering mechanisms, and they communicate with one another using free-space, 2-D plane, or full 3-D omnidirectional audio signaling equipment. The cars also are equipped with a set of core PhaseNet-specific elements and software procedural engines. These elements are packaged together as a prototype Space-Time Calibration Unit (SCU), which collects real-time information from the car on which the module is mounted, and from neighboring cars, and fashions a space-time solution from the information gathered. The number of cars in the system is an arbitrary choice.

Various experiments described below test different combinations of the number of cars that are actually communicating, and how PhaseNet principles function as nodes turn on and off, or as effective communication links between cars become intermittent or shut down.

Each car includes a core counting element that includes a low cost digital clock with an associated digital counter. The counter is driven by the clock; it should have at least a 64 bit counting range. For a baseline embodiment, it can run at roughly 1 million counts per second. The core counting element can be built using cascades of counters, with 8 or 16 bit counters running at the highest speed, and driving lower rate 64 bit counters, for example. These specifications are quite flexible. Given that PhaseNet solutions ultimately solve for count-rate variabilities between PhaseNet nodes, their quality can be commensurate with extremely low-cost parts and very basic performance specifications.

Figure 2:
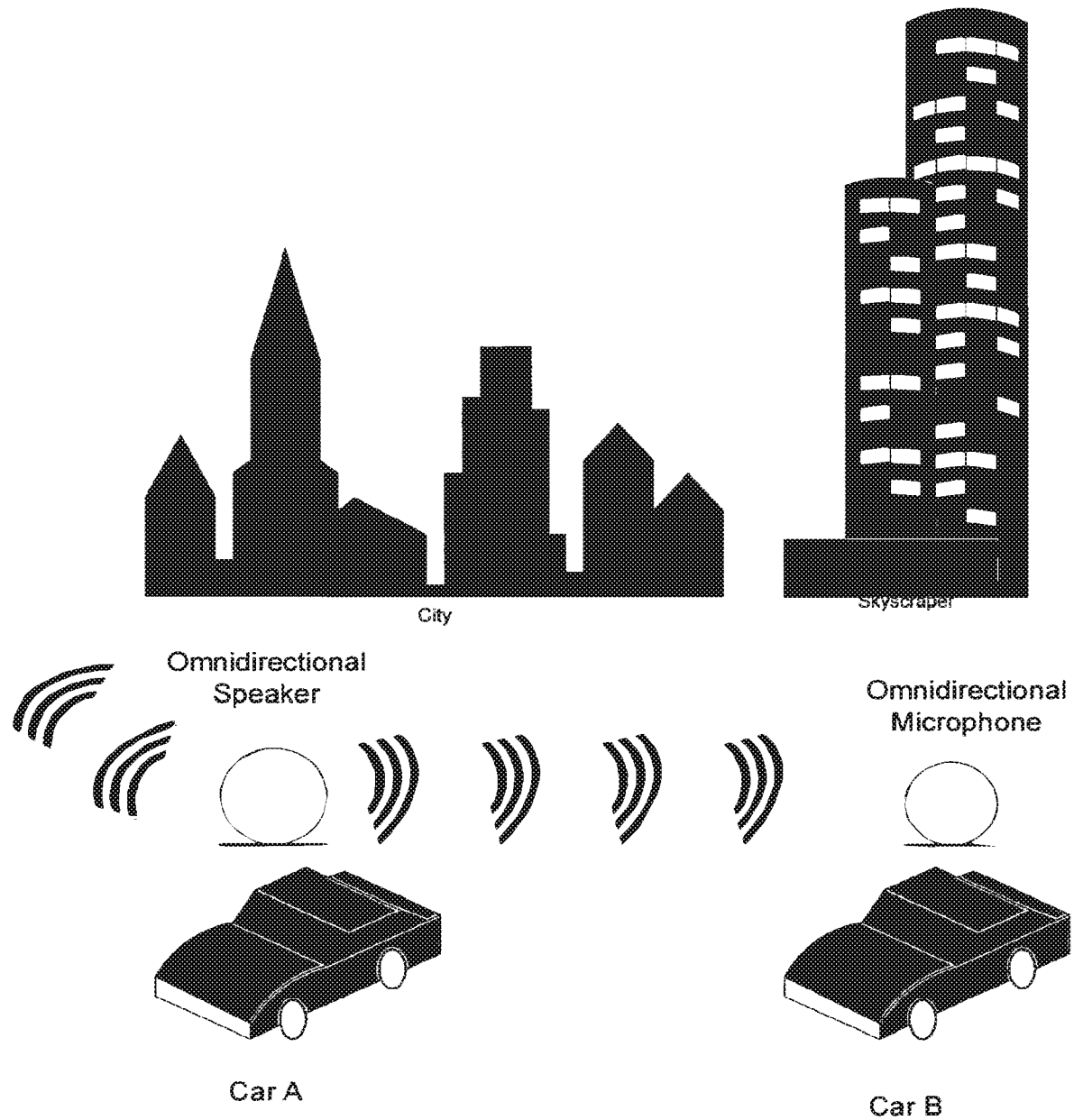
FIG. 2 depicts a monoplex communication link between signal-transmitting car A and signal-receiving car B.

FIG. 2 shows the basic audio equipment used for duplex and monoplex communications between the cars including a single omnidirectional speaker (that spreads sound wave energy in the two-dimensional plane of the gymnasium floor) and one or more omnidirectional microphones. Various experiments showing the continuity of PhaseNet space-time solutions will turn these audio instruments on and off.

FIG. 2 highlights that the combination of a speaker on a first car A with a microphone on a second car B—representing a monoplex communication—while A also has a microphone listening to car B, thus providing the basis for duplex communications. Experiments described below exercise various combinations of both monoplex and duplex communications, illustrating how PhaseNet solutions can routinely deal with any combination of node communication configurations.

There are many possible choices for audio communication protocols between cars. The minimum digital communication requirement for a monoplex or duplex channel in a preferred embodiment may be the ability to transmit 10,000 bits per second (bps). Normal telephone-line audio modem protocols are the specific example used in this embodiment, where the state-of-the-art functional bit rate for such equipment is significantly higher than 10 Kbit per second (10 Kbps). 10 Kbps will be sufficient for this embodiment, however.

PhaseNet operates using generic D3P or duplex ping-pong-pung signaling protocols. In this embodiment, pings will dominate the raw generation of space-time data, pongs will be used for the purpose of determining where the outside walls of the gymnasium are located, and pungs will be part of the digital communications between cars.

In short, a ping is any network-agreed method or multiple agreed methods of generating an event at a car, count-stamping that event using the car's local counter, and communicating the event to another car that count-stamps the arrival of the event. This is essentially the idea behind GPS-satellite-to-GPS-receiver signaling. A pong is similar to a ping in that a car count-stamps and communicates (often broadcasts) an event, but the event is reflected back to the event-generating car by its external environment or to another car, to be subsequently count-stamped by the event-generating car upon arrival of one or more echoes. A pung is a digital packet of information sent between two cars or sent by one car broadcasting to all others that might be listening. It is called out as a discrete entity to highlight its most common form of a modern digital packet or some fractional payload within a digital packet.

Skilled persons will instantly recognize that pings, pongs, and pungs, entities as defined above, are in very wide use in many systems today, under different names appropriate to specific applications and systems. The central reason for creating these entities within PhaseNet is to aggregate and optimally exploit this rich source of prior methods, while abstracting and generalizing their basic information content across all systems and spatial-scales. PhaseNet can thus operate on these generic entities rather than taking into account specific details of the physical instruments being employed, or details of the specific medium of communication or its inherent topology. In short, nodes move about in a soup of pings, pongs, and pungs, whether that soup is composed of acoustic waves from a semiconductor integrated circuit or laser pulses from a space probe at the edge of the solar system. PhaseNet is designed to work no matter what the soup contains.

Each audio signaling protocol supplies its own precise definition of a "ping event." The main concerns in making this definition are the noise properties relative to a node's ability to count-stamp an outgoing broadcast ping as well as count-stamping an incoming received ping, using its local digital counter as the component that effectively enumerates the ping event. "Time-stamp" is an intuitive cousin to "count stamp," but PhaseNet has a strong preference for the phrase "count-stamp" because the notion of "time" is asymptotically defined. Across the vast range of PhaseNet application and configurations, there is an equally vast range of "ping" definitions, with general ideas behind "carrier phase" methods within GPS playing an important lead role. The description below touches upon carrier phase methods even in this rather straightforward baseline audio embodiment.

It is not necessary to literally impress a dedicated ping signal or "pulse-like spike" directly onto the chosen audio signaling protocol. The normal operation of an audio signaling method has certain regular properties that can be defined as the ping event, such as specific zero crossings of a carrier signal or the tagging of a specific symbol or preamble sent out over the audio communication channel. Carrier phase methods within GPS receivers are prior art in this regard (as alluded to above), in which the normal oscillation of the GPS carrier signal is used as a tagged event, as well as code symbols sent out as an explicit time-stamped event.

Though it is unnecessary to impress ping events onto a communications protocol, neither is it precluded. In certain situations requiring precision, one may wish to modify a given communication protocol to more explicitly and physically create a ping event, generally with the intent of improving the precision with which an outgoing ping is count-correlated with its local digital counter. An example of this is the creation of a simplified waveform such as a de-modulated delta function or rise-time waveform where precision methods of measurement can be applied.

In the current embodiment, conventional modem protocols are assumed to be the communications mechanism between cars, using the speakers and microphones described above as the physical channel. Provisions are made for slight Doppler shifts in the primary carrier frequency of such protocols, because the cars may travel up to a few meters per second in random directions (which in the current embodiment may be of insignificant consequence, whereas in other applications such as motor vehicles on an open road and aircraft communications, Doppler issues become more pronounced). Most modem equipment has such provisions to cope with slow drift or offsets in carrier frequencies, typically in the form of phase-locked-loops having reasonable capture ranges on the carrier frequency.

For the purposes of simply demonstrating how PhaseNet functions, it can be assumed that digital data carried by audio communications include two primary payloads: (1) data used to actually drive the car if it is not autonomous; and (2) pung data packets which, in this embodiment, are essentially the sharing of local count-stamps of sent and received pings (with significant "compression" as will be seen, because the redundancies in raw ping data need not be communicated). Overall PhaseNet monitoring data and node-health data are also part of the digital communication channel, and explicit companions to the ping data within the pung packet.

Also included in the inventory of core elements on a given car/node, are the physical/electronic components that actually correlate the local digital counter with both broadcast ping events and the incoming ping events on individual audio microphones. The output of these components is a digital stream of count values, representing values of ping events broadcast via the car's speaker, and count values of ping events being received on microphones. Up-to-date implementations of these components can use digital waveform generators and a digital to analog (D/A) converter for generating and sending out pings and pungs. Likewise, a simple analog to digital (A/D) converter on received audio is quite straightforward. Skilled persons will generally recognize that all that is being described here are simple forms of what is now called "software-defined radio."

There exists master software that runs the ongoing processes further described below, monitors the health of the node and its immediate network, stores data, and in certain situations, oversees or even conducts calculations of space-time solutions. For the preferred embodiment, this software is generic personal computer software that can easily operate (keep up with) processing the flow of information involved. As other embodiments are considered, this software can become much more complex and it can be segmented into various physical modules and locations.

The act of actually calculating space-time solutions in real time may overtax the numerical capabilities of certain CPUs, thus necessitating a second parallel CPU on a car dedicated to numerical calculations as described below. Indeed, a sophisticated robotic car may have many CPUs.

Runtime Operation

By putting the pieces together, one can see the operation of individual cars, quickly culminating in all ten cars moving around and undergoing the ambiguities of links and nodes going on and off-line. The end goal is to illustrate PhaseNet's functioning both as it allows cars to determine where they are relative to one another, as well as separately illustrating how they can situate themselves relative to their known universe of the gymnasium.

First, counters are switched on and begin counting at a million counts per second. All cars can "start their counting engines" whenever they please, but at some point all of them are counting, generally at slightly different count rates and with randomly different count values. Later experiments will deliberately impose conditions on poor and erratic count rates in order to illustrate the extreme flexibility built into PhaseNet, but for the purposes of the current embodiment, one can assume that the counters and clocks being used are of reasonably high quality and generally within a fraction of one percent of each other, as defined by an objective calibrated observer in the gymnasium. (State-of-the-art EM systems may not have the luxury of an external master calibration, where this is a core subject in the discussion on how PhaseNet can potentially be a tool in the continual evolution of global time and space standards.)

Figure 3A:
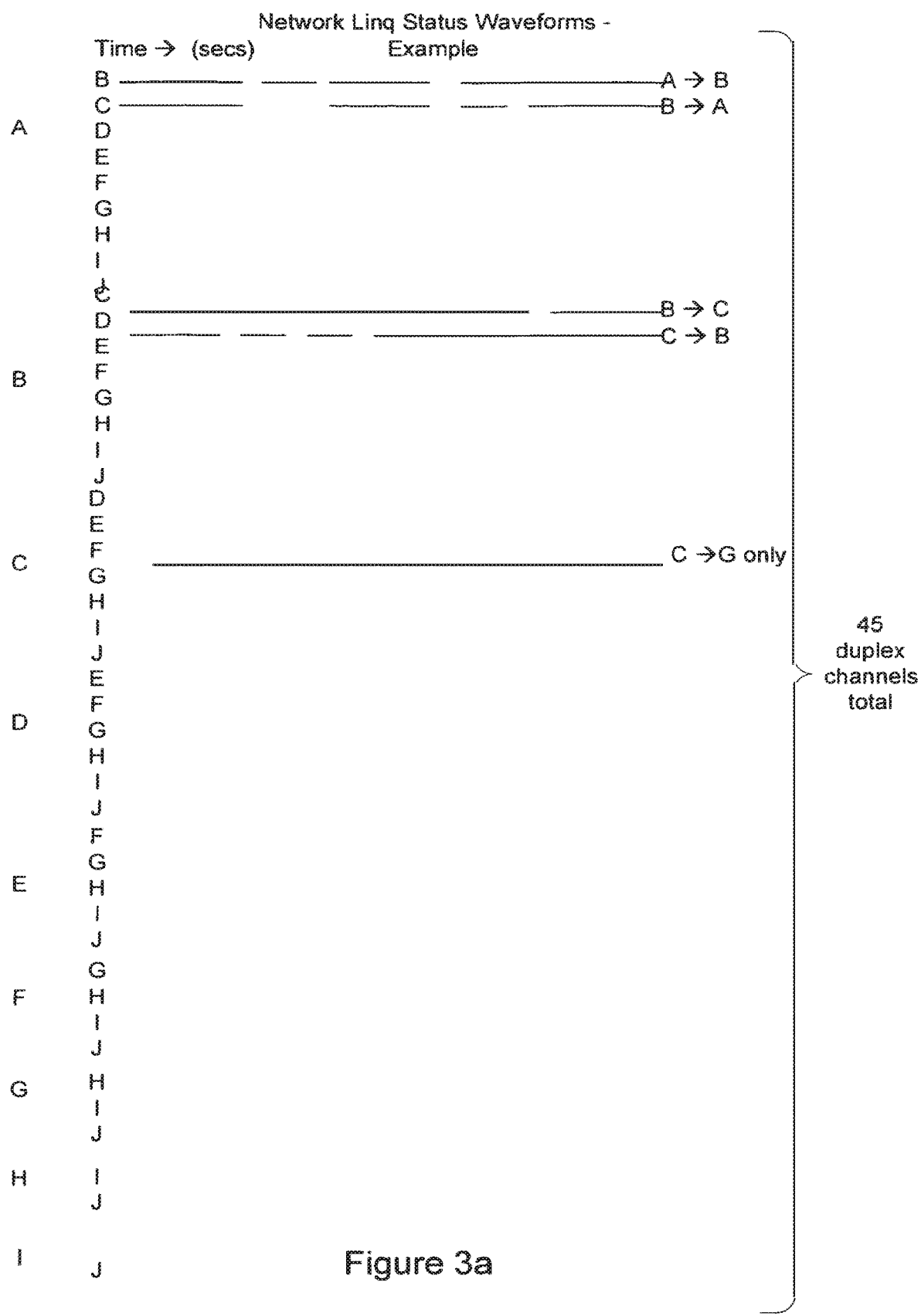
FIG. 3a shows a general example of network communication links developed among the 10 cars of FIG. 1.
Figure 3B:
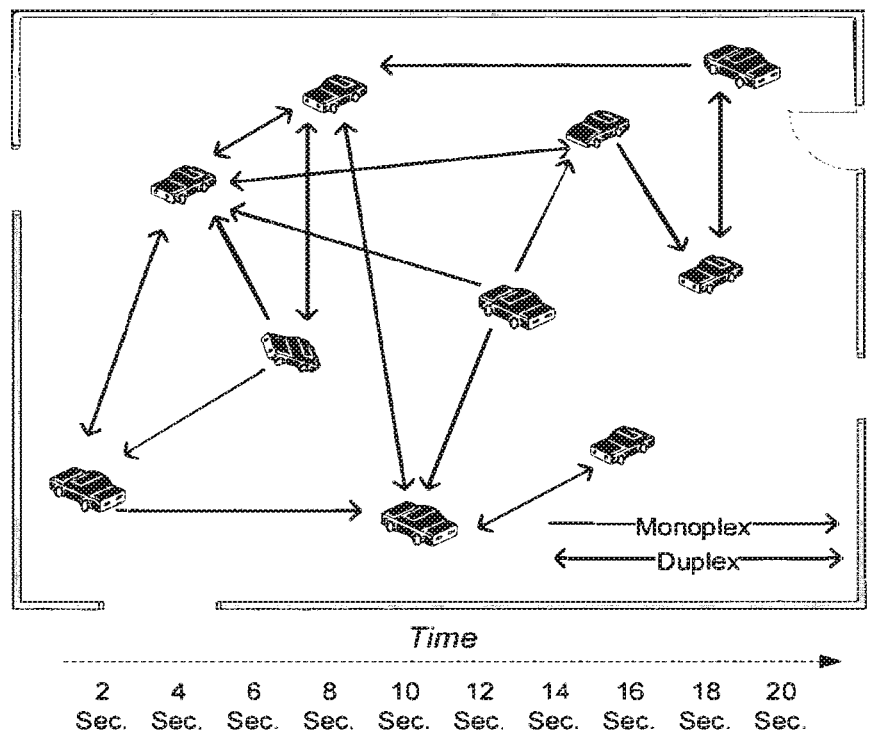
FIG. 3b is a reproduction of the pictorial diagram of FIG. 1 shown with monoplex and duplex communication links among the 10 cars.

Next, assignments among cars are made. There are many ways to do this. Specifically, combinations of both fixed schedule linking and unlinking can be tested, as well as adaptive behavior responsive to real-time conditions, such as one car occluding another. FIG. 3a is a plot showing which cars are communicating and whether the channels are bi-directional or one-way. Note that there are explicit gaps and that the operation of PhaseNet is meant to function within arbitrary and ever-changing pair-wise communication networks, though FIGS. 3a and 3b depict a general case of arbitrary communications. Later, the explanation starts with all cars having duplex communication capabilities with all other cars initially to illustrate basic PhaseNet operations, followed by selectively turning on and off links in the resultant network and getting back to forms that are closer to FIGS. 3a and 3b.

Once initial communication assignments are in place, each car synchronizes, at least in a digital communication (modem) sense, to its assigned partners. Each car begins to broadcast a simple repetitive modem-like signal to which the other cars can tune, following a well-established modem ritual. The easiest way to isolate individual car-to-car communications is to assign specific audio carrier frequencies to pairs of cars. But there are also ways to have the network share a common carrier frequency and use spread spectrum methods or other kinds of shared medium methods to nevertheless instantiate car-car monoplex and duplex channels. Indeed, when moving from this embodiment to various state-of-the-art wireless and cellular embodiments, the options become as numerous as the panoply of modern communication systems allows.

In the mono-directional assignment case where a car is simply listening to the broadcast signal of one other car, this means tuning into the broadcasting signal of its assigned car and ensuring that the repetitive signal is being properly received and decoded. In the bi-directional assignment case, the listening car B starts to supplement its initialization message with a few bytes of information broadcast specifically to let car A know that it is receiving car A's signal, and expects to hear from car A to find out whether car A is also hearing and decoding car B's signal. In general, these are all rudimentary and standard operations for establishing an arbitrary network of communicating nodes and are very well known engineering issues for both network and communications engineers.

When all nodes are cooperating and sending out a network-wide message that given car has established its assigned channels and that all its assigned channel nodes are reporting the same information, the pre-assignments are known to be complete. Once all pre-assignments of communications partners are established, the count-stamping componentry on all cars can start to count-stamp outgoing pings and incoming pings, if it has not started doing this already. That componentry can begin at any time; it simply needs actual communications running before the count values have meaning.

Looking at a car D, the local clock that is driving the digital counter happens to be the clock that is driving the 50 Kilohertz central frequency on its modem communications channels. Since in this example it has been determined that each car will produce 1,000 pings per second (distinct from, but loosely related to the previously chosen 10 Kbps), the "ping event" for car D has been determined to be every fiftieth zero crossing of its central frequency. It thus automatically produces the virtual 1,000 pings per second by simply oscillating as usual. Because the digital counter and the modem are running off the same local clock, it is known that there are exactly 1,000 count values (1 million divided by 1000) elapsing between each transmitted ping (every fiftieth zero crossing). Thus, the count-stamping of the outgoing pings is also automatic. Practitioners of GPS equipment design will recognize distinct similarities of these ideas to GPS code phase and carrier phase prior art, and they may anticipate engineering challenges such as keeping track of "every fiftieth cycle," cycle slips, carrier phase ambiguity, and the like. Except for one example, data-driven modulation of the carrier frequency itself gives rise to pseudo-noise on the uniformity of the fiftieth zero crossing, requiring a sub-process to determine and effectively remove the pseudo-noise prior to executing the core PhaseNet algorithm. Later descriptions explore these challenges in this simplified gymnasium setting using audio waveforms.

(Note that the speed of sound is just over 30 centimeters per millisecond, thus ensuring that cars separated by several meters will have non-trivial delays or count intervals between transmitting and receiving a ping. This simple point is centrally important in the subsequent extrapolation of this embodiment to satellites, in that satellites several hundred or several thousand kilometers apart will encounter similar multi-count delays in pings-sent to pings-received even when electromagnetic waves traveling at 30 cm/ng are used. Automobiles on a "smart highway" that can alert a car to the aberrant sub-millimeter-level fluctuations of a drunk driver approaching from several hundred meters away would need to account for these non-trivial delays in light signals over sub-kilometer distances.)

Figure 4A:
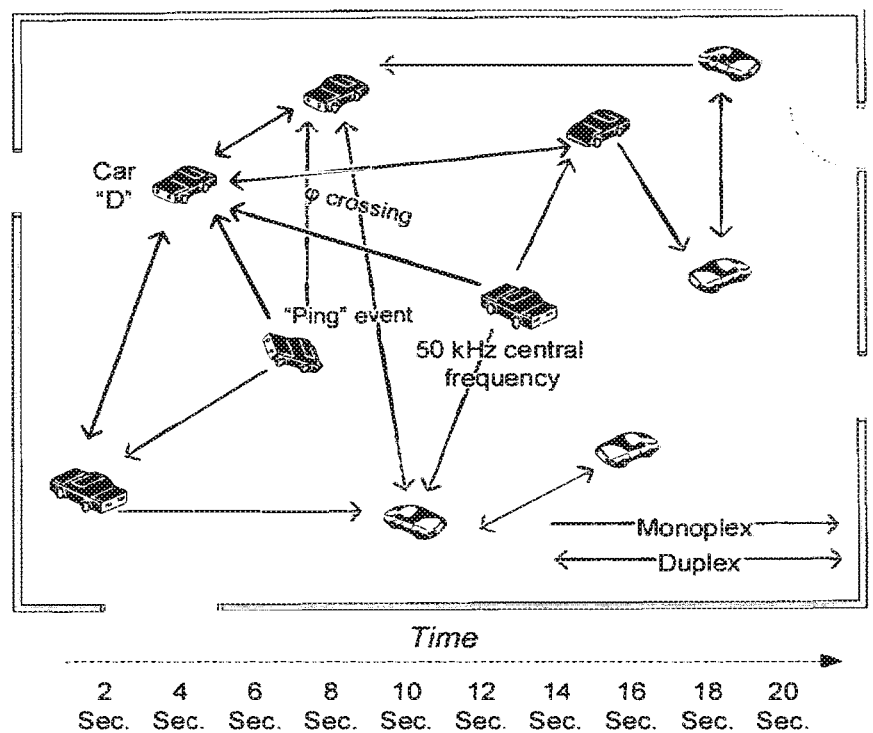
FIGS. 4a and 4b are, respectively, pictorial and signal waveform diagrams illustrating use of a zero crossing of a carrier signal to identify a specific node initiating a ping event.
Figure 4B:
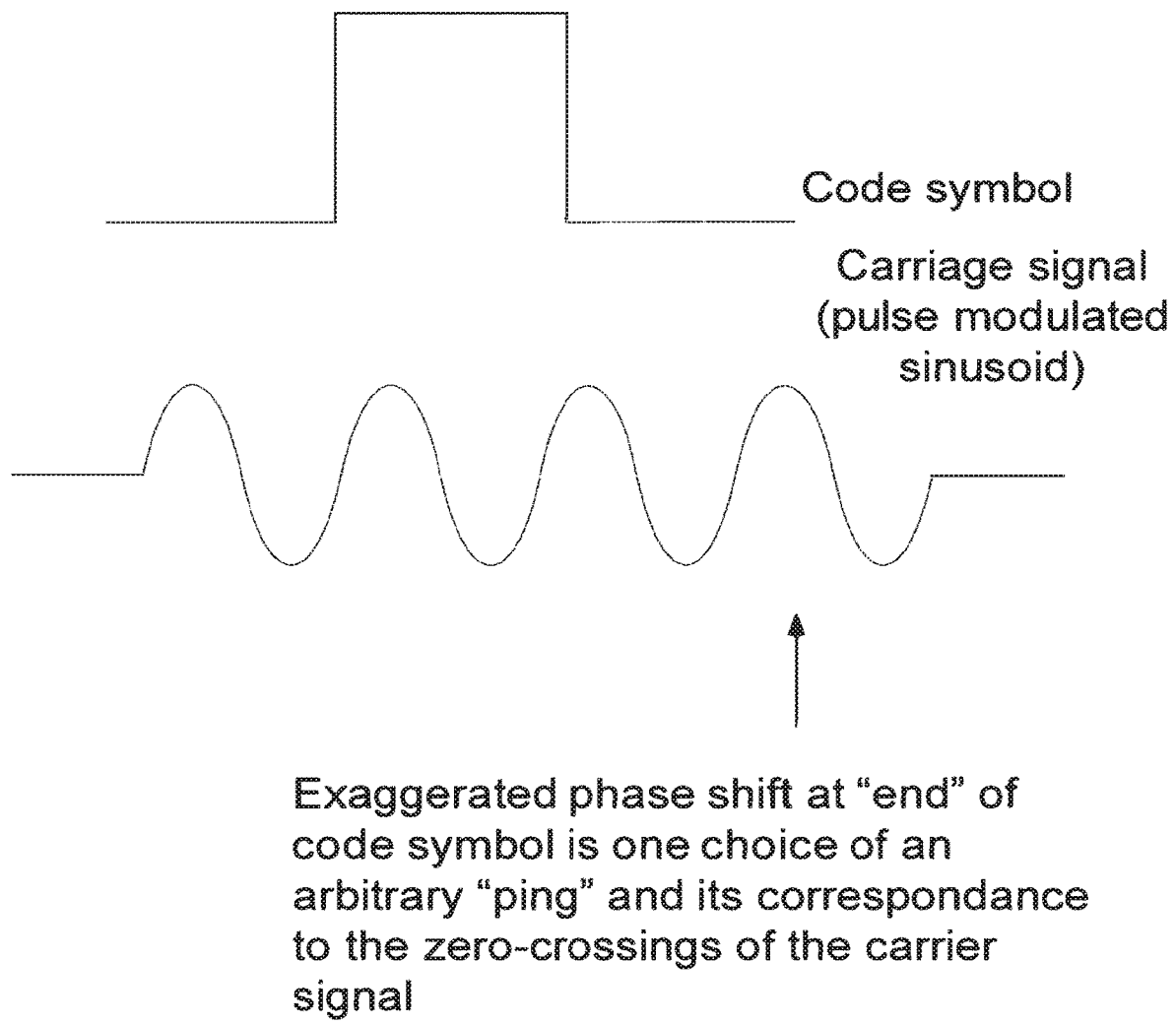

In one detailed scenario, a car D happens to be listening to five other cars with its microphone. In establishing communication with all the other cars, each car informs car D of exactly which zero crossing of its unique near-50-KHz central frequency corresponds to its ping event. A variety of methods could accomplish this, but perhaps the simplest one is to explicitly modulate a code symbol onto the carrier signal such that the very end of the code symbol corresponds to the desired zero crossing, later to be enumerated through a separate digital communication. FIGS. 4a and 4b concisely summarize the situation. It should be noted that GPS carrier phase/code phase methods are the more sophisticated precedent to follow in establishing these code/carrier relationships, both in this simple car example and in a more complex example that entails high speed satellite links.

Figure 5:
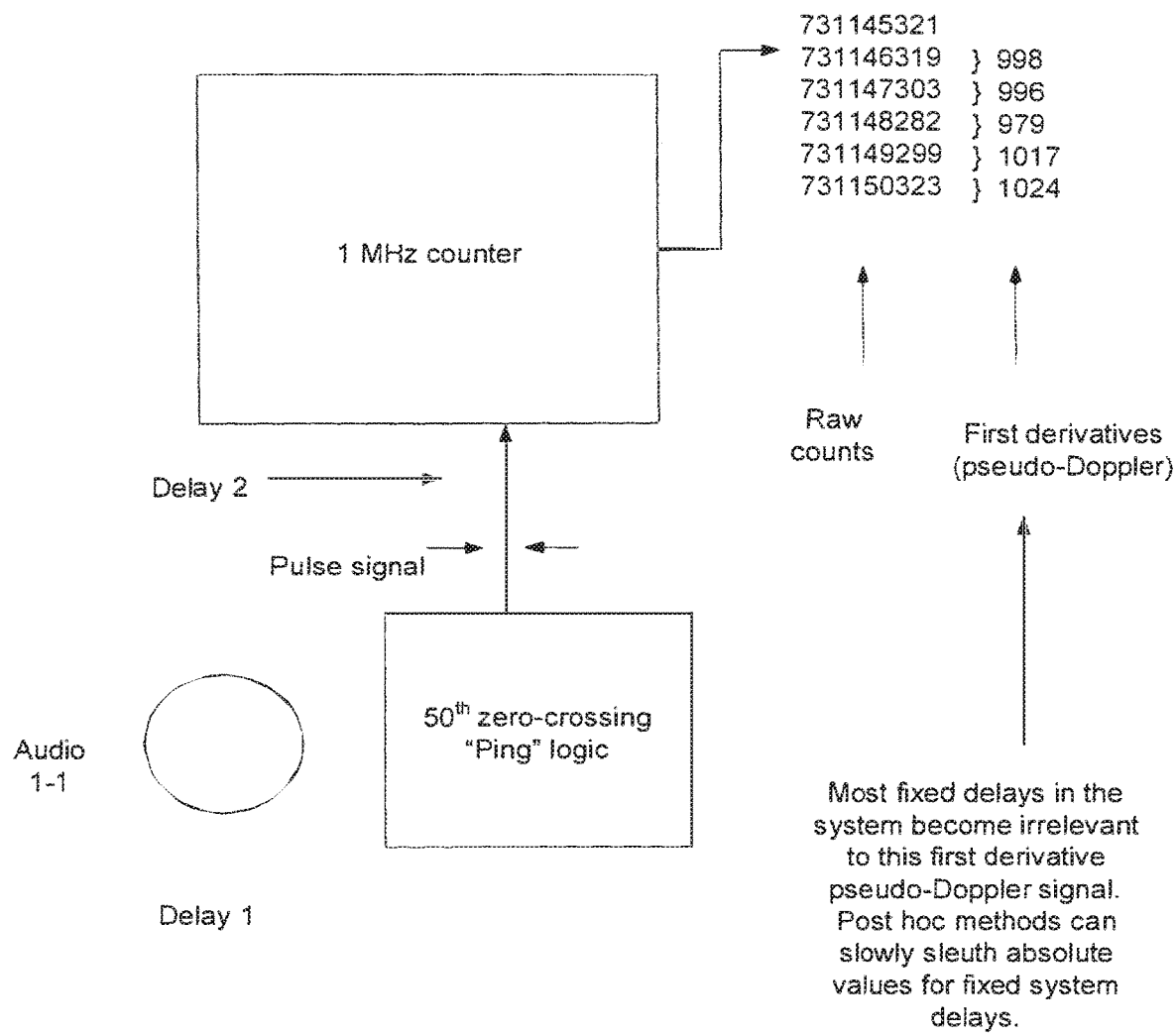
FIG. 5 represents the function of a count-stamping module operating on a node receiving a ping event.

FIG. 5 summarizes the function of the count-stamping module on car D that uses car D's local digital counter to enumerate receipt of ping events arriving at a given microphone. A variety of commercial circuitry can be used to accomplish this count-stamping function, and different methods may be applied to illustrate the many possible ways to create "pingforms" given a specific communication hardware solution and communication protocol. The output of the count-stamping module (software or hardware) is a sequence of count values. In the simple enabling example of this section, integral count values with an inherent resolution of 1 ms provide for sufficient resolution on the pingforms (nominally 0.3 mm per tick of the counter, as projected into free-space audio waves). In precision picosecond-level applications using counters with inherent resolutions surpassing the microsecond level, fractional count value capabilities are fundamentally required and need to be generated commensurate with the Gaussian noise levels on the count-stamping operation itself. Skilled persons will recognize that the act of counting is ultimately separate from the capability to timestamp an electronic signal, and thus fractional count-stamping will be the norm in EM systems. This embodiment deliberately uses a count-rate that avoids this secondary engineering issue so as not to obscure integral number mathematics and programming by a floating point haze.

FIG. 5 also briefly introduces the important topic of "delay" in physical circuits and its relationship to signals actually transmitted by antennae. Two separate kinds of high level delay are depicted: the delay that occurs between a signal inside a pre-amplifier and its amplified version exiting the antenna, labeled 'delay 1' in the figure; and the delay between the same signal in the pre-amplifier and the production of a digital value within the counter during a query pulse. These delay concepts are introduced for completeness; later sections describe the way in which these delays are explicitly dealt with. As will be seen, the emphasis on differential space-time solutions over absolute space-time solutions all but eliminates most consequences of fixed delays in circuitry, where variations in delay represent a nuisance and an eventual source of error in space-time estimates. Asymptotic methods will be presented that outline how fixed delays can be made immaterial to absolute space-time solutions, for example, when an object needs to be placed within the GPS frame.

Note also that existing communication hardware typically does not include one of these "ping pulse generators," as depicted in FIG. 5, but they can be adapted in the future to accommodate PhaseNet. Time-of-arrival (TOA) enabled communications equipment indicates that steps have been taken in this direction, whereby signals are tagged for certain events and those events submitted as query-pulses to counters. In the case of the preferred embodiment, the audio waveforms are tied to the sampling rate of the D/A converter chip, and thus raw count values of the D/A chip can function as the output sequence of digital count values.

Figure 6:
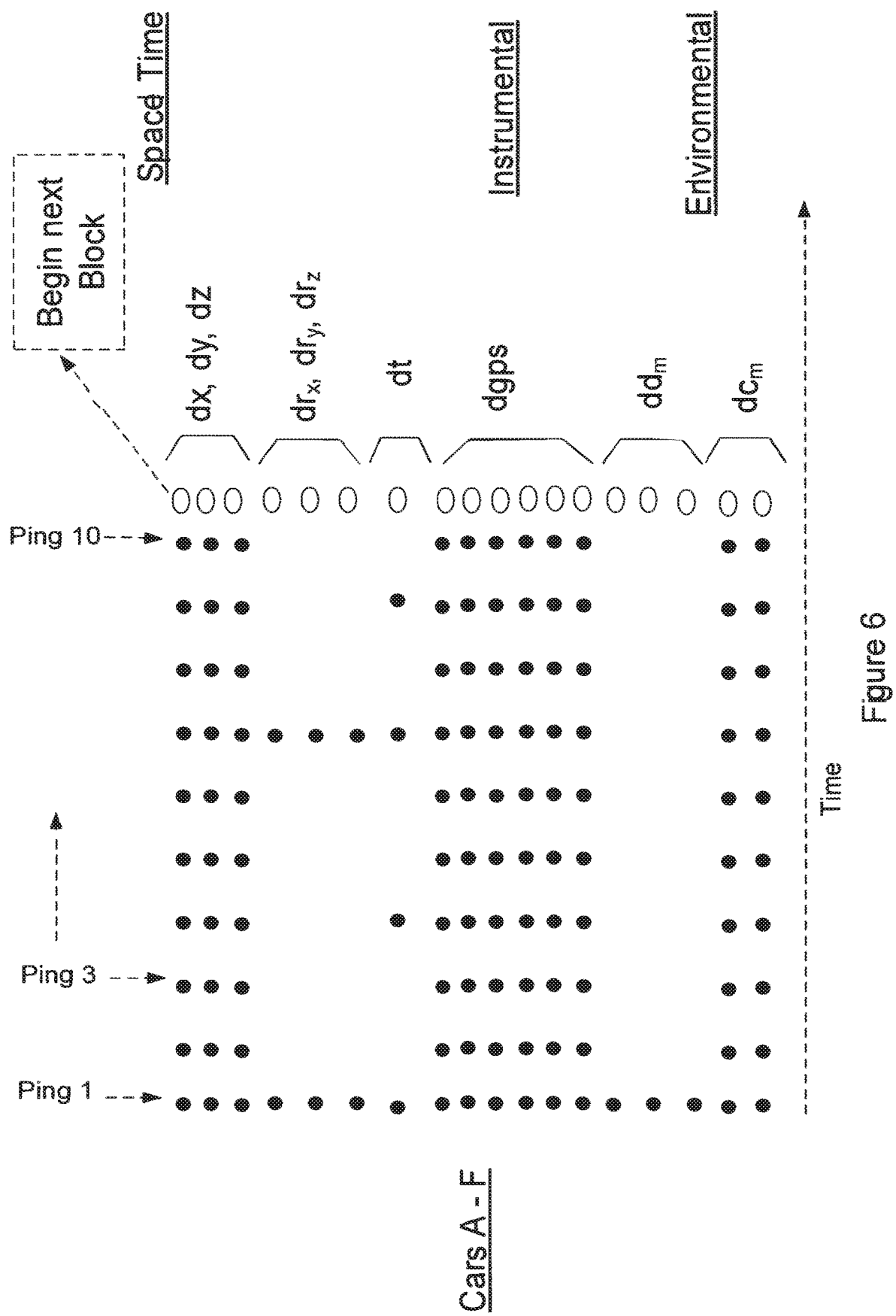
FIG. 6 is a plot of ongoing pingforms containing data from which space-time calibration solutions for the nodes are generated.

FIG. 6, a companion plot to FIG. 3a, shows pingforms plotted alongside the assigned communication pairings. As described earlier, the data contained in FIG. 6 are the foundation for the space-time calibration solutions describing the dynamic evolution of the cars in the gymnasium. In many ways FIG. 6 is a poster-child for the 'observables only' approach to space-time construction, where space and time are derived concepts based on only the pingforms of FIG. 6.

Though low cost digital clocks can provide sufficient accuracy for this simple example, they may be deliberately perturbed. The flexibility of PhaseNet can thus be demonstrated, because a primary function of PhaseNet is to sleuth and solve for the inter-variability of count rates between PhaseNet nodes, amidst a cacophony of influencing factors such as dynamic spatial relationships, environmental factors, instrument drifts and delays, and eventually gravitational and relativistic perturbations. Without deliberate perturbation on count rates alluded to above, this enabling example would still come up with solutions for count inter-variability, but it would represent almost a trivial level of solution for clock irregularities relative to the spatial dynamics of the cars.

Figure 7:
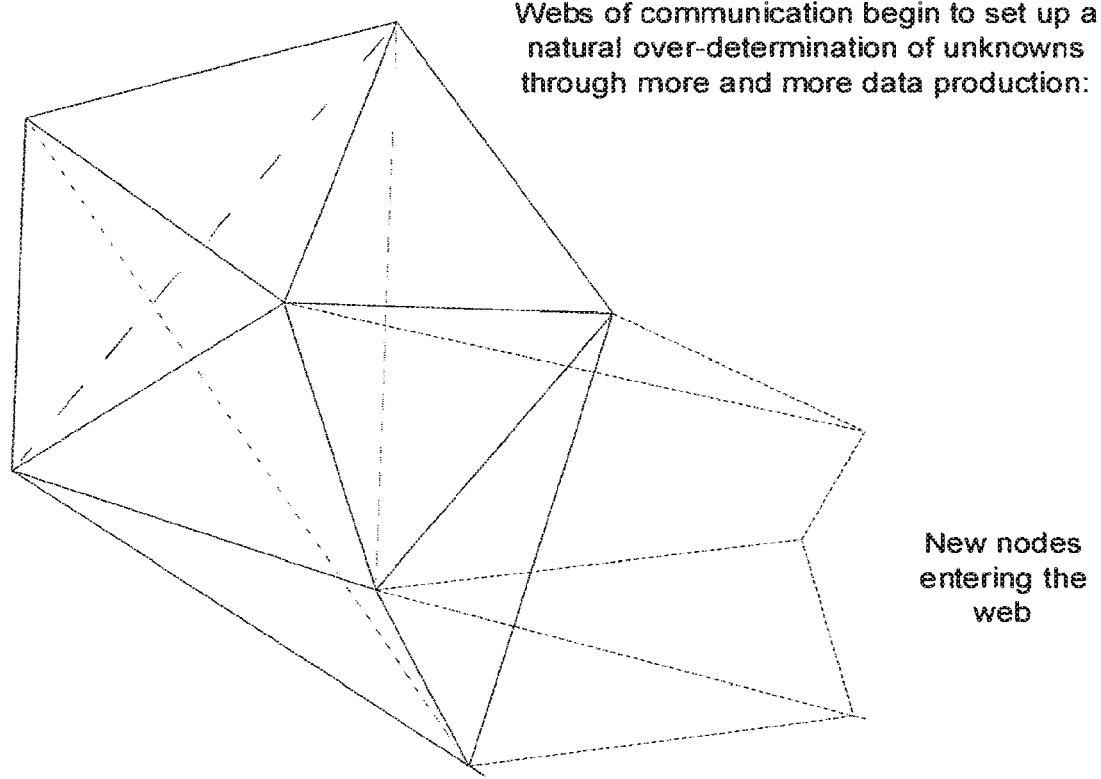
FIG. 7 illustrates the growth of a communication network with addition of new nodes that produce additional data and thereby result in overdetermination of network variables.

Thus, for this enabling example, deliberate perturbations to the digital clocks highlight the ability of PhaseNet to measure count drift, an exercise that portrays the same issues when dealing with EM communications and the system engineering goal of reaching single digit picosecond network synchrony. Measuring higher bandwidth phase noise on individual PhaseNet nodes has pragmatic implications to signal acquisition and tracking, as well as communications bandwidth and quality of service. The phase noise associated with a given node can become a network-defined variable and can begin to have real-time measurements approaching the chosen ping-rate. The measurement of drift consumes the higher bandwidth phase noise due to a web of communication links, as illustrated in FIG. 7.

Pingforms into Space-Time Solutions

The primary data generation aspects of this embodiment are represented in FIG. 6, supported by the communication-pair assignments represented in FIGS. 3a and 3b. FIG. 6 depicts the collected set of pingforms. It remains to convert these raw data into matrix forms, which can then cast network parameters such as distances and directions between nodes and inter-variability of count rates as solutions to the collected data.

Counting and Communicating Construct Space-Time Solutions

A central conclusion of "set physics" is that a set of elements (nodes) having the ability to count, the ability to communicate their counts, and the ability to associate count values received by other nodes with their own internal count, may define, based solely on structures similar to the pingforms of FIG. 6, the distance, direction, and orientation, or "space-time" describing the motion of elements in the set.

The notion of "absolute" space-time is unsupportable because (A) space-time is not defined for a null set or a single element set, and (B) space-time is defined for a populated set only after communications have taken place between set members, and the definition can refer to only a space-time description of an asymptotic past state of the set. The fact that it is fundamentally impossible to define the current state of the set because only active in-process communications can do that is referred to as the "asymptotic collision frame." As records of more communications are accumulated, past states of the entire set can be determined, and collisions between set members can be a set-wide defined phenomena rather than a mathematical construct of relative motion. This becomes an important practical matter as PhaseNet is scaled to solar-system spatial scales.

In the context of the 10-car example, the metric that PhaseNet creates as the companion to the pingforms of FIG. 6 include changes in position and direction between the cars (explicitly including car motions of right/left and front/back), as well as the variability of count rates between cars. In fact, a fundamental metric is the variability itself.

There are several specific approaches to mathematically expressing the space containing a set of elements. A fundamental equation that relates the metrics described above to the pingforms of FIG. 6 is:

$$d\mathrm{arrival}(a,b) = d\mathrm{count}(a) - d\mathrm{count}(b) + d\mathrm{dist}(a,b). \tag{1}$$

This ideal equation represents car A count-stamping the arrival of a ping sent from car B. The d's in front of the four primary entities indicate differential quantities or the changes from one sampling instance to the next. Sampling rates in PhaseNet generally conform to a given node's ping rate, and thus the primary entities refer to changes from one ping to the next. The primary measured quantity on the left side of equation (1) is 'darrival(a,b)', with an italicized a representing the fractional count value at the arrival of the ping at car A, using car A's counter, while the b is not italicized because it represents the integral value of a count by car B (the ping was sent out by B precisely on integral values even in EM systems, whereas with the audio baseline embodiment even the a will not actually be a fractional count value). Later sections will explore error sources and non-ideal implementations of equation (1), but here the focus is on the ideal situation. The primary entity 'darrival(a,b)' is thus the discrete or digital slope of the pingform of car A, at the arrival point of the ping sent from car B. The use of the slope obviates the issue of different starting count values for the cars. More importantly, it avoids later quadratic equations and roots of combined quantities arising from multiple spatial dimensions if formulated in "background frame" absolute quantities. The primary entities 'dcount(a)' and 'dcount(b)' represent the slopes or rates of change variables in the count inter-variability curves (part of the metric chosen) while 'ddist(a,b)' is the slope of the distance, or the rate of approach or recession between car A and car B. It is not unreasonable to relate ddist to a Doppler signal.

Critics might be quick to ask "change with respect to what?" when they consider that isolated variables (e.g., the variability of car A's counting) are being measured; what is the external standard being used to set the context for this variability? This is a very reasonable question especially relative to the introduction of equation (1). The change is the primary entity in the particular metric space chosen. There is no need to isolate one particular car/node's counting and demand that a master car drive up along side it and judge its counting capabilities (uniformity of rate, rate itself, etc.). Change itself can be a candidate primary entity—an explicit choice for a metric; a dx is just as good as an x to start building equations and solutions to those equations; each is just a symbol for an entity, and there is no need to burden the entities with axiomatic relationships.

Building the baseline embodiment of the moving cars, exchanging information, with eventual resultant measurements of change being the fundamental entities measured within the system is mathematically straightforward. The sequential differences in the intervals between arriving pings can be accounted for through three core mechanisms: rate non-uniformities in the receiving node at the instance of arrival of the ping, rate non-uniformities in the sending node at the instance of sending the ping, and "spatial movements" of, independently, the sending node at the instance of sending the ping and the receiving node at the instance of receiving the ping. With this equation, there is an initial connection between acquired data and a 'pseudo-metric' in that distance still needs to be more practically rendered.

Figure 8:
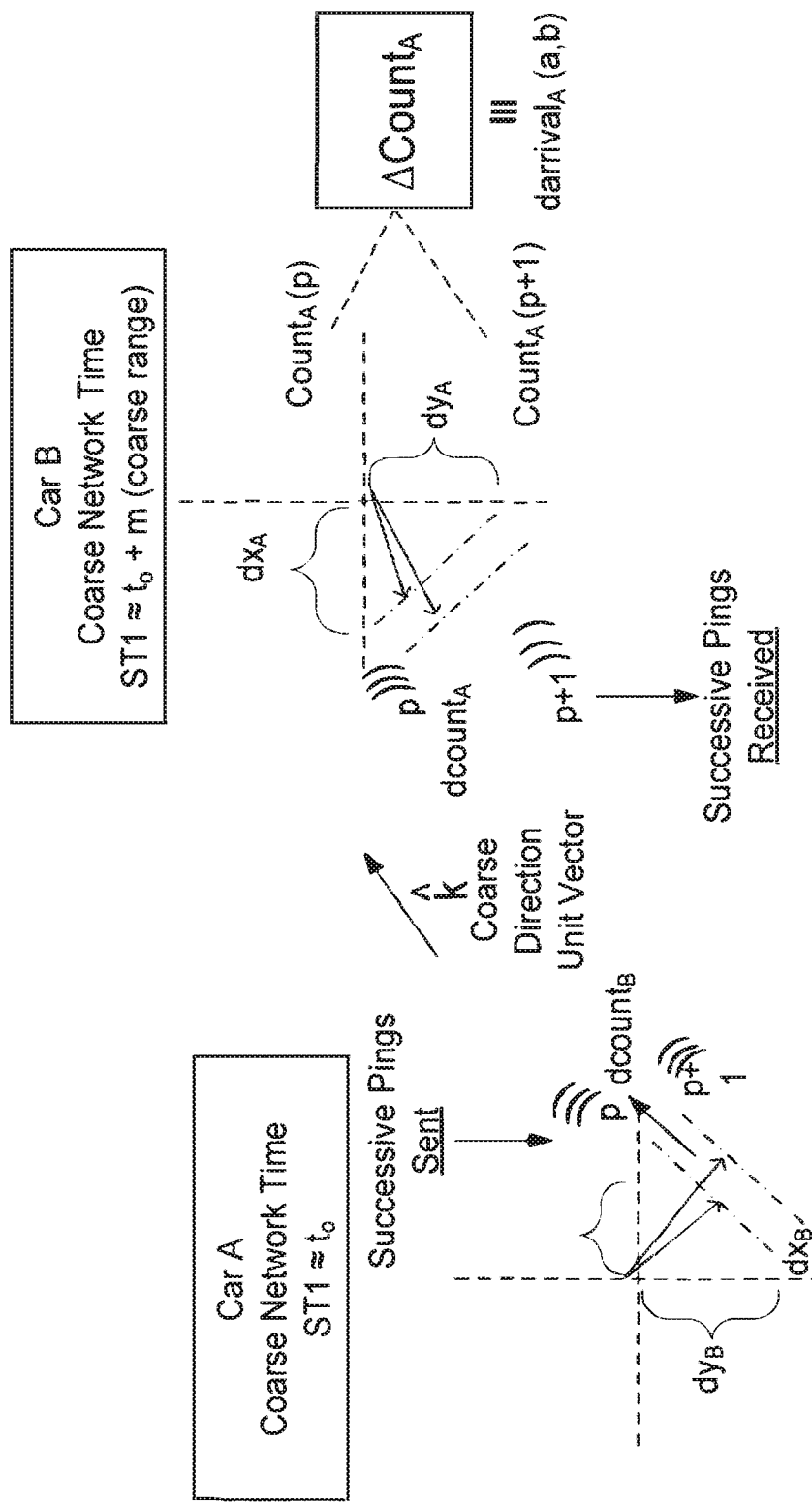
FIG. 8 illustrates the entities of the equation representing a receiving node count-stamping ping event initiated by a sending node.

Toward this end (practically transforming 'distance' into something useable), for the case of the cars, a two dimensional space is defined using 'change entities.' The introduction of two-dimensional space is represented by equation (2) and the accompanying graphic FIG. 8:

$$d\text{arrival}_A(a,b) = d\text{count}_A(a) - d\text{count}_B(b) + (dx_A(a) - dx_B(b))k_x + (dy_A(a) - dy_B(b))k_y, \quad (2)$$

in which the ddist variable of equation (1) has been replaced with familiar Cartesian x/y variables, k values, and subscripts indicating to which car the variable belongs. The primary Cartesian entities are the change in position within a two dimensional space tied to the instances of arrival of the ping by car B for car A and the sending of the ping by car A for car B. The minus sign in their combination is needed by inspection of FIG. 8. The equation appearing in FIG. 8 has a '(1/c)' constant in front of the Cartesian expressions; equation (2) instead places the relationship between space and time coordinates into the k values to keep equation (2) as simple as possible.

The subscripted k values are essential to two-dimensional and higher dimensional formulations of PhaseNet. This disclosure refers to the entity $k_{xy\_ab} = \{k_x, k_y\}$ as the "coarse direction vector" existing between car/node A and car/node B. The word 'coarse' is used because strict direction is only asymptotically defined, and yet direction can be utilized nevertheless. In its strictest form, the coarse direction vector is simply the starting estimate on a convergence sequence, but for all practical purposes, a small percent error in the direction vectors is trivial compared to error analysis.

FIG. 8 graphically depicts the coarse direction vector. With the introduction of coarse direction sectors, equation (2) can be interpreted to say that sequential differences in the intervals between arriving pings can be accounted for through six distinct entities: the same two dcount entities from equation (1), and four additional "spatial change" entities of the two nodes, tied to sending and receiving instances of the two. Each 2-D datum point has associated with it six metric unknowns. In three dimensions, one datum point will have ten unknowns: two counting-rate unknowns and 2×3 spatial change unknowns. At this point it can be seen that one of the main roles for the coarse direction vectors is to establish a Cartesian coordinate system such that motion can be resolved into two orthogonal components that make sense to both nodes (and eventually the entire set of nodes).

Mathematically, there is no reason to require interpreting spatial change with respect to a physical framework other than what is implied by equation (2). All ten of the cars can roam around, pinging each other, collecting data in the form of the left-hand term of equation (2), and then start to ask how the unknown entities on the right hand side of equation (2) can begin to resolve themselves as more data are collected.

Duplex Pings and Initial Metric Solutions

With reference to FIG. 3b, the baseline embodiment of the ten cars, when all ten cars have started to count, it is assumed all cars are in duplex communication with all other cars (although normal operation entails arbitrary configurations of duplex and monoplex links, as in the general case depicted in FIGS. 3a and 3b).

Each car listens to and records the other 9 cars' pings, yielding 9×10 or 90 pingforms that are then recorded. At the same time, there are three basic metric unknowns for each car, giving a total of 3×10 or 30 metric unknowns. Without consideration of data production rates and metric solution rates, the baseline embodiment uses a 3× over-sampling ratio as the set evolves. Each new connection adds two new pingforms to an otherwise constant network. Each addition of a new node adds three new unknown metric waveforms, and up to 2×(N−2) new data pingforms, where N is the number of previous nodes in the set. This gives a first taste of one of the primary mechanisms by which PhaseNet can enhance overall system precisions and accuracies through Metcalf-like networking principles.

Figure 9:
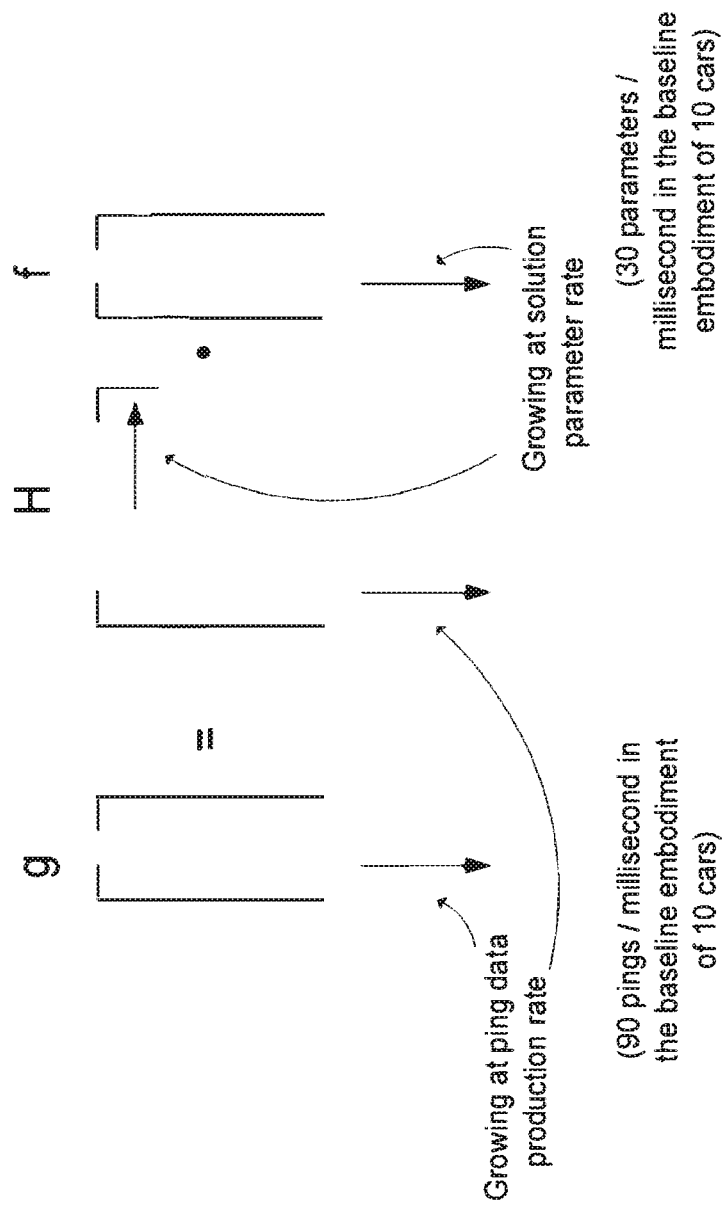
FIG. 9 illustrates the vector equation g=Hf representing the pingforms produced over time in accordance with the equation set out in FIG. 8.

FIG. 9 depicts how a set of 90 evolving pingforms can be recast in matrix a form, the right-hand side of equation (2) supplying as the coefficients in the matrix. This is a solvable matrix equation given sufficient data collection, after many seconds have elapsed. However, the matrix equation becomes impractical as the matrix size increases.

Figure 10:
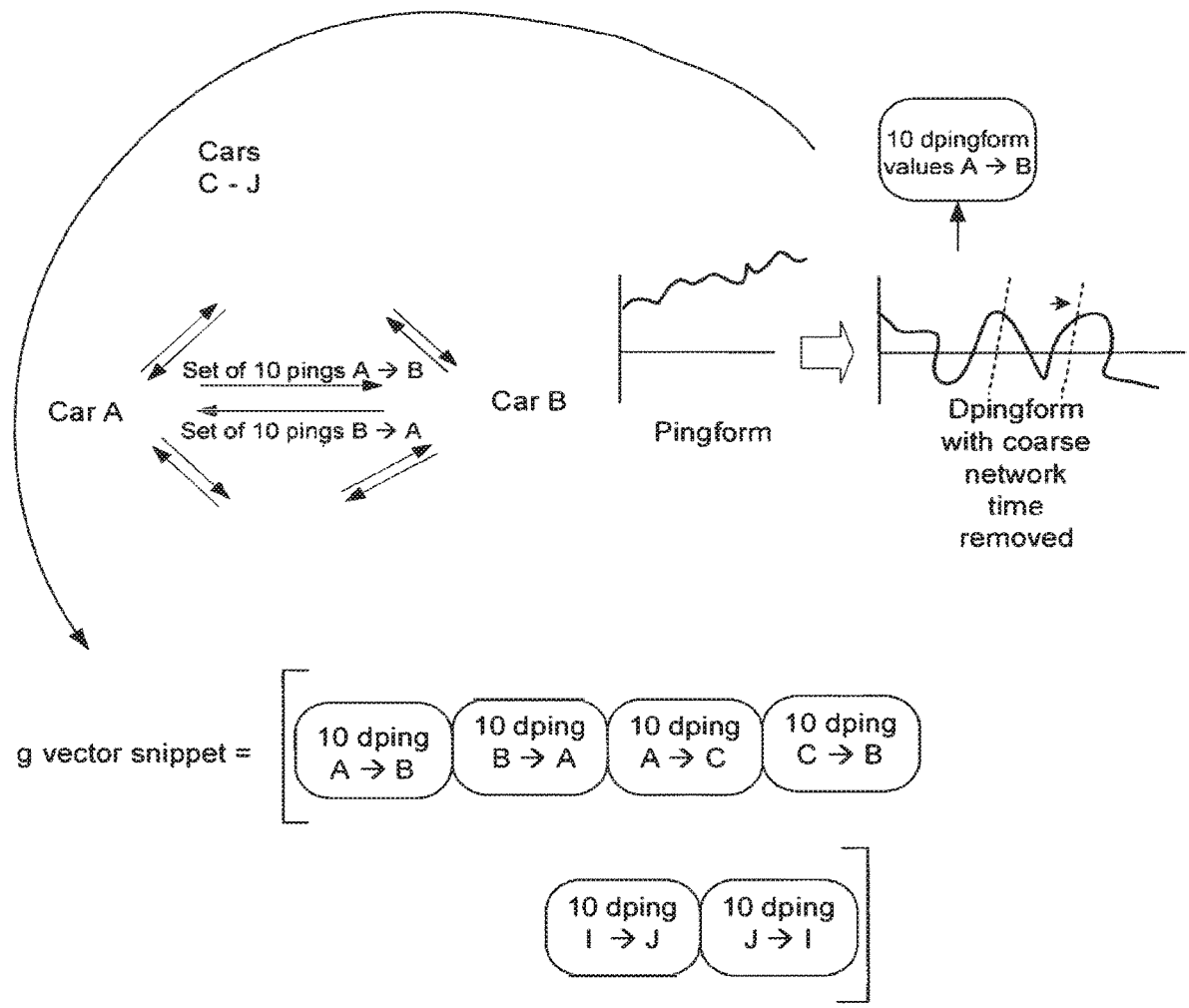
FIG. 10 is a diagram showing how pingforms transform into dpingforms that become entries into the g vector.

The simple form of the matrix equation relating acquired data to a chosen metric space is given by $$g = Hf, \quad (3)$$

in which the vector g represents the total number of ping-form differences collected, or dpingforms. FIG. 10 explicitly shows how the pingforms can transform into initially organized sets of dpingforms. There exist several choices of how to order the raw darrival values that make up the dping-forms.

One choice is to order the darrival values (vector g) in groups of 90, corresponding to roughly synchronous pings of the 45 duplex channels existing amongst the 10 cars/nodes. There is nothing inherently wrong with this ordering choice. PhaseNet organizes the g vector in short snippets of dpingforms, of a size equal to the length of the "harmonic block." In the baseline embodiment, this length is defined as 10 milliseconds or nominally 10 ping epochs for any given car/node. Most PhaseNet implementations will probably choose between 5 and 100 fundamental ping epochs per harmonic block, being a trade-off between, on the one hand, flexibility in dealing with different sampling rates on the chosen metrics, and on the other hand, inverting very large matrices. As computing resources continue to improve, the choice will slowly move beyond "100", as the pressure to worry about the size of matrices and the speed of inversions lessens.

Figure 11:
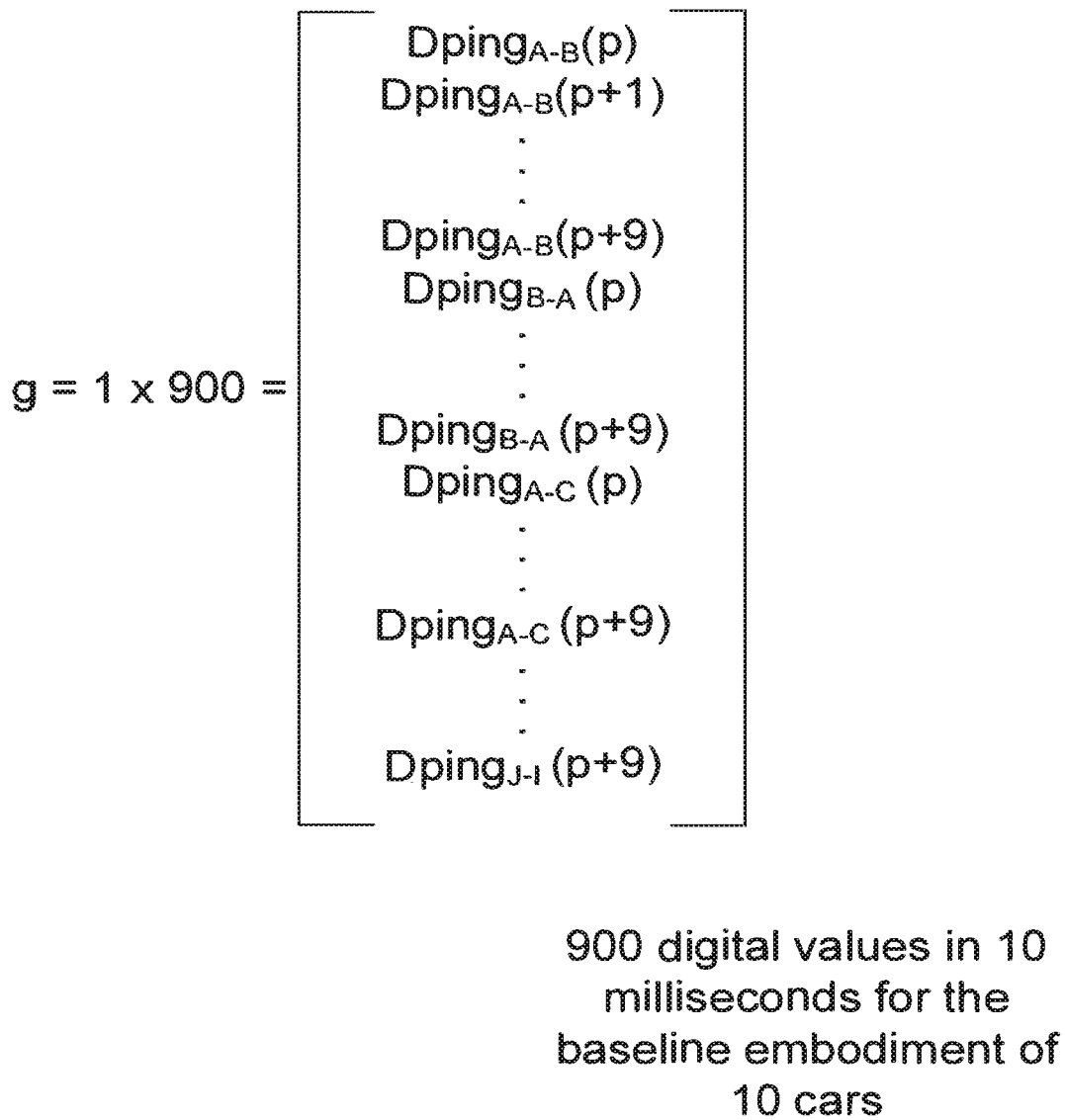
FIG. 11 depicts the organization in harmonic blocks of the data entries of the g vector presented in FIG. 9.

FIG. 11 explicitly depicts the chosen organization of the g vector of equation (3). Note that dpingform snippets are organized in duplex pairs first, followed by arbitrary sequences of duplex pairings. EM-based embodiments of PhaseNet will organize the duplex pairings according to a wide variety of criteria in which, mathematically speaking, any organization scheme is the same as another so long as the raw information contained in the collective dpingforms is present. Certain matrix inversion schemes, especially those that exploit sparse matrices, also factor into decisions on g-vector organization.

Figure 12:
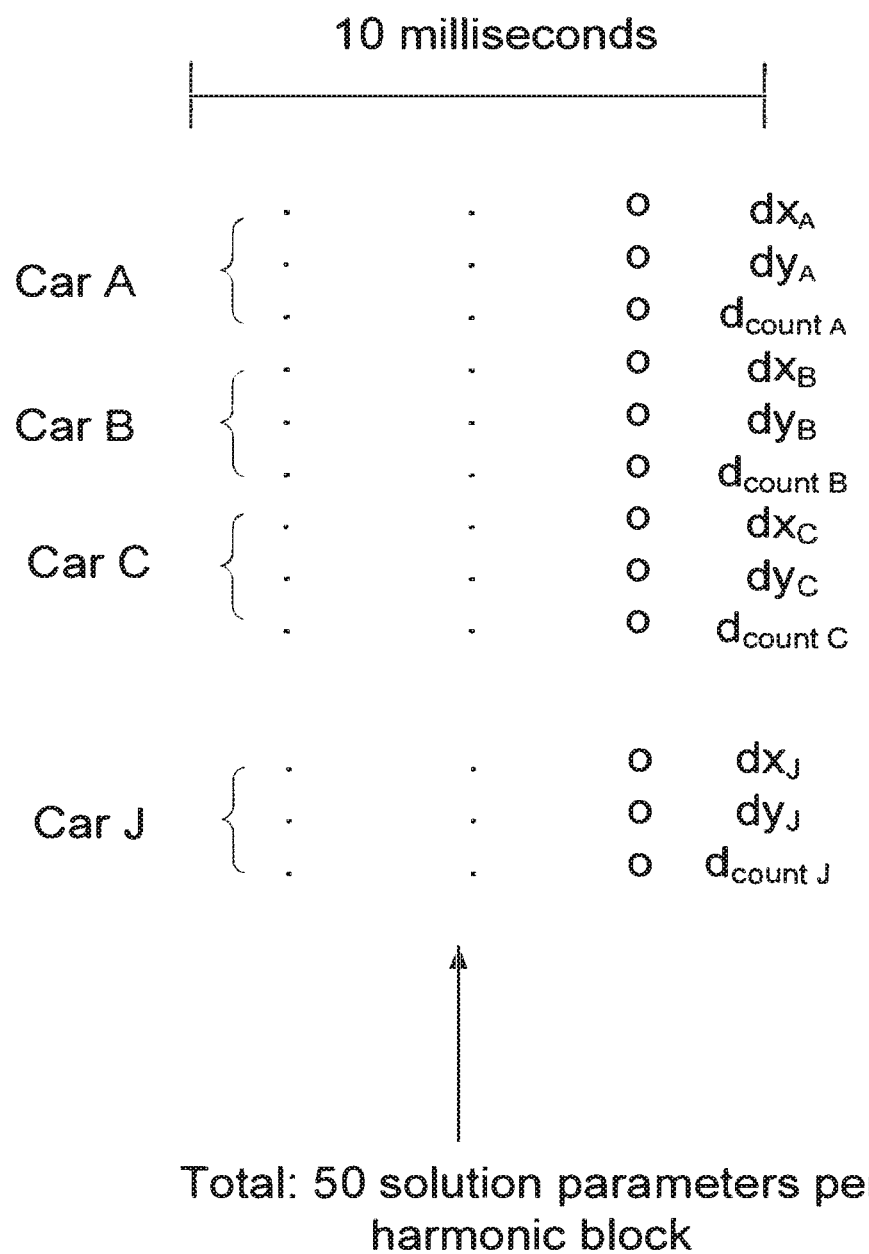
FIG. 12 is a diagram showing the pre-organization of the f vector presented in FIG. 9.

Vector "f" on the right hand side of equation (3) is the metric solution vector made up of the entire set of the right-hand-side variables of equation (2) (not including the coarse direction vectors, which will be discussed below) collected from the time that all cars started to record pings to the time when a solution snapshot is attempted with use of equation (3). FIG. 12 depicts one kind of pre-organization of this f vector. The "pre-organization" simply refers to the fact that the figure does not depict how this can become a 1×50 vector. One feature of this organization of the f metric vector is that the snippet lengths of the dx and dy solution waveforms are only two points for each harmonic block length, and the snippet lengths are only one point for each harmonic block for the dcount solution waveforms. The general PhaseNet principle thus illustrated is that metric solution waveform rates need not be matched to the ping production rate, and can in fact be any integral value within the harmonic block length. It also turns out that ping rates can be any integral number of pings per block, though in the baseline embodiment all cars have been chosen to run at 10 pings per 10 millisecond harmonic block.

The f vector is also ordered in an essentially arbitrary enumeration, with car A naturally coming first and so on.

Any given car then has 2×2+1 or 5 metric unknowns per harmonic block, while the g vector for that given car is producing 9×10 or 90 data points per harmonic block. There exists here another kind of over-sampling that is effectively the same as time-averaging or filtering signals in classic signal measurement systems. But with PhaseNet, one has finer control over how the raw data filtering is apportioned into solution vector error, with this example showing that there is a distinct difference between measurements on spatial changes relative to count-rate changes. This is intended to be a simple example, and mixed-rate solutions can become much more sophisticated in general EM-node PhaseNet configurations.

Figure 13:
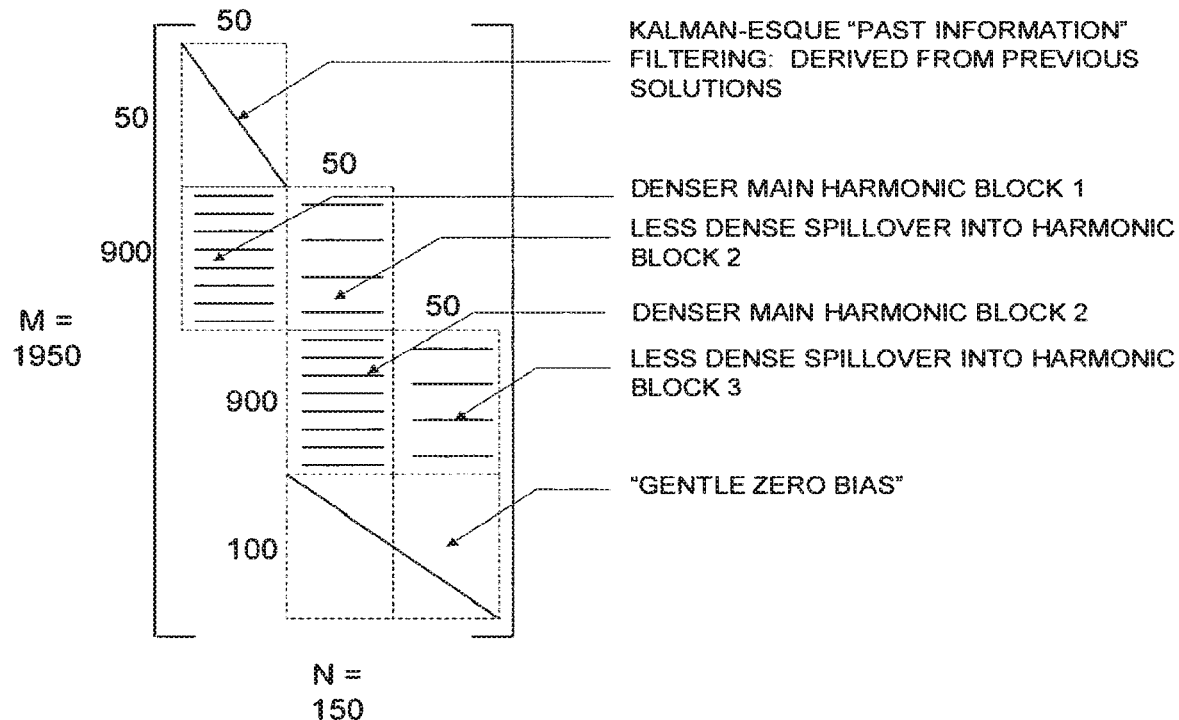
FIG. 13 is a diagram showing the organization of the H matrix presented in FIG. 9.

The H matrix term of equation (3), depicted in FIG. 13, can be characterized by relationship between the g vector and the f vector in equation (2), given the choices of organization of both vectors, with the following additional components: (1) the coarse direction vector k's; (2) stringing harmonic blocks together into larger matrix equations, covering longer periods of data collection; (3) keeping track of harmonic block spillover because pings are sent in one block and received in another; (4) anticipating that at least bi-linear interpolation is used in detailed implementations of equation (2), whereby a fractional count value ping receipt implicates at least two (if not three or four in cubic interpolation) solution parameters; (5) one preferred form of dealing with the "past" frayed edge, whereby Kalman-type filtering information is explicitly applied as an input into the main H matrix equation as a strong bias on the next solution epoch; and (6) a symmetric but very different preferred form of handling the "future" frayed edge, whereby a small zero-bias is added to new solution parameters that are being introduced but barely sampled, in which the zero bias will eventually be orders-of-magnitude overwhelmed by actual data-based sampling in the ensuing harmonic block epochs. This latter zero-bias is akin to straightforward low-pass filtering, designed to be much less than 1 dB of signal measurement attenuation, yet still providing useful matrix singularity regularization properties.

FIG. 13 thus depicts two complete harmonic blocks' worth of the "launched ping" perspective of an H matrix, giving 1950 equations that include the double frayed edge pseudo-equations, and 150 parametric unknowns. For the sake of keeping FIG. 13 as simple as possible, it should be noted that there is an inherent assumption built in by having only one block of ping spillover: all cars are within a three meter radius when they are functioning. This is ultimately not going to be the case when the cars are let loose, and the spillover blocks will thus become N, with N×3 meters being the outside radius of the longest dimension in the gymnasium. The importance of the zero bias term on the future frayed edge can be better appreciated when considering this more typical situation.

According to basic statistics, two harmonic blocks occur in 20 milliseconds, each block containing 90×10 or 900 dping data points as well as 10×5 or 50 solution metric points. Putting both blocks together, the 20 milliseconds of data collection creates a 1,950×150 sparse matrix, that can be solved to measure the space-time characteristics of the cars during that 20 milliseconds. This is a reasonably sized matrix to invert, provided inverting it at a rate of "many-times-per-second" is not required. The section on H-families and inversion explore this specific topic further.

Metric Solution Challenges

One challenge is that the matrix H in equation (3) is always singular because it is formulated initially using only rows derived from equation (2). Consequently, the matrix H is non-invertible and theoretically there is no single solution, f, to equation (3) but rather a multi-dimensional sub-space family of solutions. One illustration of why equation (3) must always be singular is as follows: all counters on all ten cars speed up at a rate proportional to their distance from the average location of the ten cars, while at the same time all the cars begin to uniformly move away from the center of the ten cars at a rate also proportional to the distance from the center. The dpingforms are then identical to the case where all the cars are standing still. There are other such interesting singular modes. It will be seen that this challenge is quite manageable using Moore-Penrose type matrix solutions as well as general Singular Value Decomposition (SVD) analyses of the H matrix, along with appropriate "external knowns" applied to how the singular properties are regularized. Kalman-type filtering as well as the gentle (i.e., small) zero bias are designed to provide band-aids to this singularity issue, but the main thrust in handling it comes from explicit singularity-mode regularization.

A second challenge is referred to as the "double frayed edges" problem that is evident in equation (2), effectively a row in the matrix. At the start of the one second within the first harmonic block of pings, all cars are recording pings from prior harmonic block epochs, and in the last harmonic block, pings have been sent out from the cars during that epoch, helpful in solving the metric parameters of that epoch, yet the pings have not yet been received and recorded by other cars and hence have not been included in the two primary harmonic blocks. Several approaches to managing the double frayed edge challenge will be presented, with the preferred approach already alluded to in FIG. 13, rendering the challenge to merely a source of quantifiable residual error in solutions. Those skilled in the art of error estimation can refer to Fisher information matrix analysis and eventual Cramer-Rao bound analyses, an exercise that is achievable in a PhaseNet formulation, but becomes more complicated once details of "past epoch" and "future epoch" treatments are properly considered.

A third challenge is the simple but nevertheless subtle interpolation issue when mixed rates between data production and solution point production are used. The metric solution waveforms within the f vector are discretely sampled on the one hand, but are effectively representing a band-limited pseudo-continuous wave on the other hand. As in classic digital signal processing, sequences of digital samples are viewed as Nyquist-band-limited sinc functions, linearly combined. The practical import of this is that certain interpolation methods must be used in constructing the H matrix, which tends to add non-zero elements to the H matrix, making it less sparse.

A fourth challenge that is not necessarily contained in equation (3) but is almost always present in any practical application, is how to situate the resultant f vector in an agreed framework. This challenge is the subject of an entire section below. In summary, a wide range of options exist that are fundamentally incorporated with the PhaseNet protocols. The H-matrix organization of FIG. 13 does not require such external framework considerations to compute the snippet pseudo 20 milliseconds worth of differential space-time solution.

A fifth challenge is that space-time solutions are formed not for merely twenty milliseconds but for an indefinite time period. Given the double frayed edge challenge, a preferred solution handles network initialization non-uniformities on the one hand, and as time progresses, collects enough information to make snapshot solutions for past epochs of the overall network. GPS engineers will note a similarity with what motivated the introduction of Kalman filtering, first explicated in 1960. Kalman filtering plays a strong role in optimizing PhaseNet solutions, extended to mixed-rate, mixed-epoch interacting waveforms as opposed to the more familiar advancing and discrete system-state formulation.

A final highlighted challenge is that all the cars move, and links between cars are always changing. This means that the H matrix must adapt in time to the coarse geometric configuration of the network, including the existence and non-existence of the ping-links between the nodes themselves. This particular challenge gets to the heart of the adaptability of PhaseNet to ever-changing conditions, including, but not limited to, link existence, link quality, network configurations, mixed technologies, fluctuating precisions, and coarse vector changes beyond pre-set specifications.

From Raw Solutions to Structured PhaseNet Solutions

For the baseline embodiment of the ten cars in the gymnasium, despite the challenges presented above, pseudo-inverse solutions to equation (3) can be obtained on the blocks of data and the overall procedure applied one epoch to the next, resulting in dynamic (motion) solutions of the cars relative to one another and the individual counting rate variations relative to one another. There are large matrices involved that generally require re-inversion every few seconds because of range and coarse direction dynamics. The matrices do require regularization in their pseudo-inversions, which adds a small amount of overall error to the solutions, but it works. This may even be called the raw PhaseNet solution. It has at least organized the data collection and solution formation in reasonably complete terms.

The central PhaseNet challenge, which this disclosure addresses and fully meets, is to turn the raw information content inherent in the data collection procedures and the metric solutions outlined in equation (3) into universally scalable protocols, shared structures, hardware-agnostic procedures and modular algorithms. The term "plug and play" comes to mind. From cars on a gymnasium floor using audio communications to space probes using laser communications, a generic PhaseNet enabled node should cooperate with any other PhaseNet node or network of nodes, and together form optimal space-time solutions. The raw mathematics falls into line once a PhaseNet foundation is in place.

To attain the necessary universality of functionality between applications and physical instantiations, time-positioning approaches including differential GPS, WAAS, e-911 cell location, blended navigation methods using INS and/or accelerometers, precision timing and navigation approaches and two-way time transfer methods may be fully described in PhaseNet topological terms, enhanced through PhaseNet networking principles, and extended by using PhaseNet shared protocols. Translating existing methods into PhaseNet architectural terms and structures requires understanding how pings, pongs, and pungs are accomplished in any particular prior art system, followed by how existing algorithmic solutions relate to the predictive PhaseNet solution families and the asymptotic PhaseNet solution families. A properly constructed PhaseNet architecture accommodates existing mathematical approaches. If it requires extension or modification, it has not been designed properly.

This last point is possibly the most subtle yet important distinction between PhaseNet and prior art approaches to space-time calibration: PhaseNet is designed to be a general network operating system for specific space-time calibration approaches, including GPS, DGPS, and its related systems. Productization of the space-time calculating engine found in GPS receivers, combined with a counter, replete with generalized information source inputs and solution family outputs, is an important difference between PhaseNet and existing methods. A GPS receiver contains a sub-unit that routinely collects signal information and cranks out space-time solutions, while a "PhaseNet Core," be it software or hardware or any combination thereof, performs the same function for any device that communicates (or just listens, e.g., a GPS receiver itself). The product of PhaseNet is this universal core, often referred to here in this disclosure and elsewhere as a Space-Time Calibration Unit or SCU.

The Generic Space-Time Calibration Unit: SCU

Figure 14:
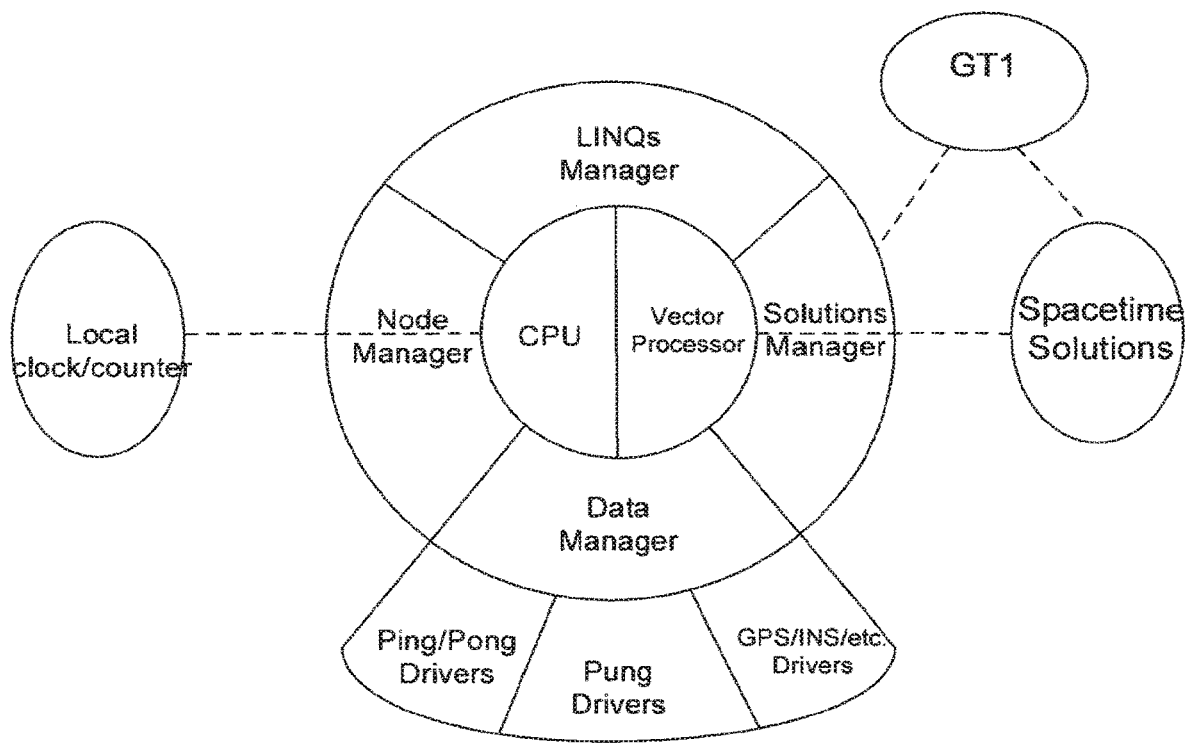
FIG. 14 is a general block diagram showing major components of a space-time calibration unit that performs the operations for generating solutions of the vector equation presented in FIG. 9.

FIG. 14 depicts an SCU at an abstracted high level. To the extent equation (3) is the most abstracted core of the mathematics of PhaseNet, designed to be independent of the supply of data through the g vector, the SCU is independent of the mathematics or algorithms chosen for its inner workings. As it is fundamentally industrially-scalable, utilizing equation (3) as a core numerical engine is merely an option (though one almost always chosen in practice). One could equally choose a chemical sniffing engine (as a linq) to detect being within a few kilometers of a hog farm (ping data that feed the algorithm inside the solutions manager), or a wireless access point proximity engine to provide coarse proximity information to a node, as opposed to explicit metric space solutions. In this sense, PhaseNet is designed to be a blended all-source space-time core, using familiar jargon in both GPS circles as well as existing wireless device locations. The job of the SCU is to gather all bits of space-time information it can find (generally managed by the data manager and the spade work done by the lower drivers), and to calculate predictive and asymptotic space-time solutions that can be shared with other nodes. The architecture it uses to do this begins with the structures described in the next section.

With reference to FIG. 14, on the far left is a local clock and/or counter that may or may not be a physical part of an SCU. Certain PhaseNet applications do not require a local clock or counter to be present, where one is essentially imputed to the Qlocknode through shared external processes, but the baseline embodiment prefers a local counter. On the far right is a circle representing the ultimate space-time solution outputs that the SCU produces, along with an upper circle labeled "GT1" standing for Global Tone 1. GT1 represents an explicit attempt by a given Qlocknode either to steer its local clock toward some shared network standard (which may also coincide with GPS time or UTC), or to keep track of the drift of its local clock from that shared network standard. It is referred to as a "tone" because of historical attempts to maintain certain shared frequency standards, such as the classic 5 MHz tones typical of cesium clock network coordination, or the familiar dial tone on land telephone lines. The "tone" itself, is asymptotically defined for the past and can only be approximated in "present" realtime.

The core circle in FIG. 14 is split into the typical housekeeping and low level activities of a generic CPU (whether dedicated to the SCU or borrowing an external CPU), and the time-critical calculations best typified by "vector processors," which performs highly pipelined additions, multiplications, and other operations on series of binary values.

The outer circle surrounding the core is split into four parts. These outer circle sections are referred to as "managers" in that there exists a wide range of options for how to physically instantiate them. Below, the baseline embodiment implements these managers as processing loops with associated high level structures managing the data within the loops.

Finally, the truncated second outer circle in three sections are the drivers for collection and communication of raw and processed data, including interfaces and data exchange with instruments and systems, which are largely self-contained instruments computing their own space-time calibration functions, with the most common type being a GPS receiver.

Universal PhaseNet Data Structures

The architecture of both hardware and software SCU's is built around the PhaseNet "Qlocknode" or just "Qlock" structure, or "qlockstructure." These terms are intended to highlight participation and specific attributes within a set or group of cooperating PhaseNet nodes. The "q" on what otherwise would be "clock" highlights that the SCU/PhaseNet structure counts like a typical clock, but it does so explicitly within a network of other such counting nodes using shared communication protocols.

A key engineering notion associated with the qlockstructure approach is that an arbitrary dynamic network of disparate communicating devices shares a common geometric and computational framework in order to be interoperable and scalable. To be truly scalable across spatial scales from intra-CPU circuitry through cis-lunar communications networks, all nodes at some level share pre-agreed structures and dynamic communications protocols inherent in those structures.

The following paragraphs step through the Qlock hierarchical structure, or qlockstructure: using a Matlab type formalism, the following is the top tier organization of the Qlock structure:

```
% base template for all qlocks
Qlocknode = struct(
    'info', info_struct,
    'data', data_struct,
    'solutions', solutions_struct,
    'linqs', linqs_struct)
);
```

To participate in a PhaseNet network, a component, device, instrument, or vehicle either instantiates this structure itself or, in the case of components or devices streamlined to collect and transmit ping data, or non-cooperative objects such as radar targets, have this structure located within the network. In other words, no matter where this actual data structure is physically located, all PhaseNet nodes have this basic structure.

Stepping through the Qlocknode structure begins with the name itself, which in C/Matlab code instantiates a generic data structure conforming to the text fields and sub-structures inside the parentheses. This formalism associates four broad and multifaceted sub-structures with the text fields just before them, each of which is described herein. These sub-structures are designed to continually evolve as usage models extend, and furthermore, it can almost be anticipated that the number of core sub-structures will increase beyond four once actual industrial-scalability occurs, i.e., wide deployment of PhaseNet-enabled systems is expected to put pressure on clarifying and expanding even the highest level of PhaseNet organization.

Initially, the four sub-structures are: node specific information, the Info' text field and its associated info_struct; raw data information that is being collected and shared, dominated by D3P data and rolled up in the data_struct structure; all information associated with space-time solutions or other information derived from the 'data,' stored in the solutions_struct with the text field 'solutions'; and finally the broad category of information associated with communication links between nodes, network topographies, real-time cooperation tracking, and even such items as the status of the availability of alternate information sources such as compass data, inertial navigation unit data and the like, all going under the text field 'linqs,' indicating a PhaseNet-defined relationship between a node and the external world. The 'linqs' field is the structure most likely to be expanded quickly into major sub-fields for any given PhaseNet application.

Stepping through the four substructures at the next level of granularity begins with the info_struct structure as it exists within the baseline embodiment:

```
info_struct = struct(
    'static', static_info_struct,
    'dynamic', dynamic_info_struct
);
```

There remains a high level split in data between node information that remains stable through the node's lifetime and is an inherent property of the node, and node data that is a dynamic operational characteristic of the node and its evolving relationship to the network the mode finds itself within. This split becomes clearer by looking at the constituents of node information:

```
static_info_struct = struct(
    'name','nullstring',
    'static_ratings',component_ratings,
    'category','robotic car',
    'type', '2D-4DOF',
    'mobility', 'slow moving',
    'qlock_data', qlock_type_and_data,
    'num_comm', num_comm_terminals,
    'num_noncomm', num_noncomm_sources
);
and...
dynamic_info_struct = struct(
    'current_status',current_status,
    'dynamic_ratings', dynamic_ratings_data,
    'current_framework', framework_rating,
    'current_harmonics', curr_harmonics,
    'clock_steering', clock_steering_history
);
```

In the baseline embodiment, some of these fields are not necessarily used, or their values are uniform across the entire set of cars. The idea behind these structures is that the same templates are used across all PhaseNet applications and hardware configurations. One important type of data, referred to as 'ratings,' relates to the quality of data and solutions associated with a given node and what it can contribute to the network. In many ways, this concept is akin to error analysis, though in PhaseNet it becomes more explicitly part of network solutions and the 'weighting' of input sources as a function of their perceived quality (both static and dynamically quantified).

The qlock_data field in the static structure identifies precisely what type of counting this particular node performs, including information on clocks on-board the node or accessible to the node. The qlock_data field also has inherent quality information about the local clock, to what extent precision oscillators are used by the node, and the oscillators relationship to the clock and to digital counters, if applicable.

Another concept within the dynamic structure, encapsulated by a still-broad framework_rating data structure, relates to the ongoing relationship and error estimation between a node and one or more external standards to which it subscribes. A very common situation is a given node's relationship to the GPS framework, for example, or more simply a node's latitude, longitude, (and altitude) relative to Earth coordinates. The specific dynamic information contained in this field relates to higher level relationships between a node and these external standards, while real-time error estimation of the actual solutions within these frameworks is contained within the solutions structure.

Another data field is the 'harmonics'-type data, which contains high level information regarding ping rates, solution rates, harmonic block configurations and how the node organizes its data input to solutions output relationships both internally and within its local neighborhood.

The clock steering field may range from a null value indicating no clock steering is used to a very complicated sub-structure replete with a past record of steering the local clock to maintain rough synchrony with either a local network of clocks, or some external standard such as UTC (Universal Coordinated Time in its French acronym form). PhaseNet is designed to not require any clock steering, inasmuch as one of the main solved metrics is the difference between a local counter and some external standard such as UTC; it is often convenient to gently steer all clocks to some globally accepted standard such as UTC or GPS time (which itself is generally steered toward UTC).

With reference to the second of the four main substructures:

```
data_struct = struct(
    'pingforms', pingform_data,
    'pongBuffer', pong_data,
    'simData', simulation_data % used on for simulations
);
``` data_struct is deliberately simple in the baseline embodiment, keeping the raw data structures to an efficient minimum and being explicit about some of the interim data structures in forming full harmonic block solutions (e.g., dpingforms, which are informationally equivalent to pingforms).

The pingform_data structure contains all of the raw information collected by the node through listening and count-stamping ping arrivals from other nodes. In the case of information sources such as, for example, speedometers and INS information, raw data outputs from these devices, as count-stamped by the node's local counter, would have similar raw data structures. The pingform_data structure is essentially what is behind the waveforms in FIG. 6. It is shown later that these data buffers are ring buffers that only capture recently acquired data, that is discarded once the solutions are determined.

The pongBuffer text field, together with its associated pong_data data structure, is a communications buffer for the digital 'back-channel' data that this given node communicates to other nodes. Though they can have a variety of components and properties, pong data is considered 'raw data' in that nodes require receiving these pong data before they can form asymptotic solutions. It is thus a kind of shared raw data. One main property that distinguishes pongBuffer data from pingforms is that pingform data is compressed before placing it into the pongBuffer, so that pong communications are maximally efficient from an information standpoint. In general, pingforms are meant to be "oversampled" in time, meaning that ping sampling is at a rate sufficiently higher than the rates of system variations being measured such as spatial movements and counting variability. Thus a reasonable compression of data can occur by filtering raw pingform data and using lower bandwidth waveforms (further apart digital value time spacings) to represent the acquired pingforms within the pongBuffer data structures. Later sections will show how this operates in situ.

The 'simData' text field, together with its associated structure, exists only for a car simulation and would not be used in actual operation of the cars in the physical world. The simData structure is meant to contain "truth data" that would plot the courses of simulated cars, as well as contain simulated variations in counting between cars. This simData could then drive mathematical models of how the cars move about, communicate, produce data, and eventually create solutions. The solutions would be compared against the original simData, and error analysis could then be performed on the raw PhaseNet operations and algorithms. This simData structure as outlined here cannot incorporate by reference a physical demonstration.

The third of the highest level sub-structures is:

```
solutions_struct = struct(
    'nominal', current_estimate,
    'current_H_inverse', current_Hinv_struct,
    'local_harmonic', local_harmonic_solution,
    'global_harmonic', global_harmonic_solution,
    'asymptotic', asymptotic_solution_family,
    'ratings', self_rating_data
);
```

Though this baseline embodiment has five elements in this particular example of the solutions_struct, there are three basic types of solutions: 'nominal,' 'harmonic' and 'asymptotic,' with an additional 'ratings' data structure that will contain self-rating (as well as local-group-assisted self-rating) information on the estimated quality and reliability of the solutions being produced by particular node.

The 'nominal' solution is meant to encapsulate virtually all modern state-of-the-art methods and algorithms that attempt to calculate time and position of an object in pre-metricized space-time systems such as GPS. In short, a given node has a given estimate of its absolute position at a given local moment (as defined by its clock) when it sends out a ping, a second receiving node receives this ping at some point in absolute space, and straightforward "pseudo-ranging" solutions are formulated. Time and position are treated as absolute quantities with a notional error metric attached to those quantities. Straightforward geometry, dominated by triangulation and angle measurements, drives nominal solutions.

For many applications, including well-behaved examples of the baseline embodiment, the nominal solution is sufficient to meet given time and space accuracy specifications, especially when one or more nodes have been given very high accuracy ratings, effectively becoming a "master reference," as is common in many existing systems. Systems wherein the nodes are closer together than one ping-time see that the nominal solutions are often close to the more fully constructed asymptotic and harmonic solutions. The scalability of PhaseNet will put a pressure on ping times to speed up over the years, thus shrinking the spatial scales over which nominal solutions are very close to asymptotic solutions and attempting to increase the time-bandwidth with which a given node's phase noise is being measured.

The 'harmonic' solution type is the raw solutions to equation (3), as regulated through pseudo-inversions stored in the H_inverse structure, and other ad hoc methods. These solutions, at least in the baseline embodiment, are in terms of variations in the system from moment to moment, tracking spatial movements, count variations, atmospheric variations, and instrumental delay variations. These solutions also are explicit in dealing with mixed-epoch interaction of waveforms, in which absolute space-time coordinate solutions similar to the 'nominal' solution family become quadratic formulations, which complicate the implementation of equation (3).

The harmonic type is split into local harmonic and global harmonic. The primary distinction between local and global is that in the local harmonic case, a small number of nodes form local groups and produce self-consistent equations of the form of equation (3) which can be solved for very short-term variations as a small group. In the global harmonic case, aggregations of many nodes take some time to gather pung data for the entire set, and the resultant matrices are therefore rather large. Most applications form local harmonic solutions, while higher precision systems and "standards-oriented" systems use a global harmonic solution approach. In the baseline embodiment of ten cars, an example of the difference between the local and global harmonic solutions is given below.

Finally, the 'asymptotic' solutions are effectively the post-hoc syntheses of the nominal and harmonic solution types. To the extent GPS receivers, speedometers, compasses, and INS data are data sources as well, the asymptotic solutions are where the "all-source, mixed-epoch, hyper-blended solutions" are formulated. Certain existing approaches in particular applications apply information blending principles to 'nominal' solutions on a case-by-case basis.

PhaseNet protocols and the resulting asymptotic solutions attempt to hardwire the all-source information into the short-period harmonic blocks, thus not only including such information in the variational harmonic solutions directly, but also helping to handle intermittent sources that are nevertheless useful during the scattered moments when they are providing information.

The baseline embodiment presents examples of these three basic types of solution, their relationship, and how different applications utilize different aspects of the various solutions.

The 'self ratings' text field and associated data structure is straightforward conceptually in that it attempts to associate an error and/or accuracy estimate with one or more solution types, generally on a harmonic-block by harmonic-block level basis. It is in effect the real-time error-bar plot of the solution(s). This data structure has an important role, however, in that the ratings data structure is used both as a binary gate when another node decides whether or not to include data generated by this node, and if so, how much to rely upon and weight the data generated by this node. The self-rating data becomes an active data structure primarily within the asymptotic solutions, but also in the harmonic solutions as weighting factors on the data, or even the gate on whether certain rows of the H matrix of equation (3) exist or not.

The fourth and, for the baseline embodiment, last main sub-structures is:

```
linqs_struct = struct(
    'linq_list', current_linqs,
    'linqweights', current_linqweights,
```

```
'linqvectors', current_linqvectors,
'RRQ_table', current_RRQ,
'local_solution_groups', local_group_data,
'regional_topology', topology,
'topology_graphic', current_topology_graphic,
'H_family', H_family_struct,
'external_frame', reference_frame_linqs
);
```

The linqs_struct is possibly the most important and wide ranging structure within the PhaseNet core set of structures. It contains all the information necessary to relate a given node to its external world and all the space-time information sources available to the node, in real-time and changing as the node changes according to its environment. The term 'linqs' encapsulates this interface between a node and all other nodes (its environment). The q in "linq" highlights its interaction with all other nodes or its environment with a PhaseNet protocol: sending out pings, receiving pings, count-stamping pings and other events such as pongs or natural beacons, storing information in pung packets, and communicating those packets. Perhaps the most important aspect of the linqs_struct is its ability to track and characterize node to external world relationships approaching ping rate and harmonic block rate bandwidths, as highlighted by the RRQ (Riccian-Raleigh-Quality) table. The RRQ table illustrates how networks of nodes handle an environment subject to echoes and jamming such as a battlefield or an urban core. This characterization of a ling or duplex linq at the millisecond and finer level is sorted by line-of-sight versus scatter criteria and signal-to-noise ratio. The RRQ may be refined according to the adaptability of PhaseNet and its ultimate scalability to any environment.

The overall organization of the linq_struct is closer in type to how network layer software keeps track of ongoing network connections and configurations than it is to the mathematical type of the solutions_struct, the raw data storage type of the data_struct, or the identity and properties description type of the info_struct. These differences in type largely drive the categorization of the four primary sub-structures.

The 'linq_list' structure is simply the list of both active and potentially active sources of information to the node, while the 'linqweights' structure represents the binary or weighted status of each one of those listed linqs. FIGS. 3a and 3b previously described are graphic depictions of what a typical linqweight looks like. This graphic linqweight as depicted is a binary 'on/off' indicator for a ling in question, though this could easily be a realtime weighting value driven by the quality and/or reliability of the linq at a given instant.

The 'linqvector' data structure is fundamental to forming equations like equation (3). It contains the coarse direction vectors (the k's, in equation (2)), as well as coarse range values. The coarse range values assist in interpolations within the multi-epoch waveforms.

Figure 15:
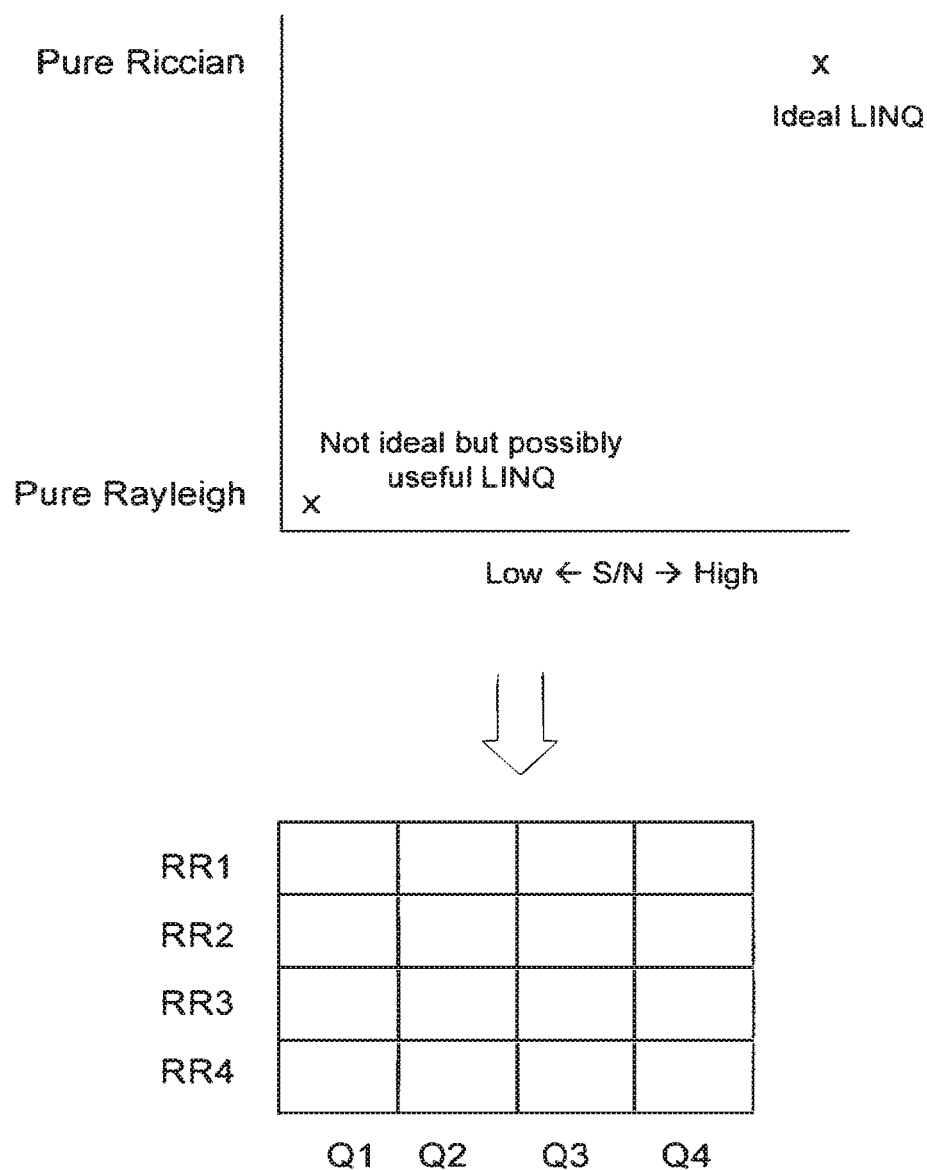
FIG. 15 is a diagram illustrating aspects of Riccian-Raleigh Quality for networks of nodes.
Figure 16:
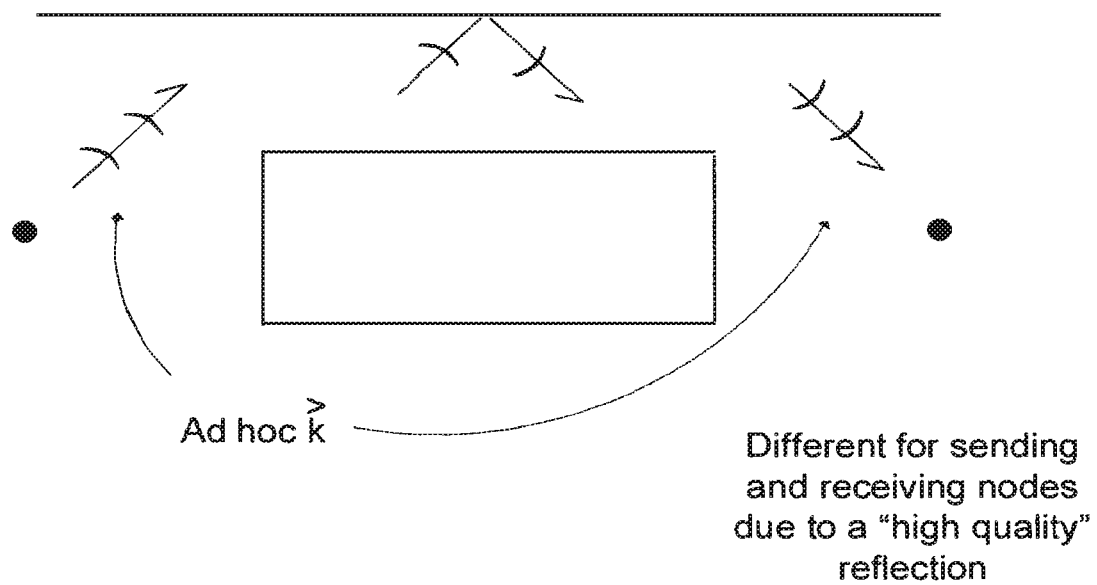
FIG. 16 is a diagram depicting a high quality ping reflection event.

Both the linqweights and linqvector data structures are simplified forms of the RRQ table. FIG. 15 introduces on the left a kind of 'analog' idea behind the RRQ table where pure Riccian channels (e.g., a line of sight communication, such as a laser communication channel) is at the top of the vertical axis and a pure Rayleigh channel (such as cosmic background radiation) is at the bottom, while straightforward signal to noise ratio is the horizontal axis. The right side of the figure introduces the more practical aspect of the table itself with definitions of the tabular rows and columns to be determined at one level as a PhaseNet-application-wide set of guidelines, but also to be refined for given specific implementations of PhaseNet. Notably, the Q axis can be much more than just signal to noise ratios, where for example a channel that might have several echoes (delay times for the arrival of signals in a packet-based protocol) may nevertheless have a cleanly defined geometric property or echo. FIG. 16 attempts to show such a situation, where an obstruction is introduced between one car and another, yet through group cooperation, the two cars can determine that an "ad hoc coarse k vector" can still produce good information on differential spatial movements of the two nodes. The 'current_RRQ' is thus a structure that holds this kind of sub-second realtime information about the state of the linq and any necessity to modify k-vectors; it can also help determine the weighting of a given linq in the solution roll-ups. For jammed battlefields and echo-rich urban cores, the main engineering tasks and refinements are those inherent in the RRQ data structure and its relationship to pings and harmonic blocks.

local_solution_groups' is a higher level logic structure that attempts to understand local relationships between communicating PhaseNet nodes and how "closed form" solutions can be formulated in tightly defined groups of nodes. This structure contains data describing which nodes are connected, and through what collection of pings and pung packets, can harmonic (or nominal) solutions be formed. This generic structure is designed to be dynamic, tracking rapid re-configurations and possibly even changing from harmonic block to harmonic block. Local_solution_ groups also keeps track of the unique status of certain nodes in local groups that have calibrated or "server-like" properties, or even simply a stand-alone GPS receiver with rudimentary or 'wired' (non line-of-sight) communications capabilities. 'Local_solution_groups' is primarily aimed at supporting and recording the wide variety of local harmonic solutions that can be formed; 'regional_topology' is a broad type of data structure similar to local_solutions_group, but primarily aimed at supporting asymptotic solutions and large PhaseNet networks. It still is geared toward forming variation solutions of the equation (3) type, while keeping track of raw network topologies that ultimately will be grounded in globally accepted standards and frameworks. Closely related to 'regional_topology' is the 'topology_graphic,' a structure that is an intuitive aid to programmers and PhaseNet users who wish to visually understand the status of a given Qlocknode, its available active linqs, and its relationship to an external network. It is anticipated that though the topology graphic may not be of use to the data loop operation or the solution loop operation, it will nevertheless become an important structure for programmers and users.

'H_family' is a structure that may possibly be placed inside the solutions structure next to the H_inverse structure, but in the present case it is placed in the linqs structure. The constantly changing network topologies and local group combinations/detailed geometry may encourage reformulating the H matrix in equation (3), and then inverting the reformulated matrix. Such a requirement would drastically increase processing demands. Instead, closely associated with tracking current and evolving linqs, more slowly varying 'families' of possible H matrices are tracked within the linqs structure, with particular H inverses then removed from those families and placed into the solution structure for tighter-loop operations.

The last data structure named 'external_frame' is meant to encapsulate the details of how a given node connects to an external space-time framework, e.g., the GPS frame. This can be as simple as the singular data structure, which effectively says "my close neighbor node, node Z, has a very good GPS receiver and I'm simply going to steal its values", or as complicated as many sub-structures in a precision PhaseNet node that is cooperating with many other precision nodes attempting to support precision time transfer and data exchange between space-time calibration sites.

The PhaseNet structures outlined above are meant to provide a functional starting point for the baseline embodiment as well as highlighting a few items that go beyond the needs of the baseline embodiment (included because they are fundamental to almost all PhaseNet embodiments and applications).

Active Versus Passive Qlockstructures

Figure 17:
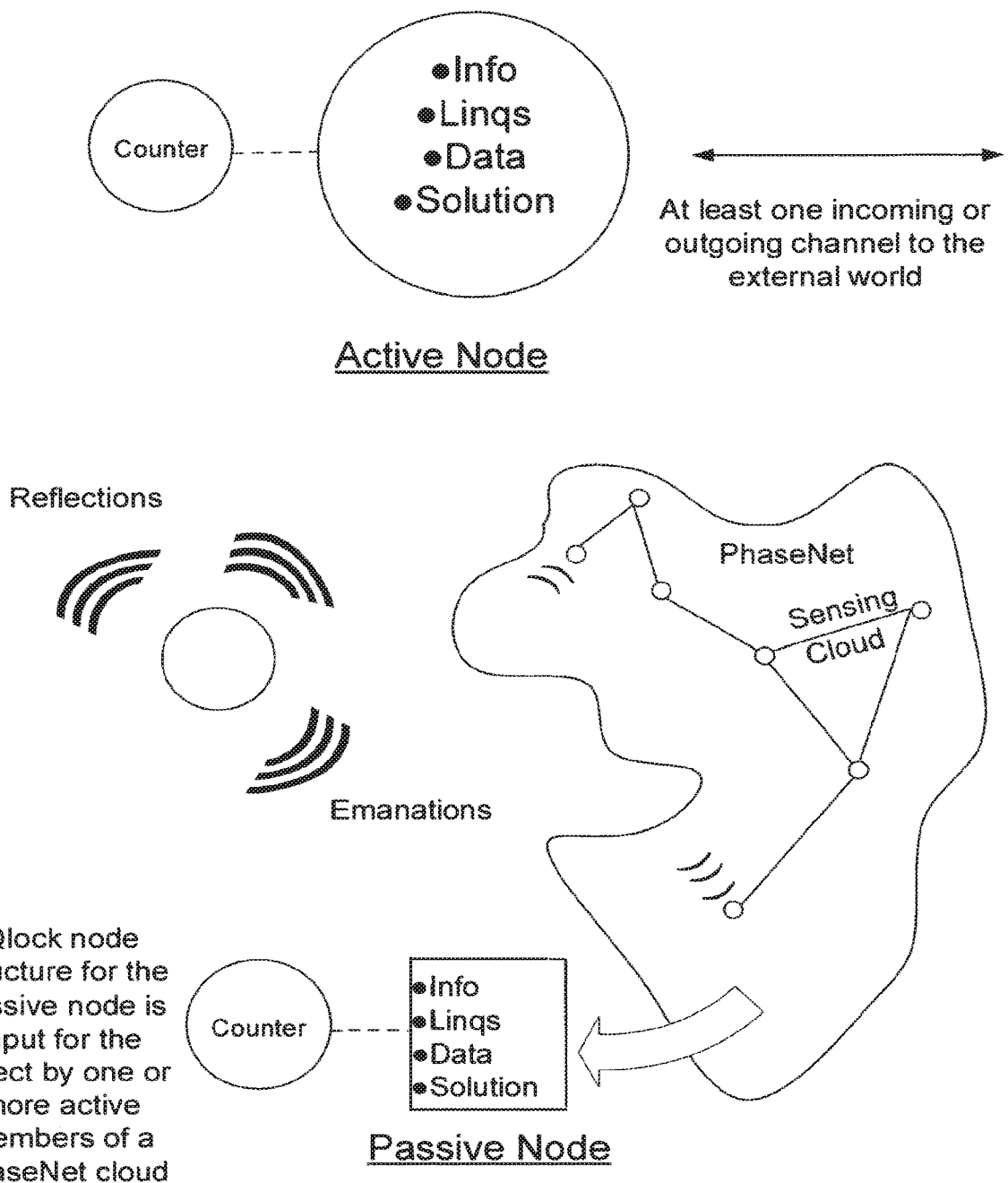
FIG. 17 is a diagram illustrating functional differences between active and passive nodes.

The assignment of a qlockstructure to a node is the basis for adhering to PhaseNet protocols, combined with basic software operation. Note that PhaseNet principles can be applied to passive or non-cooperative objects as well as active participants. FIG. 17 depicts the difference between active and passive PhaseNet nodes.

FIG. 17 shows that some "passive node" object external to a set of cooperative PhaseNet nodes can be still treated as a node through receipt of either reflected signals from that object, or signals emitted from that object itself, or both. An example of the former case is an aircraft being illuminated by radar, with several PhaseNet-cooperative radar receivers sensing reflected signals. Examples of the former are a repetitively pinging RFID which simply sends out periodic ID messages, and EM noise emitted from a motor.

In all cases, a PhaseNet-enabled set of nodes can instantiate a Qlocknode structure for the passive object, characterize the properties of the object by filling out appropriate fields and data structures in the four sub-structures, and proceed to collect information as a pong-type signal measurement (i.e., a ping sent out, reflected, and received by the pinging node). Variants to a pure pong include just one PhaseNet node sending out a ping with multiple nodes receiving the reflected ping, as well as some non-PhaseNet EM source pulsing the object, the reflected pulse being captured by cooperative PhaseNet nodes. Count-rate variations normally associated with a PhaseNet node can be treated as a null parameter for purely reflective topologies. Count-rate variations can still be calculated for situations where either an external EM pulse is illuminating the object, or some signal emission from the object is being received and one wishes to independently measure rate variations for what has become a virtual counter associated with the passive node.

Passive nodes do not contribute information to solutions in the form of new equations of the type similar to equation (2) simply because they contribute no data directly to the overall network. Hence, solutions that contain passive nodes may not be over-determined by the resultant equations, an intuitive and natural consequence. The same principles of solution still apply, however.

The Garden-Variety Qlock

Figure 18:
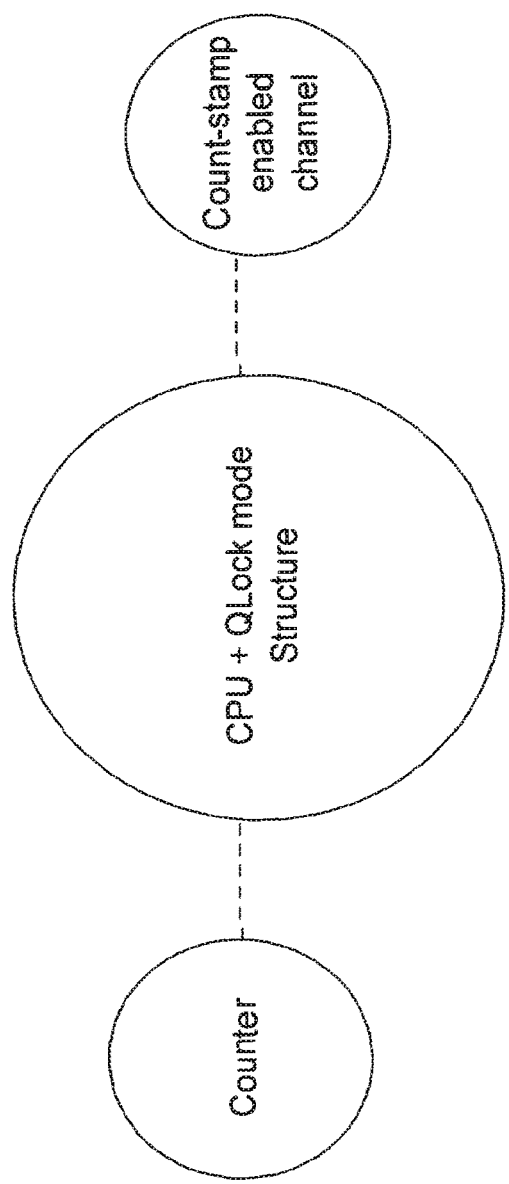
FIG. 18 is a simplified diagram of an active node structure.

The baseline embodiment and other PhaseNet applications have active qlocknodes. FIG. 18 shows the most common, highest level wrapper that usually surrounds a Qlocknode, akin to FIG. 14 describing the SCU, but here depicted even more simply. There are three basic elements in this wrapper: a counter (clocks, oscillators, etc.); a count-stamp enabled channel; and a CPU that can instantiate a Qlocknode structure. If any of these common elements is missing from a given node, that node becomes degenerate. There are various ways for the network to compensate for missing elements on members of the set. The channel in particular may have out-bound digital communications capabilities in addition to the count-stamping capability, though certain network topologies (such as RFID) may have only incoming digital communications. The moniker "active" signifies a node that is "tied into the active functioning of a PhaseNet enabled network."

The channel circle in FIG. 18, represents external salient communication or data sourcing, thereby representing a generic linq that can be count-stamped. There may be zero, one, or more than one linq for each node, in which zero often correlates to a passive Qlocknode. Some configurations such as active RFIDS may have no reliable linqs that can be count-stamped, yet they still have a digital back-channel available as well as a counter, making then essentially an active participant in a PhaseNet local group.

The counter box in FIG. 18 simply represents any form of capability to count-stamp, time-stamp, enumerate or otherwise label events that are occurring on the available linqs. In PhaseNet applications, space-time solutions are directly related to the noise level and quality of the count-stamping capability, as opposed to the counter rate. Speed is helpful, but it is the raw Guassian noise properties of count-stamping events which determines the quality of the overall space-time solution. The channel circle in FIG. 18 indicates an ability to send out digital information to one or more external qlocknodes.

Finally, the CPU circle is included as a typical element of a normal PhaseNet node, though it is unnecessary if other nodes control the formation of space-time solutions for a given node. For instance, a cell phone without a CPU or with a very minimally capable one may be assisted by a mainframe within the cell network that performs the PhaseNet operation steps.

A First Sampling of PhaseNet Topologies

Figure 19:
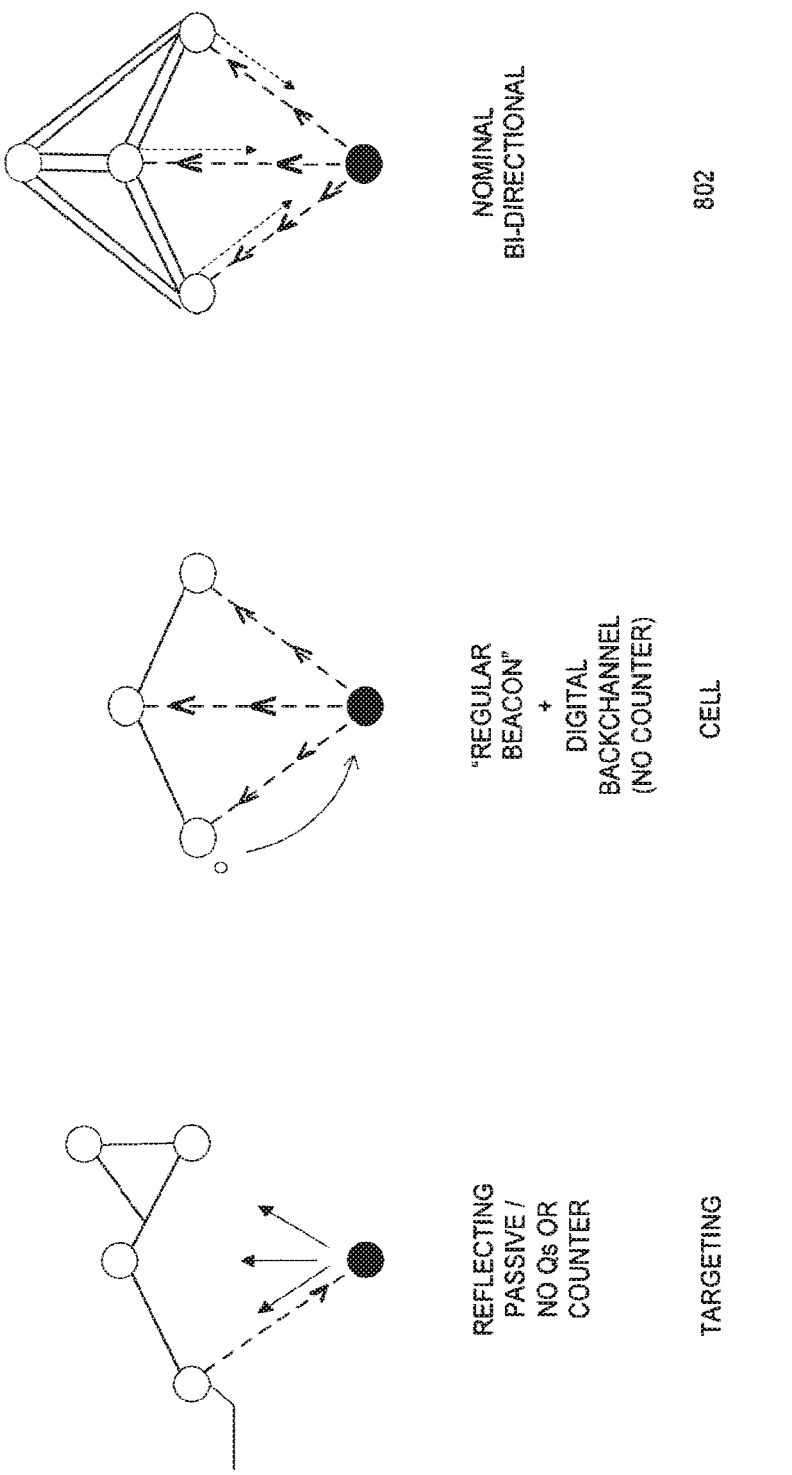
FIG. 19 shows nodes arranged in three exemplary node topologies.

FIG. 19 shows three simple examples of PhaseNet topologies, illustrating the previous discussion about active, passive and normal qlocknodes. In all three cases, each of the filled-in circle nodes is considered a PhaseNet node. The graphic on the left indicates a passive/reflective topology. The graphic in the middle indicates a partly active example of a cell phone, which has no counter but can send out regular signals that are received by other normal PhaseNet nodes. The graphic on the right shows a simple example of a normal Qlocknode, in this case an 802.11 client directly communicating with a singular access point, but also is at the same time in duplex ping communications with a couple other access points (showing that there need be only one pung channel but multiple ping channels in operation at once), while those access points may themselves be in communication with a network of nodes excluding the initial node. These three topologies are inadequate to introduce the topic of PhaseNet topologies, but they will suffice to show how active and passive PhaseNet nodes can inter-operate.

PhaseNet Dynamics

PhaseNet operates on the premise that communication is ongoing between nodes, or between a node and its environment. Given that all forms of communication have some finite speed, dynamics is therefor an integral aspect of PhaseNet operation. This may appear obvious, but FIG. 20 attempts to encapsulate and depict this central aspect of PhaseNet operation.

In FIG. 20, a node designated by the letter Q undergoes three successive states of communication with its environment. It is simply evolving through arbitrary states of network connectivity, embedded in a notional geometry of that connectivity which is akin to the coarse direction vectors previously discussed.

Solid lines indicate functioning duplex ping channels, dashed lines indicate mono-directional ping channels, and parallel lines indicate an active pung packet being pushed from one node to another. Though three instances of local group connectivity are depicted, an intuitive notion of continuous background time fluidly moving from one state to the next, replete with motions on the coarse direction vectors, would an animated version of FIG. 20 might look like. (Such an animated view makes sense from the perspective of the asymptotic background collision-frame viewpoint.)

FIG. 20 frames the basic challenges and functional requirements for PhaseNet software, hardware, firmware, and combinations of these: A Qlocknode needs to determine its current, immediate past, and near future network connectivity, make sure that adequate/minimal ping-data flows occur, and calculate its own or a local-group's space-time solutions. The following section describes the architecture and flow of this operational requirement.

The PhaseNet Core Engine: Hierarchical Embedded Cycles

Figure 21:
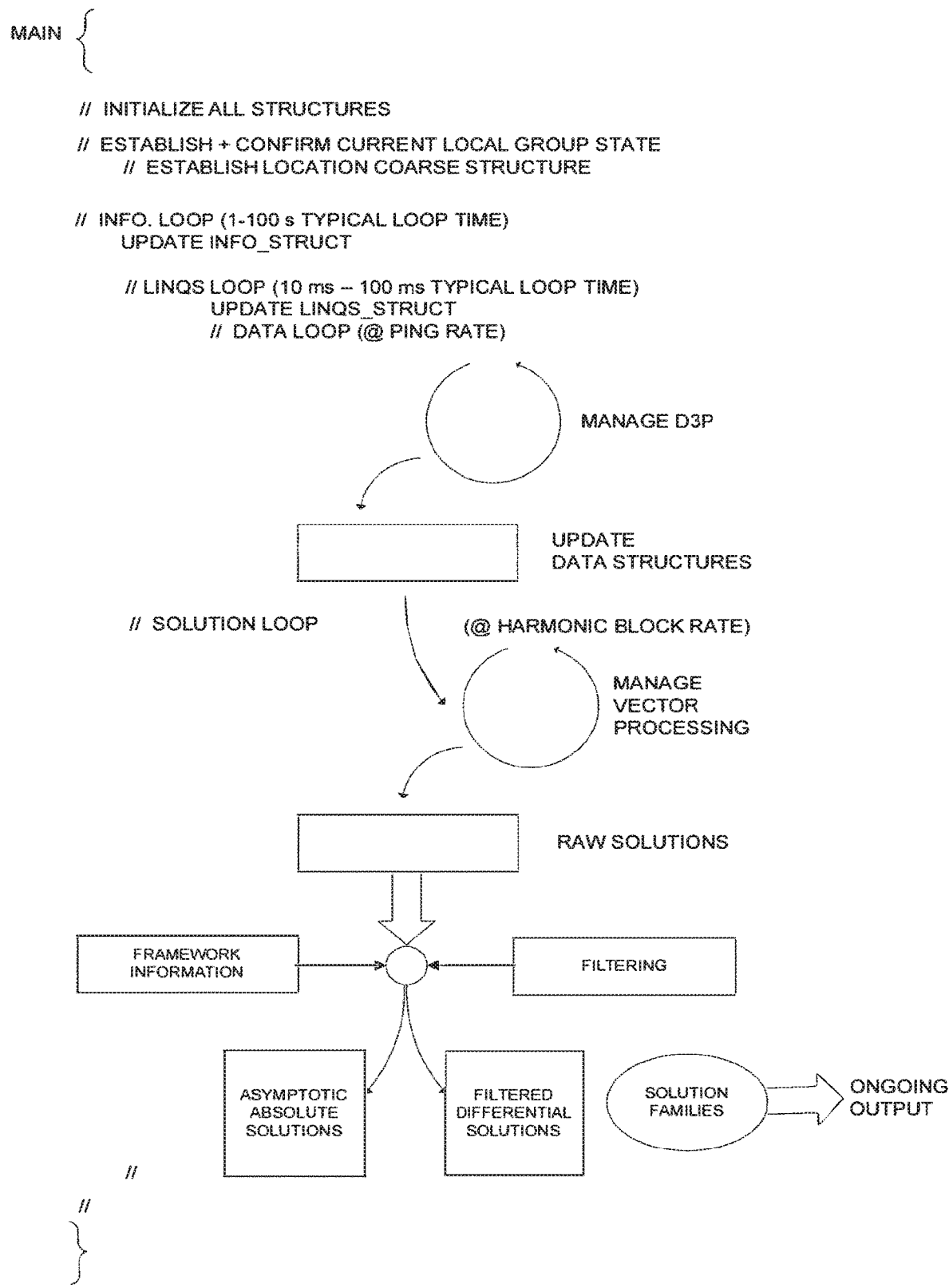
FIG. 21 is pseudo-code representing a highest level organization of ongoing operation of the space-time calibration unit of FIG. 14.

FIG. 21 depicts the highest level organization of the operation of an SCU (Space-Time Calibration Unit), which can be packaged as a software module, a firmware module, integrated onto an IC or even a fully self-contained box/hardware unit. The SCU engine constantly maintains and updates the Qlock structures. Aside from typical initialization operations, the main operation is maintaining rate-related loops where data flow input is managed in the data_loop, and ongoing output solutions are produced and broadcast to the external world by the solutions_loop.

This manifests itself as repetitive and rate-related queries about whether a given structure requires attention, and if so, providing that attention. This highest level description will be familiar to those skilled in the art of real-time operating systems and associated software.

The hierarchy suggested by FIG. 21 associates the slowest loop with the info sub-structure and the tightest (fastest) loop with data flow and the data structure (running at a rate related to the fastest ping rate of the particular Qlock). Each PhaseNet application will have different demands on the loop rates, and hence this organization is arbitrary but probably quite close to most PhaseNet applications. Typical loop-bandwidths are indicated. The robotic car baseline embodiment explores various choices for these loop-bandwidths. Actual loop rates and their relationships are fundamentally variable, and rate relationships may change from one harmonic block to the next in highly dynamic applications such as missile guidance, or may change very little in stable applications such as inventory tracking inside a warehouse, in which Qlocknodes may move about swiftly, but rate relationships in the loops remain constant.

The info_loop depicted in FIG. 22 is most naturally the outer repetitive process driving a given car/node's main operation, because the associated info structure contains the most fundamental node status information and provides the overall context for the node within the network. For practical purposes, the linqs_loop, solutions_loop and data_loop processes will all be "slaved" or at least referenced to the info_loop. The info_loop is also the place where the status and inter-relationship of the other three loops are effectively managed. Thus, the info_loop is the main PhaseNet software routine. Also note that the "wait" condition at the end of the loop is simply a placeholder maintaining a certain loop rate and thereby improving efficiency of the CPU and memory resources. The info_loop can contain the initialization routines referred to in FIG. 21, including memory management and flow control elements, where the very first query will find that there is no status and thus requires initialization. Such details should follow common software programming practices. FIG. 22 also shows how the info_loop contains and manages the three other loops.

The job of the linqs_loop, illustrated in FIG. 23, is to maintain an active understanding of the local-group topologies as depicted in FIG. 19, which includes a wide variety of tasks including maintaining sufficiently precise estimates on the coarse direction vectors and coarse range values on the individual linqs. The linqs_loop also manages low-level details concerning quality of the linqs, intermittency, and interfacing with digital communications sub-systems in scheduling the transmission of pung packets. For "linqs" that are not actually communications channels such as INS data inputs or speedometers, the linqs_loop is a babysitter on the inner data_loop associated with these types of linqs. The linqs_loop is also tasked with generating families of potential H matrices associated with both the current linqs-topology along with closely related topologies, inverting matrices where possible to minimize the processing load on the solutions_loop, which actually performs the ongoing solution operations. In this sense, the linqs_loop is meant to be an efficient pre-processor for the solutions_loop. Within the data_loop it is certainly possible to place a "break" condition if intermittency of linqs or catastrophic breakdowns in ling active status occur, thus requiring attention from the linqs_loop logic on a timescale faster than the pre-set linqs_loop_rate. The linqs_loop_rate is typically in the 10 to 100 millisecond range for most PhaseNet applications including the baseline embodiment.

The solutions_loop is typically looped at a slower rate than the data_loop, because it need only meet the Qlocknode's requirements to generate a space-time solution, as opposed to the demands of the data_loop, which is actively managing count-stamping and subsequent storage of pings, pongs and pung packets. FIGS. 24 and 25 depict each of these loops accordingly. The data_loop is not generally contained within the solutions_loop. The two may be run as independent processes, where the solutions_loop depends upon interim outputs of the data_loop to formulate ongoing snapshot solutions, a relationship graphically indicated in FIG. 21.

With reference to FIG. 24, the solutions_loop performs many tasks as well. The main task is to calculate and populate the types of solutions that the Qlocknode desires. In most cases, the solutions loop has an inverted H-matrix handy allowing a main inner loop to solve for that vector in terms of raw ping and pung data, following the general framework of equation (3). These raw f-vector snippets are then stitched together into time series solutions using any of a variety of filtering algorithms akin to Kalman filtering. In addition, "external reference frame" data can be brought in to situate the variational solutions in some agreed framework such as GPS.

Other cases where intermittency of channels or extremely dynamic situations will mean that the solutions_loop has no applicable inverted H matrix available or, if it does, that inverted matrix has gone out of specification ranges predetermined by the Qlocknode. In this case, the loop is designed to either default to lower precision solutions (sometimes to the nominal solution families only), or to flag the large loops that re-inversion is necessary to meet the performance specifications. (It certainly can perform inversions itself, if need be, without the need to flag wider loops.) As reflected in the solutions_struct itself, this loop may also be calculating classic nominal solutions using pre-metricized space-time. Other than CPU capabilities, there is no limit to the number of solution families that can be generated at any given instance, a useful feature in volatile or jammed situations in which raw-data-supply conditions change frequently, leading to solutions that inherently adapt to those instantaneous conditions.

The solutions_loop cooperates with the linqs_loop as a preprocessor to determine final network topography configurations and to calculate the various solutions.

With reference to FIG. 25, the data_loop manages the operation of D3P data collection and dissemination, monitors linq quality, and flags the linqs_loop if anything is amiss. Here, the data_loop may also perform raw data processing, such as bandpass filtering and data compression. To the extent certain solution_loop routines expect cleanly formatted and flow-optimized vector inputs, such operations may be placed in the data_loop. And though the linqs_loop provides the interface with a device's digital communication system to schedule the pushing of pung packets, low level formatting and storage of those pung packets often is best situated in the data_loop. (This reduces the number of CPU-level register-access calls, for instance.)

Special note should be made of the 'switch' statement inside the data_loop of FIG. 25. Typically the CPU is busy executing the embedded loops depicted in FIG. 21, with no additional capacity for count-stamping individual ping events on individual linq-channels. Furthermore, using a CPU's internal clock as a count-stamping mechanism, of "timestamping," is notoriously noisy and subject to long system-level delays and internal CPU obfuscations. A preferred approach entails the use of a self-contained process referred to as a "ping driver," which is dedicated to the task of count-stamping ping events on a given individual ling. Count-stamping may be performed by the same CPU that is driving the main program of FIG. 21, on a different CPU or even a self-contained box.

With reference to the SCU high level operation depicted in FIG. 21, the tasking of the modules is most important in which the looping-rates and relationships are key practical details but are also quite flexible. The info_loop doubles as the main program for convenience. Certain aspects of the linqs_loop can be implemented in common "hardware driver" packaging, familiar to engineers who deal with a variety of computer peripherals. Again, the tasks are the important element, while implementation is arbitrary as instrumentation permits.

Raw "f-Vector-snippet" Solutions using Harmonic Blocks

Figure 26:
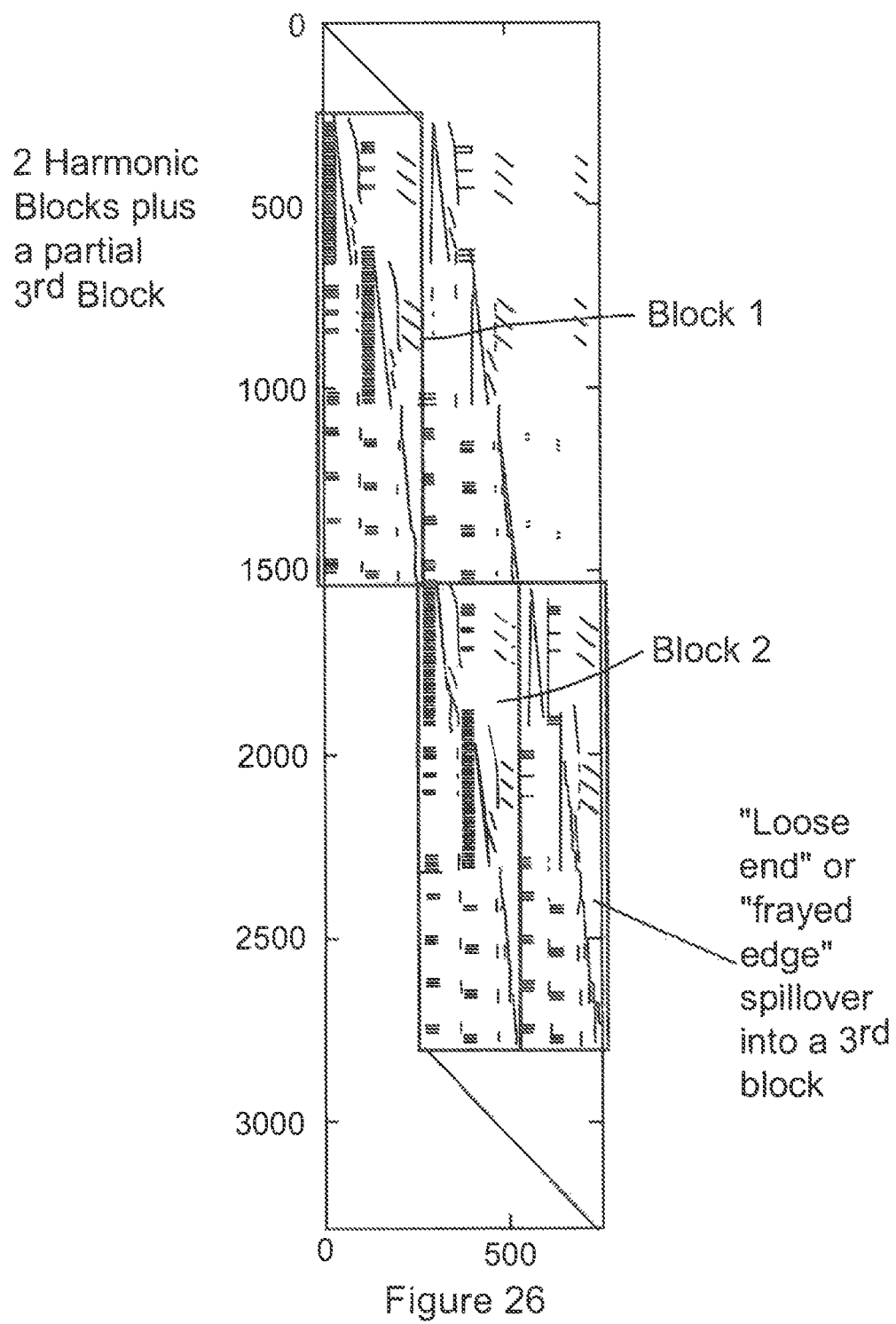
FIG. 26 is a diagram of the use of harmonic blocks in equation and solution formulation.

One approach to stitching together a sequence of f-snippets (clipped-epoch solutions to equation (3)) is to formulate equations and solutions across two or more harmonic blocks, introducing a new harmonic block of data and solutions each block time, to replace the harmonic block several blocks earlier. In addition, weighting can be employed such that earlier harmonic blocks which already have growing estimations (solutions) due to earlier block solutions can be differentially weighted relative to recently added blocks. FIG. 26 shows a simplified example. This multi-block approach to matrix solutions formulation is mentioned immediately in this section in order to lay a foundation for eventual Kalman-type filtering principles, which find optimal linear solutions (and non-linear extensions) to time-evolving systems that are generating new data all the time.

Before placing these blocks together, however, there is a different take on equation (3) and the harmonic block organization of the g and f vectors.

Figure 50:
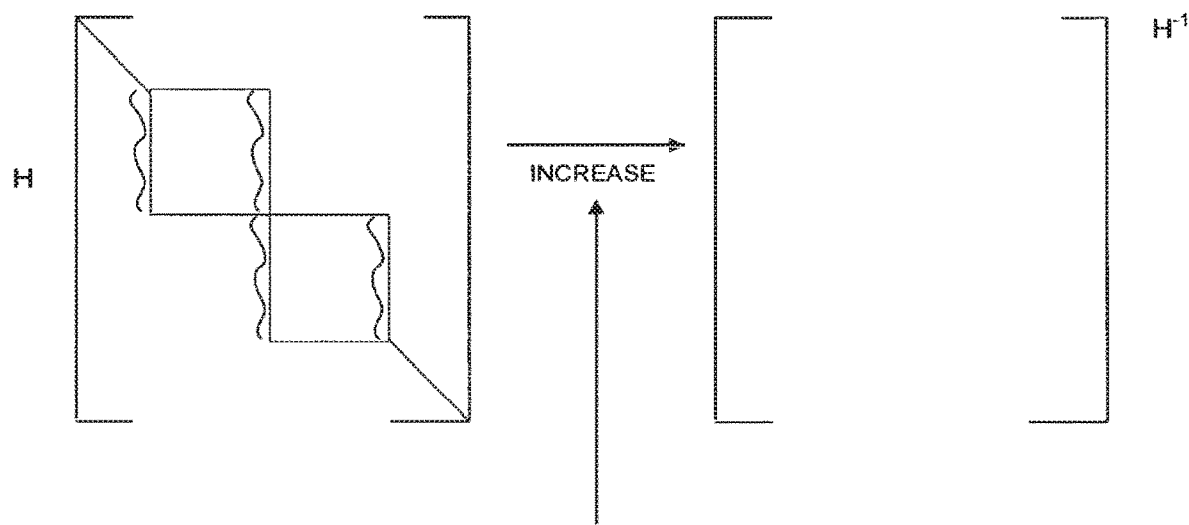
FIG. 50 is an abstract rendering of the H matrix organization depicted in FIG. 13.

With reference to FIG. 50, a distant node B sends a ping at its count instance b, where it has some inherent metrics associated with it at that instant of integral count b. Likewise, node A in the foreground later receives the ping at its count instance a, its metrics at the fractional count instance a. There are B-specific metrics associated with integral count value b and A-specific metrics associated with fractional count value a. Meanwhile introducing a third shared metric called the common path metric(s) associated with the AB ling. One interesting subtlety for other embodiments that is trivial in terrestrial PhaseNet applications, is that it is difficult to associate the 'common' part of common path with count values, in that a ping was sent out from A at approximately same instant that a ping was launched from B, but not exactly the same instant. Practical applications retain an abstract view of the node-node ping interaction depicted in FIG. 27.

Figure 27:
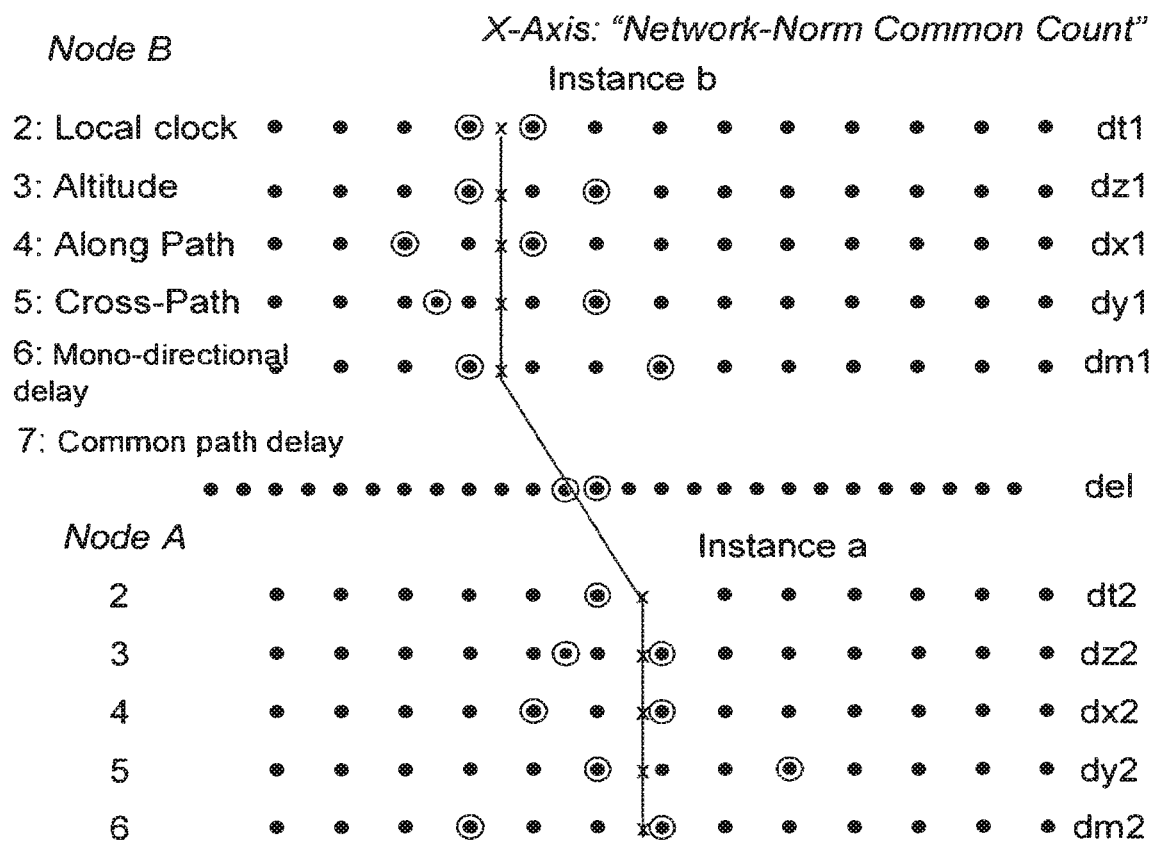
FIG. 27 is a diagram showing an example of node-ping interaction.

There is in FIG. 27 an arbitrary set of solution waveform points for node B with a straight line drawn through them at a count instance b, with the line then passing downward and to the right through one or more common path solution points, crossing those points, and then straightening again as it passes through node A's solution waveform points at fractional count instant a. Equation (2) is a specific example, minus the common path points. The common path metric is introduced here because precision PhaseNet applications may use it, and because its introduction adds to the intuitive understanding of how PhaseNet equations are formulated. The specific graphic is from an aircraft example as indicated by the words at the left of the FIG. 27, illustrating the wide array of choices available.

Figure 28:
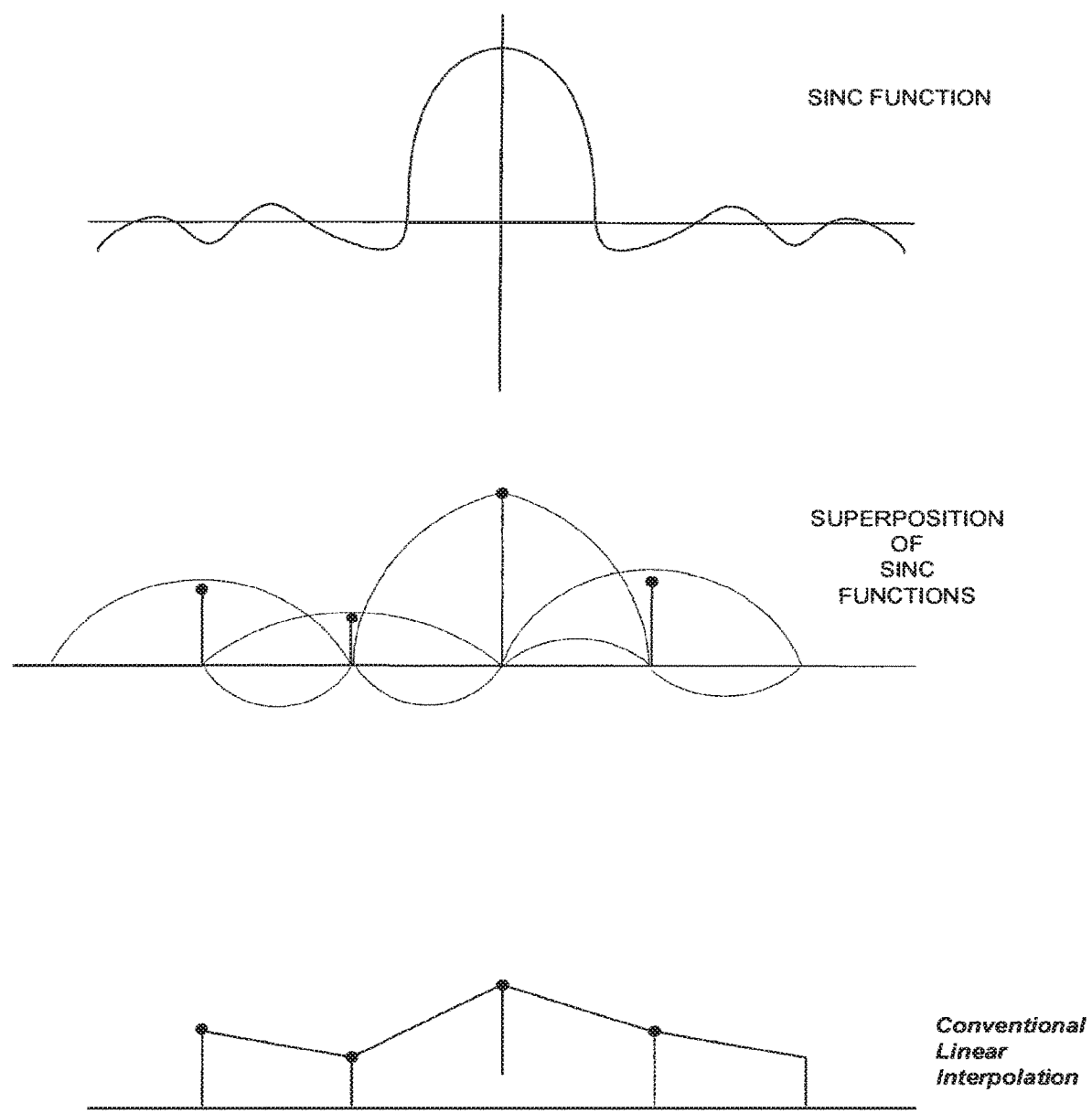
FIG. 28 shows that solution waveforms based on equally spaced points can be represented discretely through sequencing of sinc functions.

FIG. 28 shows how solution waveforms based on equally spaced points can be represented discretely through sequences of sinc functions (sin x/x). Actually utilizing sinc functions is rare; they are instead replaced by a close approximation cubic spline function. To minimize complications to H matrix formulations, conventional linear interpolation is performed between discrete wiggle-poles, thus envisioning a sequence of connected lines as solutions for f-vector snippets.

Even the common path metric(s) use variational metrics as opposed to pre-metricized absolute quantities, and hence one can interpret the whole of FIG. 27 as the unknown metric components that give rise to a singular datum point. In this sense, a datum point is the integral of a finite number of system metrics, even as those system metrics have themselves been discretized through FIG. 28.

Figure 29:
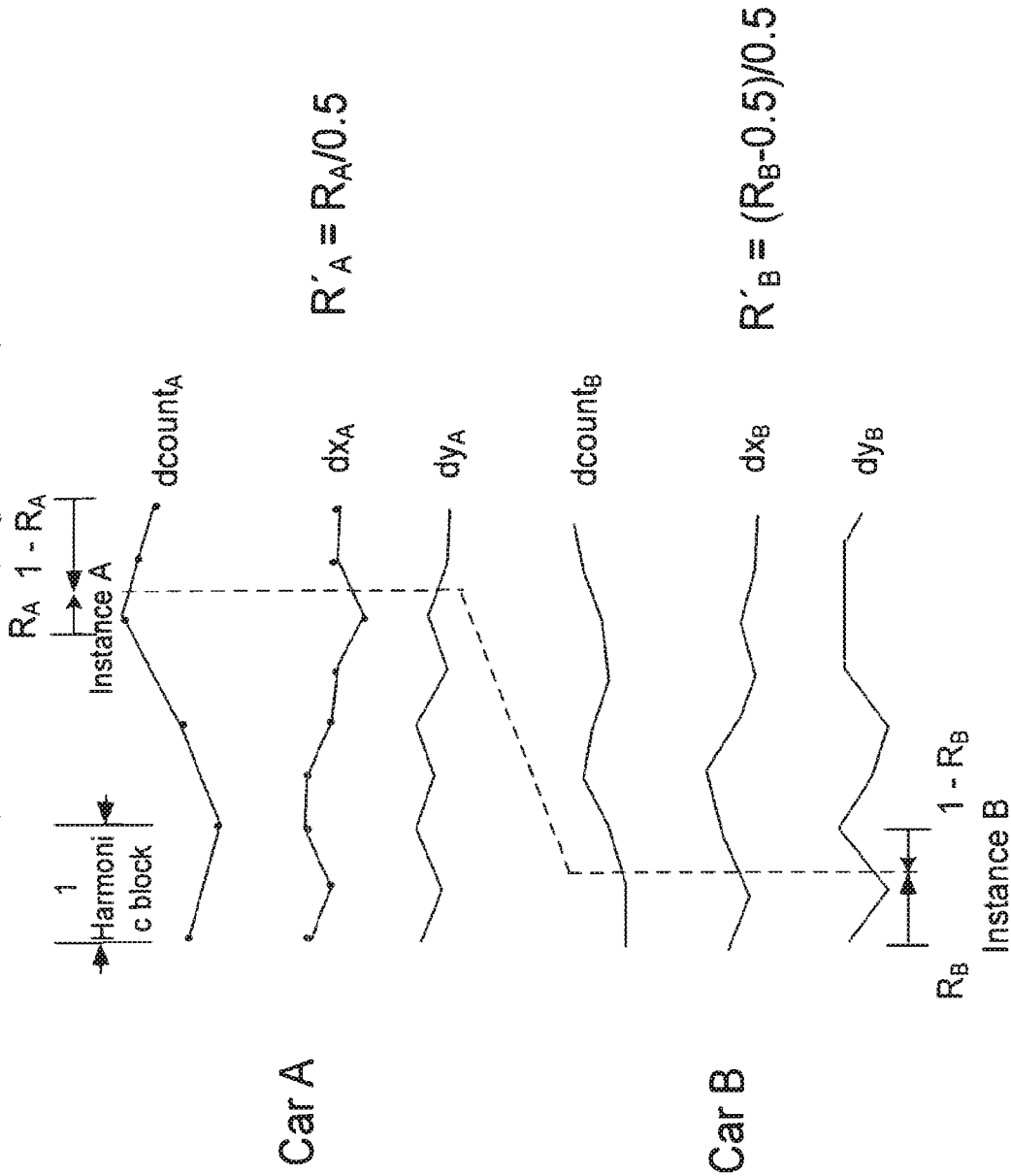

FIG. 29 and FIG. 30 then take, equation (2) as a starting point for transforming the general situation depicted in FIG. 27 and applying it to the baseline embodiment. The common path metric is not considered in this example because it is not included in the baseline embodiment. There are six solution waveforms in FIG. 29—two dcount waveforms, and four spatial waveforms. Three harmonic block's worth of solution waveforms are depicted in FIG. 29, where car B's waveforms are ordered below car A's, but the H row constructed will be the one in which car A receives a ping from car B, thus rendering the dashed-line ping integration from lower left to upper right.

Figure 31:
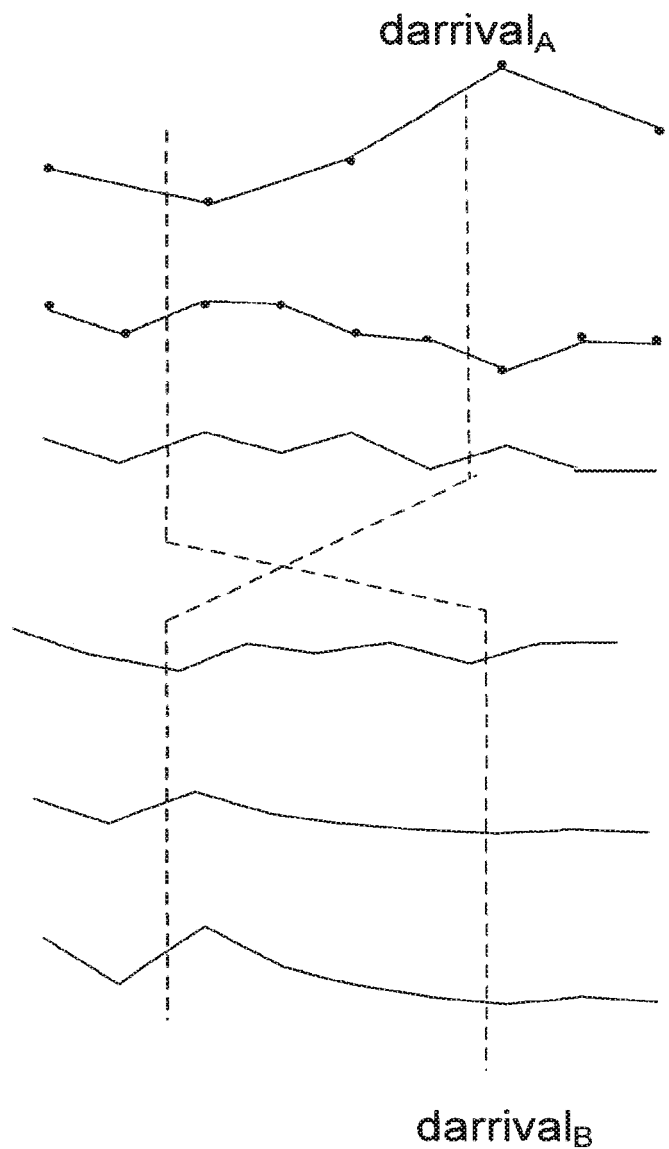
FIG. 31 is an example expanding the illustration presented in FIG. 29 to a quasi-simultaneous duplex sequence of pings between nodes A and B.

FIGS. 30 and 31 relate to the principles concerning ordering of g and f vectors, taking into account not only interpolation but also harmonic block combinations. The example in FIG. 29 is deliberately chosen to illustrate a few practical challenges as well. For example, launching the ping from car B did not coincide with an integral solution point and thus is a fraction within a harmonic block that, using linear interpolation, implicates two solution points for each solution waveform. Car B's ping at instance b was launched in the second half of the harmonic block, thus requiring two ratio calculations: $R_B$, the ratio on the dcount waveform, and $R_B$, the ratio on both spatial waveforms. In all three waveform cases for car B, interpolation requirements implicate solution points in the following harmonic block, designated by N+1. FIG. 30 captures this by illustrating that car B's ping includes two separate local regions of non-zero H-row elements accordingly.

Likewise, when car A receives a ping at instance a, it is not at integral values of car A's solution waveform sinc pole points (or linear interpolation pole points in this case), thus interpolation implicating at least two solution points for each solution waveform is the rule. In the depicted case, the instance a is in the first half of harmonic block N+2, and hence the implicated spatial solution waveform points are both within that harmonic block, while the dcount waveform having only one point for each harmonic block necessarily implicates a solution point in harmonic block N+3.

FIGS. 30 and 31 appear complicated when written out in long form. When programming in C or MATLAB, using clever indexing schemes that sparse matrices (ones with lots of zeros) allow, the actual coding of FIG. 30 becomes quite simple. The following is an example from a three-dimensional case:

matrixelement(index+1)=solvefrac1*kepxn;

matrixelement(index+2)=solvefrac1*kepyn;

matrixelement(index+3)=solvefrac1*kepzn;

matrixelement(index+4)=solvefrac1;

matrixelement(index+5)=solvefrac*kepxn;

matrixelement(index+6)=solvefrac*kepyn;

matrixelement(index+7)=solvefrac*kepzn;

matrixelement(index+8)=solvefrac;

matrixelement(index+9)=−frac1*kepxn;

matrixelement(index+10)=−frac1*kepyn;

matrixelement(index+11)=−frac1*kepzn;

matrixelement(index+12)=−frac1;

matrixelement(index+13)=−frac*kepxn;

matrixelement(index+14)=−frac*kepyn;

matrixelement(index+15)=−frac*kepzn;

matrixelement(index+16)=−frac;

In this example, 'frac' refers to fractions and the (1-frac) have already been pre-calculated, while 'kep' in the longer variables here refers to k vectors with additional 'keplarian' orbital elements that a satellite might need to keep track of. The code example demonstrates that actually filling the H-row with appropriate numeric values can be accomplished quite efficiently.

FIG. 31 then expands the view of FIG. 29 to a quasi-simultaneous duplex sequence of pings between nodes A and B. The term 'quasi' applies because there exist slight rate variabilities between cars (which are part of what is asymptotically being measured), so the ping instances may be only coarsely aligned. In other PhaseNet applications, most notably ones using intermittent packet-based communications such as 802.11, the duplex pings may not be quasi-continuous, but may take on a kind of sporadic behavior. The basic structures discussed earlier and graphically indicated in FIGS. 150, 152 and 155 are all designed to easily handle arbitrary ping launches and ping receipts.

Figure 32:
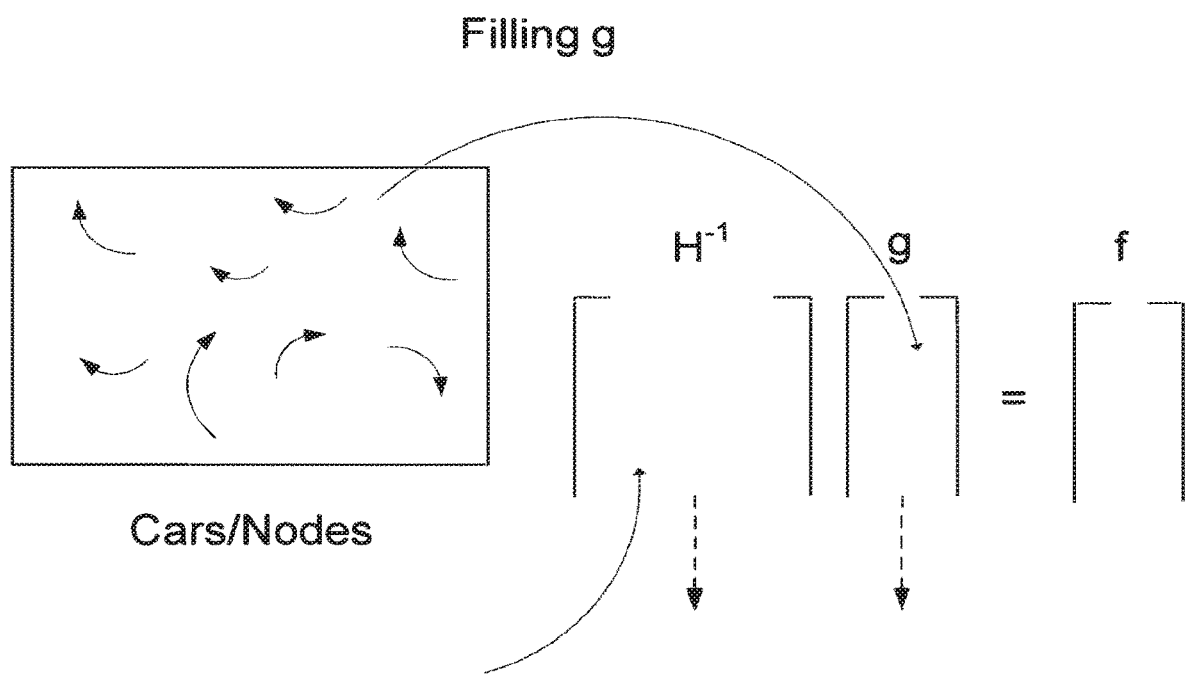
FIG. 32 is a diagram indicating how the H matrix and associated vectors are populated by communication among the 10 cars of FIG. 1.

FIG. 32 depicts all 10 cars operating with their pings, copiously producing H-matrix rows in the process.

FIG. 33 re-packages FIG. 31 in the harmonic block organization structures for the g and the f vectors. One particular ping is highlighted, illustrating how it associates two discrete f-solution parameters for each wiggle resulting from the choice of linear interpolation for the baseline embodiment. This number is typically four if one uses cubic interpolation methods, or even larger if one approximates sinc functions more accurately with a cubic splines.

Figure 34:
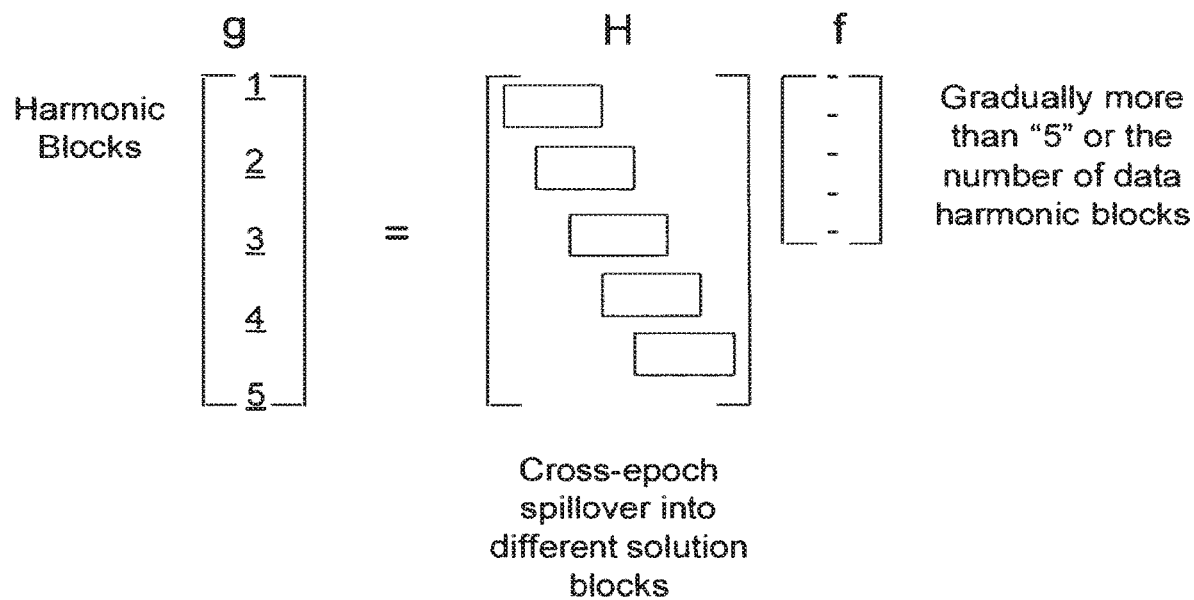
FIG. 34 is a version of FIG. 33 reconfigured into five concatenated successive harmonic blocks for 10 nodes and 90 mono-directional ping channels.

FIG. 34 then re-packages FIG. 32 into a view of 5 successive harmonic blocks, across all 10 cars and all 90 mono-directional ping channels. Also represented is the double frayed edge challenge listed earlier, in which pings were sent out from nodes during harmonic blocks earlier than the five represented, yet received during the five highlighted harmonic blocks, while other pings are sent out during the five harmonic blocks that will not be received until later harmonic blocks. Specific examples presented below demonstrate that this challenge can be largely' overcome with residual error being the consequence of never being able to fully "stop time."

FIG. 34 inherently has 5 blocks×10 ping instances per block×90 ping channels or 4,500 ping equations being represented, along with approximately 5 blocks×5 f-vector unknowns per block per node×10 nodes or 250 unknowns represented. The approximation is included because, as a result of interpolation in formulating the H-matrix, some spillover between harmonic blocks is necessary. Some of the over-determination (4,500 equations with 250 unknowns) is an informational close-cousin to classic bandpass filtering of signals that are sampled at higher rates than are required for eventual solutions; the same kinds of 'averaging' S/N (signal to noise ratio) improvements are the result.

The rank-deficient (always-singular) matrix H is a manifest result of FIG. 34. Construction of the H-matrix is demonstrated below. When the H matrix is inverted, variational f-vector solutions can be generated from the data vector g. These variational solution snippets can then be placed into two related contexts: (1) evolving waveform estimates of count rate variations and spatial variations of the nodes/cars, and (2) evolving absolute metrics such as absolute distance or GPS coordinates, once asymptotic processes are applied and "speed of light" or "speed of sound" absolute metrics are introduced (as will be shown in the baseline embodiment).

This completes the general discussion on how f-solution snippets are formulated and solved; the next section which describes how PhaseNet software executes operations to feed the space-time calculation.

PhaseNet Initialization and Operation

In the baseline embodiment, a CPU manages PhaseNet data structures, the operation of pings, pongs, and pungs, and solution formation. The CPU may be inside an SCU, or a time-multiplexed general CPU.

Initialization of the data structures is the first order of business. The following description presents a detailed initialization scheme that entails ten cars, and explains how the CPU then manages the data flows of pings, pungs and evolving structures.

It was postulated above that the cars have already revved up and started counting. It is also assumed that before moving, each car establishes basic audio communications with each of the other nine cars using a chosen 'audible' or supra-audible carrier frequency, and that all 90 mono-directional communication links have been established and verified.

In the baseline embodiment, PhaseNet is now ready to initialize by populating its linq_list data structure with the identities of the nine other cars it is communicating with, along with any specific data about that car that it may require. An example of such data is the type of clock each of the other cars carries. Data is recorded within the linq_list structure, associated with the given node in question. As equations are established and decisions are made about linqs, reliability, and the like, required data about other cars is added to the linq_list data structure. The baseline embodiment stores nine letters A-J, in a given car's linq_list, while excluding its own identity. Each of the nine letters stores information about another car/node.

The cars ensure that ping data are properly being sent and received across all 90 mono-directional channels. Initializing PhaseNet in this example entails assuming that each car has a reasonably good clock/counter and that each car can start count-stamping every fiftieth zero crossing of its audio carrier wave. (This initialization approach is simplified; industrial applications would have more developed methods of ensuring proper generation and receipt of ping data.) A discussion follows of how the other nine cars determine which of the zero crossings any other given car is using as its reference.

Figure 35:
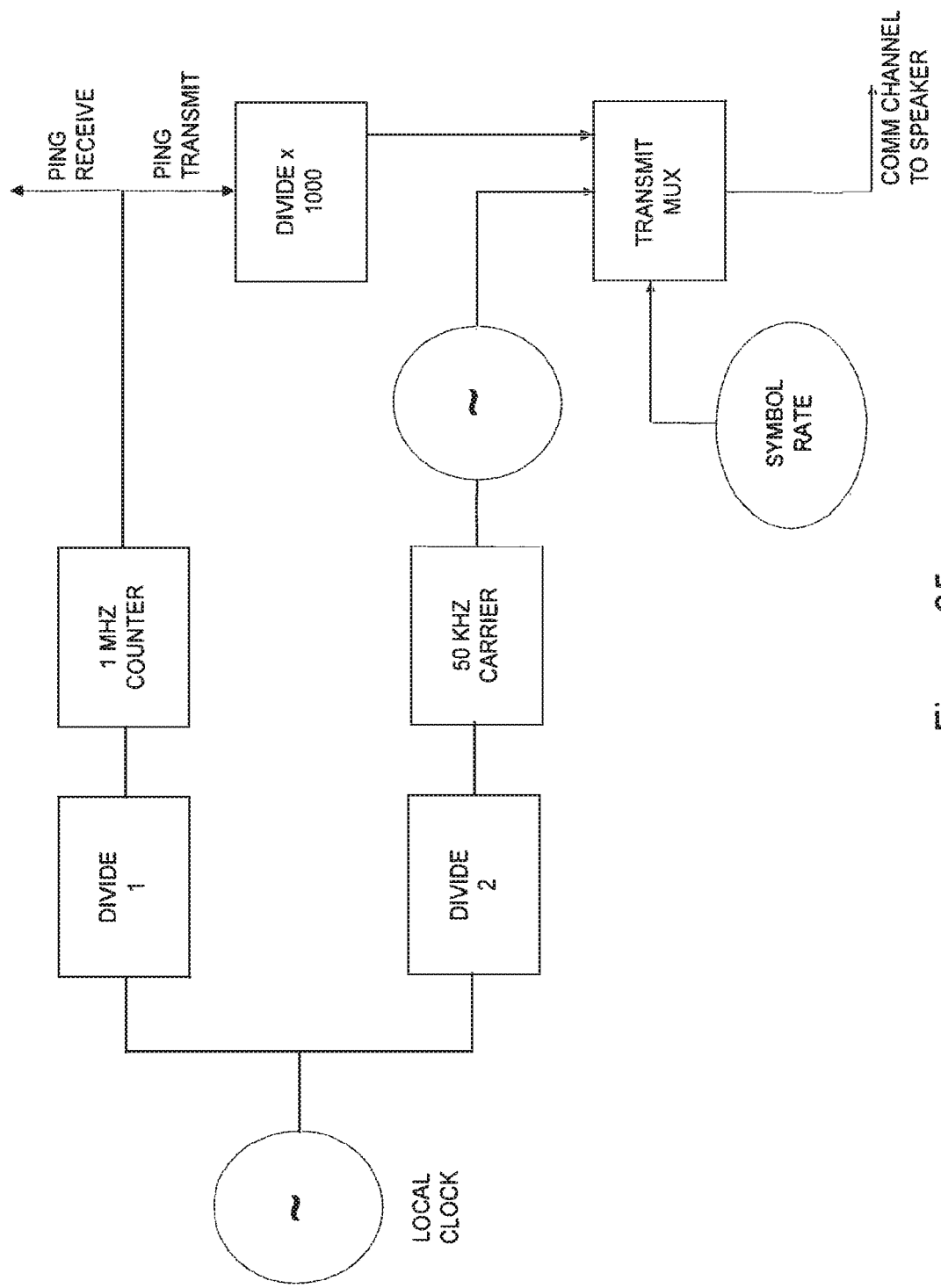
FIG. 35 is a block diagram of carrier wave count-stamping circuitry of a network node.
Figure 36:
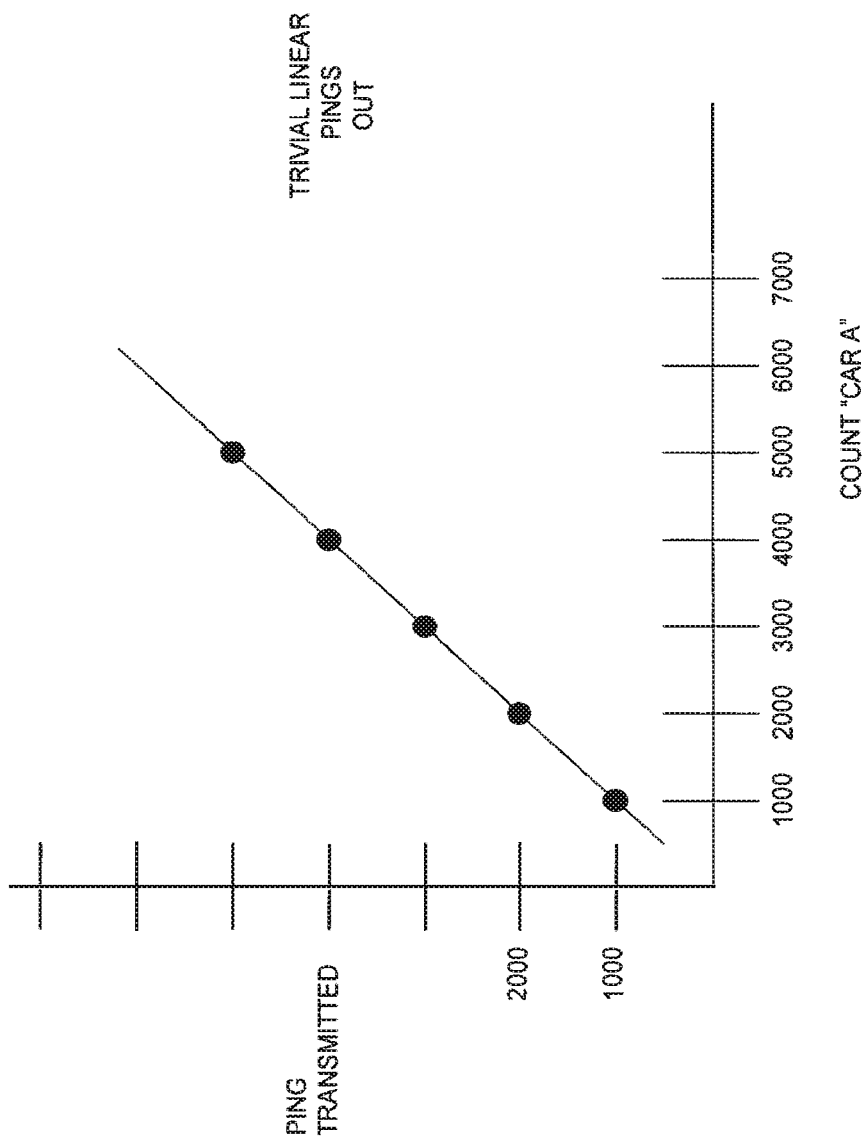
FIG. 36 is an example of a pingform of pings sent at regular count intervals by the counter circuitry of FIG. 35.
Figure 37:
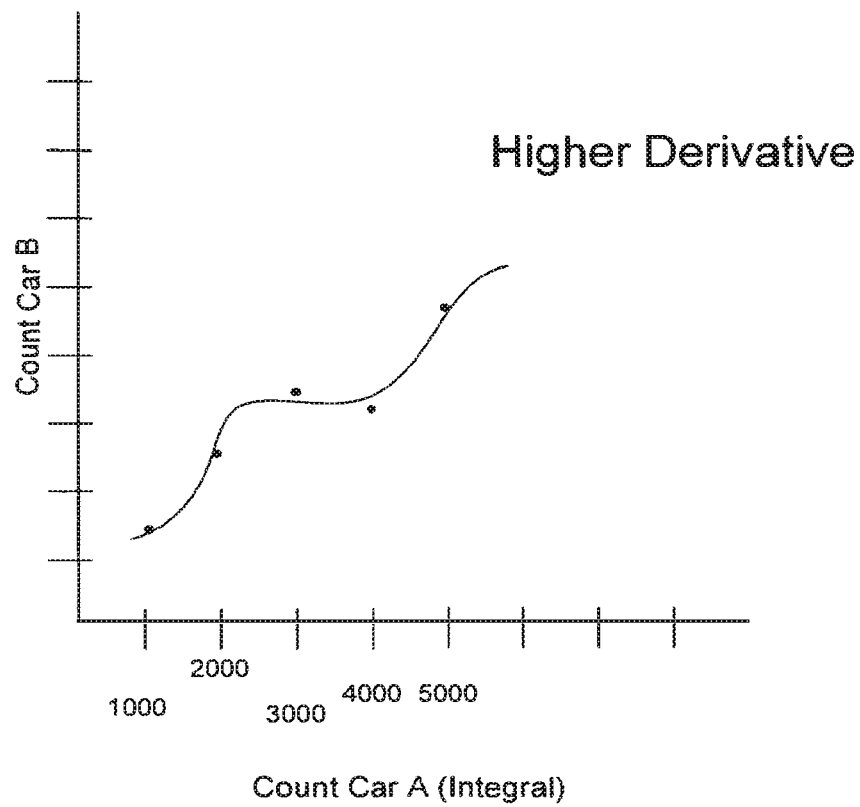
FIG. 37 is an example of a pingform based on reception of pings sent by another network node.

FIG. 35 shows how a certain car uses its counter circuitry to start count-stamping its carrier wave. The counter and audio communications hardware are slaved to the same clock inside the car. The trivial ping waveform transmitted every $1,000^{th}$ count is shown in FIG. 36. By modulating a special symbol onto the audio carrier wave to indicate which zero crossing is considered to be the $50^{th}$ zero crossing, eventually another car, say car B listening to car A, begins to create pingforms based on receiving the pings from car A. FIG. 37 depicts what this pingform may look like.

The circuitry enabling car B to count-stamp the zero'th crossing of the incoming audio carrier is simple in this baseline embodiment, in which sample of the received digital waveforms are slaved to the local clock and thus the sample times are known relative to the clock inside car B. Using digital signal processing, fractional sample-time values for this zero crossing can be calculated. Thus, FIG. 37 exhibits a noisy and slowly varying waveform about a perfect line. When none of the cars is in motion, the waveform describes electronic noise and drift in the cars themselves, with perhaps a very small amount of reflective or environmental audio noise contributing to the signal.

Because packets are broadcast as opposed to transmissioned between pairs of cars, only 10 separate "audio channels" are needed in the current baseline embodiment instead of requiring 90 distinct mono-directional channels to share the same audio airwaves. Thus, when a car communicates a pung packet (as described below), it broadcasts to all other cars at once, and the other cars broadcast their pung packets simultaneously, as spread-spectrum multiplexing of the 10 individual audio channels allows.

Figure 38:
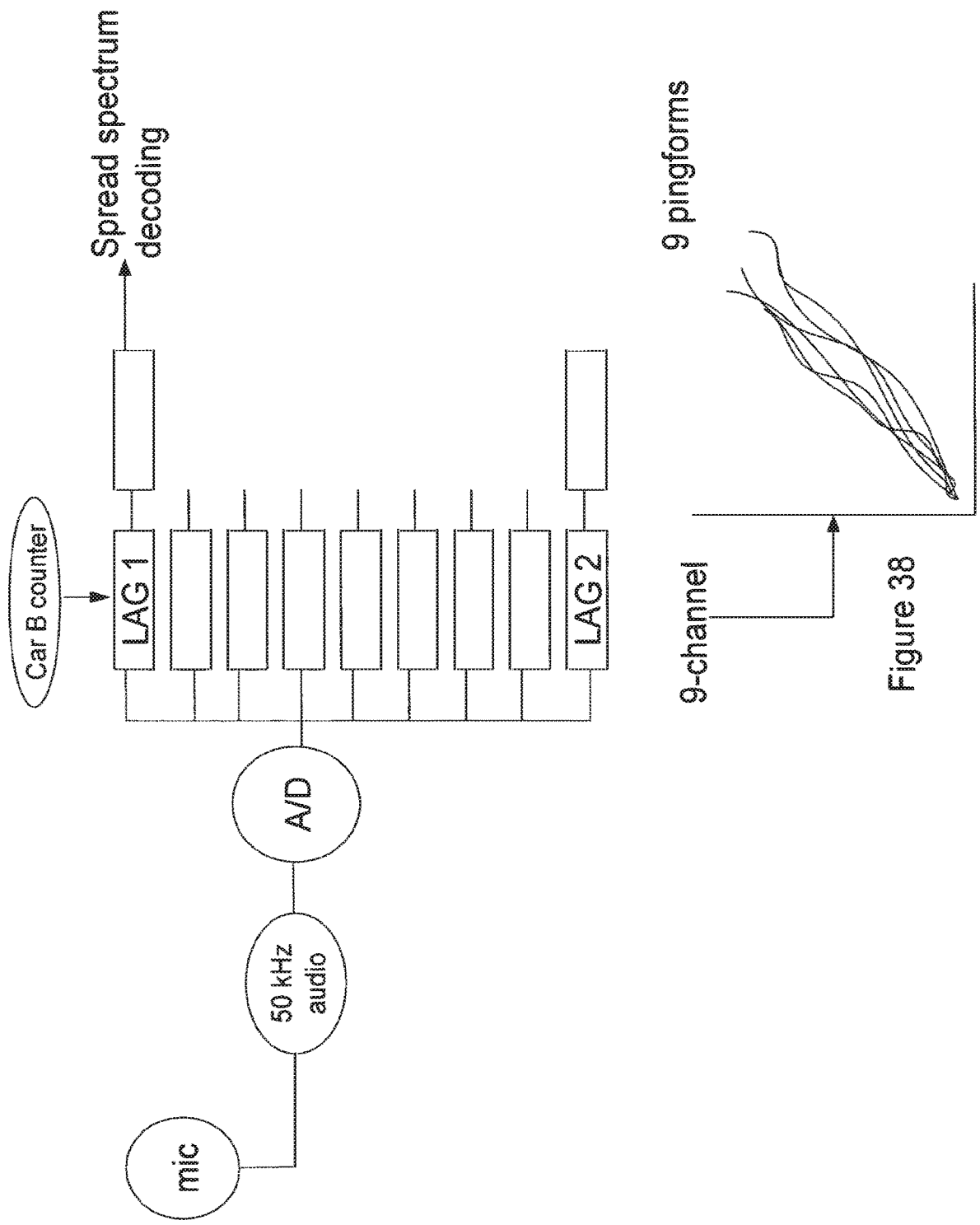
FIG. 38 is a diagram representing an example of raw pingform data measured by stationary nodes.

Thus FIG. 38 indicates the raw pingform data measured by all the stationary cars. Each car sample one single audio waveform at 100,000 samples per second, fully capturing the spread spectrum channels from the nine other cars and count-stamping the appropriate zero-crossings of the carrier signals of each of the nine separate cars. These raw data are theoretically destined for the data_struct.pingforms data structure previously described, but these data ought to be slightly processed before they are placed into this data buffer. Details of the nine channel spread spectrum decoding are only alluded to in FIG. 38 where the main point is that the 'lag,' which is driven by a digital delay in the spread spectrum decoding, is the entity that contains the modulation of every $50^{th}$ zero crossing of the carrier wave from each of the other nine cars.

The pre-processing of these raw data is very straightforward. There are two primary processing elements that turn the de-multiplexed zero-crossing raw data into data fit for placing into the data_struct.pingforms buffer: (1) subtracting the "symbol modulation bias" from the zero-crossing data as previously outlined, and (2) bandpass filtering the raw data using a low pass filter with a classic cut-off around 100 Hz. This is a deliberately low bandpass cut-off for this baseline embodiment, which focuses on 10 Hz level spatial variations of the cars, and 50 Hz count variability levels. The 100 Hz bandpass thus preserves the information relevant to these ultimate goals.

Once these two pre-processing steps have been performed on the raw pingforms, it will be necessary to store only 200 pingform points per second into the data_struct.pingforms data buffers, even though 1,000 virtual pingform points are part of the initial sampling. Less than one second's worth of data requires retention until it is overwritten with more recent data. Thus, each car collects 9×200 16-bit pingform samples per second or 3,600 bytes of information per second for placement into the data_struct.pingforms data Buffer. A ring buffer implements the data_struct.pingforms buffer, such that, for example, a new block of 3,600 bytes overwrites 3,600 bytes from two seconds earlier.

The data_loop procedure performs these operations just described, and the results are placed into data_struct substructures as appropriate, generally into data structures that have been assigned the label of the car from which the pings are being received. For the 'baseline operation' of the baseline embodiment, this empirical data flow is the most fundamental. In a sense, each car acts as GPS satellite for all the other cars. But rather than having known orbital parameters and synchronized clocks on such pseudo-satellites, they instead contribute sent pings and collected pings that, as a combined set, create a self-consistent space-time framework.

Figure 39:
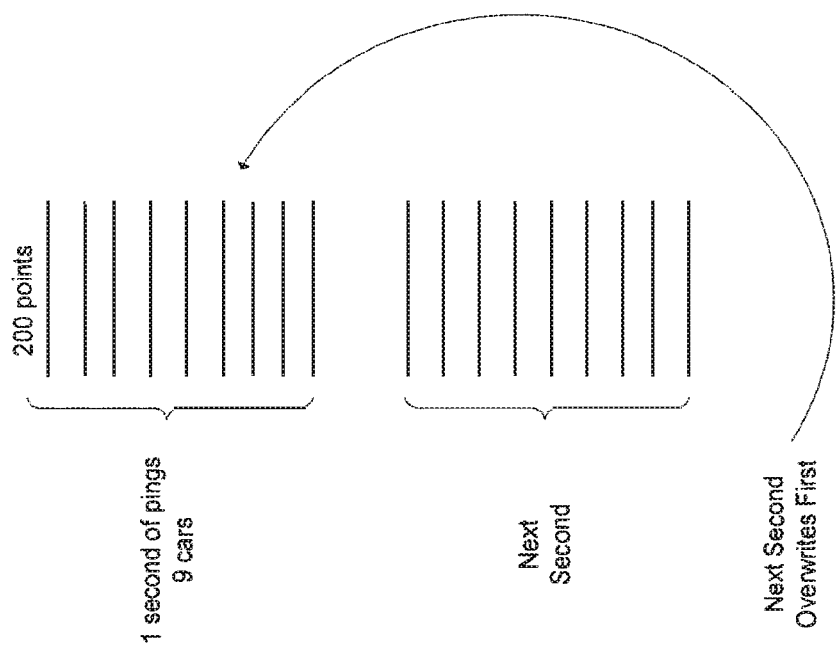
FIG. 39 is a diagram representing stored pingform data organized in harmonic blocks.

The pingform data are also organized according to harmonic blocks. FIG. 39 presents a typical organization of the stored pingforms. In the baseline embodiment, an entire harmonic block's worth of pingform data will be sent to the digital communications buffer of a car, to be broadcast as a pung packet to all other cars. Cars receiving this pungpacket message (always from at least one harmonic block time in the past) will place the received pung data into the same data_struct sub-structure where the pingform data are also being stored (labeled with the car from which the pung data were received). The pung data packet contains nine other cars' received ping data, and thus the pung data sub-structure is doubly labeled, first with the car from which the pung packet was received, and then with the car from which the pingform was originally received another car. This configuration in which all cars share all information is the baseline solution example, such that any car can create a full set-wide solution. Other embodiments may designate special cars that capture all the pung packet data and thus have the full information set necessary to calculate set-wide f-snippet solutions.

The pung structure associated with one harmonic block should have 81 other-node pingforms×10 pings per block×2 bytes per pingform data point or 1,620 bytes of information if no down-sampling or compression is used. This amounts to 18,000 bytes of pung information per channel per second, exceeding the channel capacity. Above, it was shown that only 3,600 bytes of pingform data per second were stored in the pingform structure, thus limiting the data transfer rate to 10 Kbps. One of the goals of PhaseNet is to reduce "PhaseNet Pung Overhead," the communications demand for the pung channel, to only a small percentage of a given channel's data carrying capacity. The baseline embodiment does not meet that goal; at the very least, the pung data rate must be below the channel capacity.

Figure 40:
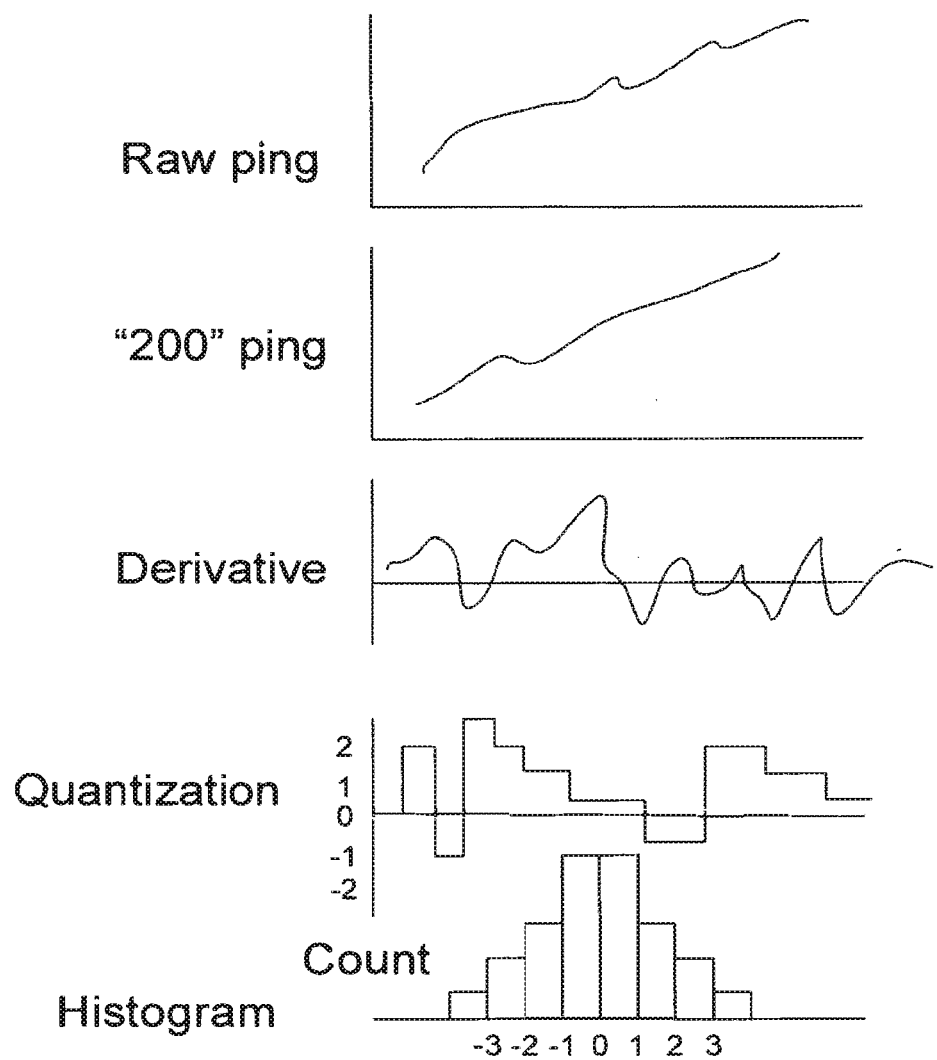
FIG. 40 is a set of five graphs depicting pingform compression using second derivatives and run length encoding.

This is where classic data compression comes to the rescue. FIG. 40 illustrates the two basic principles by which roughly a factor-of-10 reduction in pung data rates can be achieved, within solution accuracy specifications discussed later. The second derivative of the raw count-stamped ping data is well behaved, often at or near zero, thus facilitating compression using standard algorithms known to those skilled in the art. In the baseline embodiment, the pingform data are compressed before they are placed into the pung data packet (performed within the data_loop). The data is later un-compressed at a receiving car/node by its data_loop process, to be then placed into the receiving car's double-labeled pung structure described above. Commercially available software is fully capable of serving the compression functions, as most non-image based compression routinely handles one-dimensional data sequences.

A Detailed Look at Memory Ring Buffers

PhaseNet applications, including the baseline embodiment use ring buffers, that is, memory that has "old and fully processed data" overwritten with new data. In the baseline embodiment, a three second rule for harmonic block data storage and ring buffer flow is used. In brief, an initial three seconds' worth of data is placed into memory, then the fourth second's worth and all subsequent data overwrites the harmonic block from three seconds earlier. The size of the ring buffer is an arbitrary choice driven by the fact that the solutions_loop often processes a short sequence of harmonic blocks that cross from one second to another, and it would be preferable if neither of those seconds of harmonic block data is overwritten during processing. A "third second" is allocated for memory swapping, while "at most" two seconds of data are being accessed. This three second rule is deliberately simple. Experienced engineers working with much higher data rates and finer time-resolution on processing harmonic block data can push these ring buffer requirements down to the tens of milliseconds or even smaller.

Again, for the baseline embodiment, all data_struct structures outlined immediately above (the pingforms and the pung structures) adhere to this ring buffer management, with the info_loop, the data_loop and the solutions_loop ensuring that data processing is properly segregated from memory management and the process of overwriting data.

LINQS_LOOP Operation

PhaseNet software operation was introduced by first discussing raw data flow and data storage, but as FIG. 22, the info_loop, clearly points out, the data_loop and the solutions_loop are either (a) contained within the linqs_loop, as in FIG. 22, or (b) parallel rate-related loops in which the solutions_loop is constantly querying the linqs_loop to detect new H-family data. Regardless of the relationship of the linqs_loop to the other loops, it is appropriate to first discuss the lings_loop and H-family structures prior to how f-vector solutions are calculated, since those solutions depend on H-families and $H^{-1}$.

As previously described, the linqs_loop performs many tasks, and this section concentrates on how the linqs_loop manages instantaneous network topologies, including potentially swift changes in those topologies, thereafter supplying the solutions_loop with the appropriate family of solution frameworks, so as to reserve the solutions_loop for calculations rather than decision-making in highly dynamic, jammed or otherwise intermittent networks.

Referencing FIG. 23 first described in the PhaseNet dynamics section, the linqs_loop is the main process that relates a given node to its external world, even if it is only one ling to a trusted source, or, even if no current linqs are available and the node can only extrapolate from past linqs. Recalling that a ling is any information about a Qlocknode's relationship to the outside world, including INS unit data or magnetic compass data, one can better appreciate that 'no linqs available' is a rare condition for PhaseNet applications and puts such a Qlocknode into a classic "trajectory" through its best-guess of external parametric space. For the baseline embodiment, there is brief discussion of "no linqs available" scenarios, but here it is assumed that there is at least one, if not normally many, linqs available during any given harmonic block period. Linq configurations of interest herein are those that rapidly change from one harmonic block to the next, or over a few tens of harmonic blocks, corresponding to tenth-of-a-second class changing conditions. For PhaseNet applications, this class of condition volatility is the sweet spot for handling with real-world challenges and yet providing stable solutions.

With reference to FIGS. 22 and 23, the detailed steps of the linqs_struct and the linqs-loop in the preferred embodiment are described here. As part of the initialization begin in the main info_loop, an initialization process is initiated in the linqs_loop. The primary process is to inventory and set up sub-structures for linqs, including those that are not in use but are candidates to become linqs. These candidates facilitate processes in which data flow from main linqs is insufficient, and active search processes for supplementary or replacement linqs is needed. The primary linqs inventory process also includes storing, the linqs registered by a Qlocknode and, in turn, linqs for those, etc. In other words, the Qlocknode in question attempts to understand regional network topologies as best it can, and to communicate with other Qlocknodes what it knows about regional topology.

Topology information is stored in the regional_topology structure. Operation of the linqs_loop includes constantly updating regional_topology. In the baseline embodiment, for the initial configuration, all cars register that ten cars are part of the regional topology and that each car can communicate pings with all other cars.

Initialization within linqs_loop also includes estimating and storing initial coarse direction and coarse range vectors. There are many ways to do this. The general idea is to determine coarse range to roughly one-tenth of a ping-time as projected into audio spatial distances, and to determine coarse direction to a very coarse five or ten degrees. These specifications later determined the accuracy and residual error of calculations performed in the solutions_loop.

Figure 41:
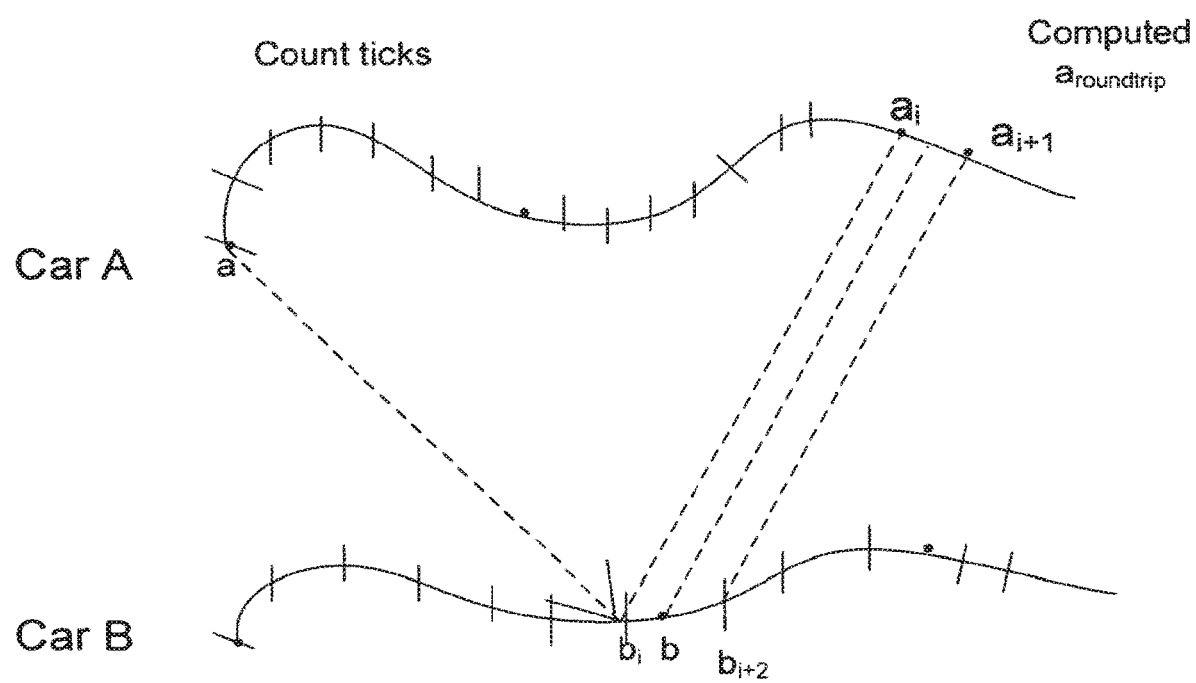
FIG. 41 is a diagram demonstrating determination of a coarse range estimate between two network nodes.

A car in the group of ten can determine coarse range to each of the other nine cars according to the following straightforward method, as depicted in FIG. 41. A count-stamped ping is sent out by car A at count-stamp a and received by car B at count-stamp b; car B meanwhile sent out a ping at its count-stamp $b_i$ sometime just before b, and likewise sent out a ping at count-stamp $b_{i+1}$ just after b; car A records these pings from car B at $a_i$ and $a_{i+1}$ respectively, where each of these is a fractional count value; the value $a_{roundtrip}$ is calculated taking the fractional value of b about $b_i$ and $b_{i+1}$, and applying the same fractional value between $a_i$ and $a_{i+1}$, then subtracting the original ping count-stamp value a; the coarse range is then $a_{roundtrip}$ 12, in which the coarse range is calculated in units of car A's counts (not seconds, meters, etc.). In short, this is just the round-trip speed of sound as measured in car A's counting system. The 'coarse' conversion then assumes that car A's counter is well-calibrated to units of seconds. Then using the speed of sound in air, FIG. 41 shows the final coarse range estimate that will be stored to define the initial coarse range between two cars. Since the cars may be moving during this initialization process, this estimate can be improved as the solution families emerge and converge on asymptotic solutions, thus informing and revising the coarse range estimate as the car positions dynamically evolve.

Figure 42:
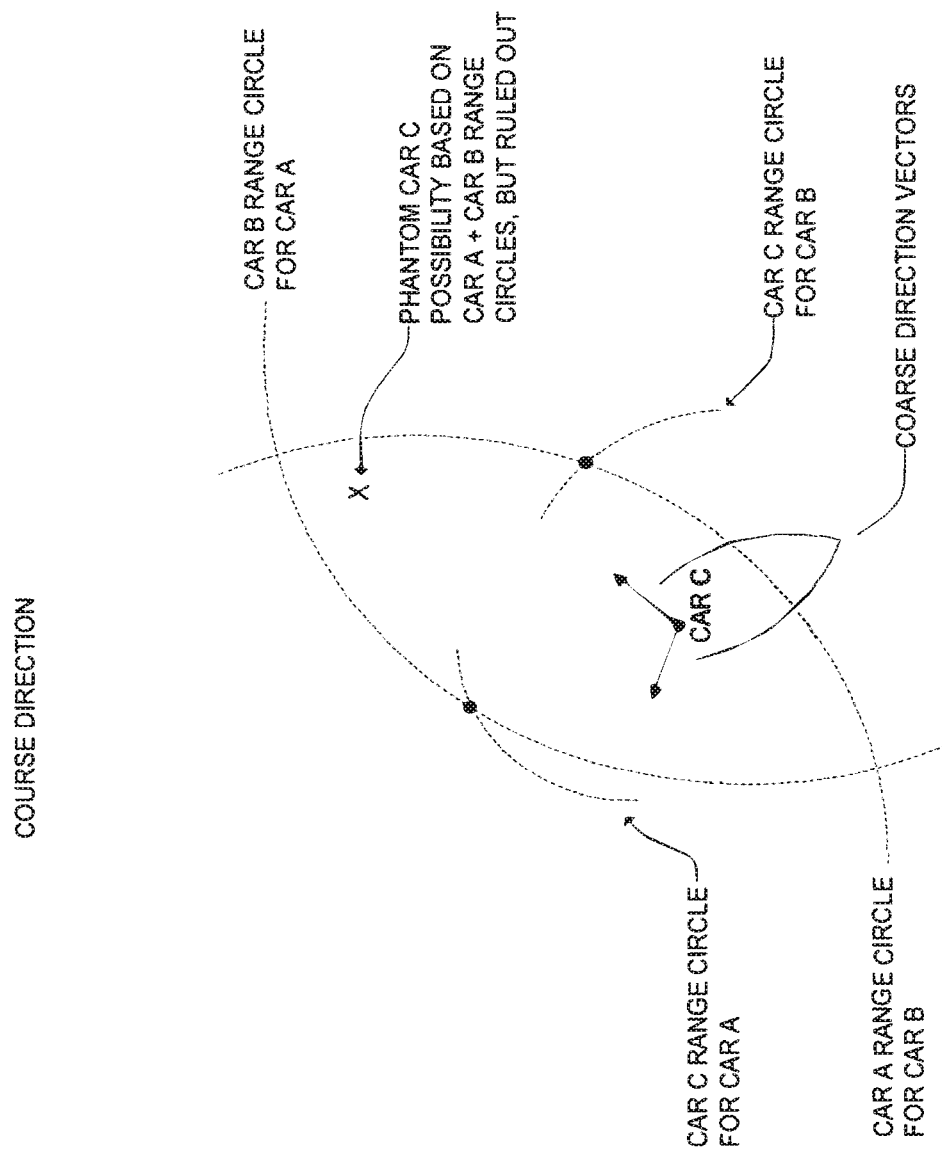
FIG. 42 is a diagram demonstrating determination of coarse range estimates of more than two network nodes.

Coarse direction can likewise be initialized and updated though the direction calculation may be more convoluted than the coarse range calculation. The good news is that, relative to the coarse range specification of one-tenth of a ping time, the coarse direction vector need only be known to a few degrees or even ten degrees for many applications, including the baseline embodiment. The way the cars will determine it, presuming there are no 'directionality' capabilities built into the audio communication system, is through an initialization process of comparing and triangulating on the full set (45 in the baseline embodiment) of coarse range estimates calculated above. The process is straightforward: Once two cars determine their coarse range, they may introduce a third car and draw range circles around the first two cars, as depicted in FIG. 42. These circles intersect at two candidate locations for the third car, relative to the first two cars, where one location is the real one and the other is a "phantom" location. The phantom is ruled out quickly upon introducing a fourth car (not depicted), at which point all cars resolve themselves to single three-way intersections with rare exception. When the fourth car is added and the first two cars perform the same two-candidate process, the two added cars may compare notes and resolve the two-candidate equivocation for the whole group of four, also depicted in FIG. 42. This process is repeated until all ten cars are included, and indeed, advanced methods can perform least squares fitting to the web of triangulations, shoring up the accuracy of the resulting coarse direction vectors.

Figure 43:
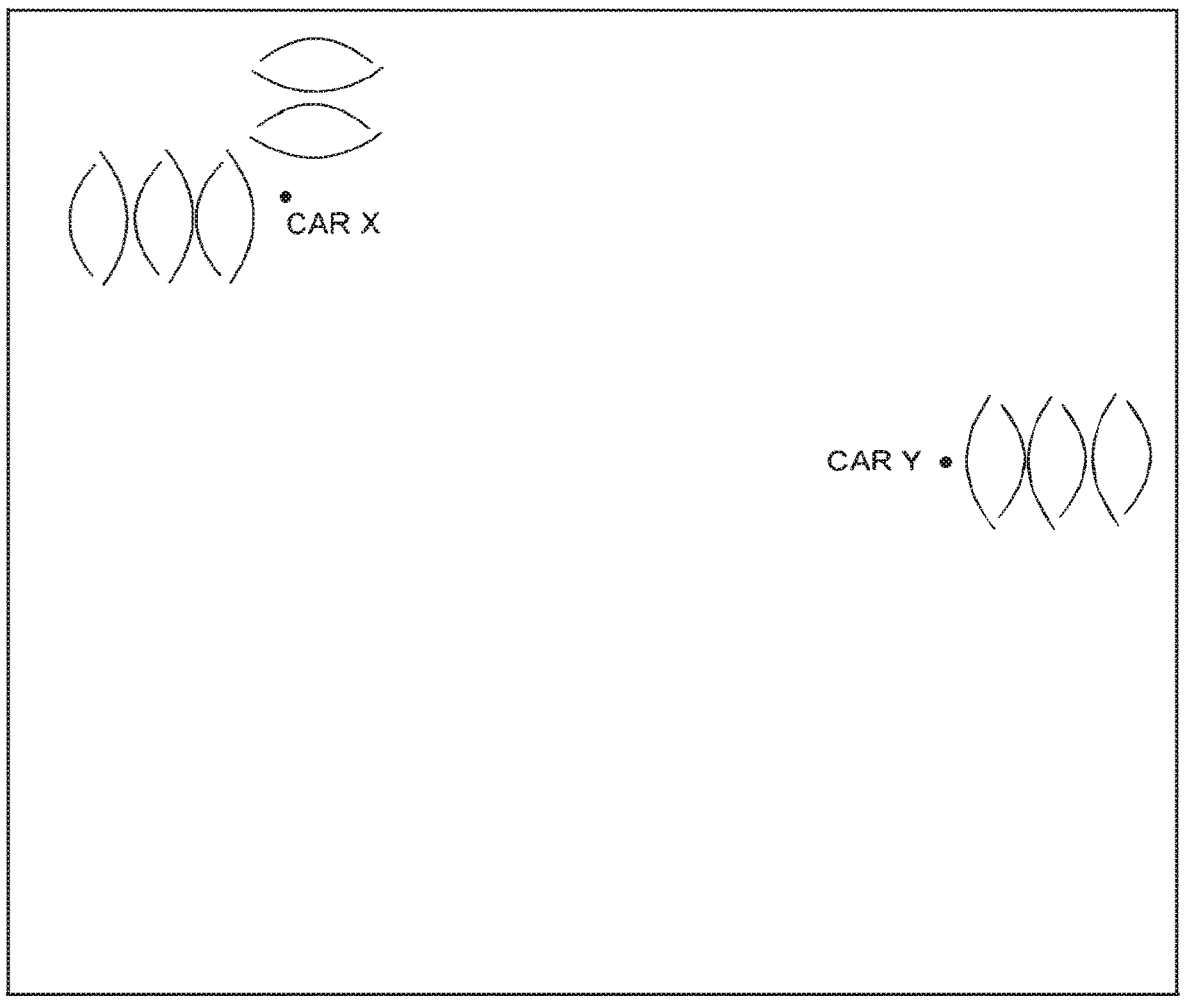
FIG. 43 is a diagram illustrating use of echo location to determine boundaries of an external framework.

The actual units and reference direction used by the coarse direction vectors are arbitrary, but must be specified. An external framework such as the gymnasium floor and walls, for example, is initially ignored by the cars. However, later, the cars may identify the locations of the walls and then use the walls as a set-wide agreed external framework. In this case, one car is designated as the external frame explorer and performs echo-location from its own location. As FIG. 43 indicates, the explorer car finds four primary echo locations to the four surrounding walls. Another car may repeat this procedure, and yet another. FIG. 43 shows how the set may positively determine where the four walls are relative to the group of cars, and thereafter agrees to use x and y coordinates to store their coarse direction vectors as depicted in FIG. 43.

The results of this cooperation and agreed framework is that the initial coarse direction and coarse range data is stored in the appropriate data structures. These structures are updated on an ongoing basis, with guidance from the solution families without repeating the initialization processes. However, processes are also established to ensure that the solution families adhere to the chosen external framework, not only to ensure accuracy in the coarse data structures, but also to ensure the PhaseNet space-time solutions remain fully compatible with classic positioning systems such as GPS.

H-Family Creation within the LINQS_LOOP

The linqs_loop then proceeds to create the H-families and certain H inversions that the solutions_loop will make use of. The H_family_struct is the ultimate destination for the results of this aspect of the linqs_loop. The high level explanation of H-families was already discussed, and here are presented a few more details.

"H_family" refers to all mathematical relationships between acquired data and space-time solutions. GPS uses an N×4 matrix, where N is the number of actively received satellite signals; this matrix and its inversion belong as members of the H_family_struct, to the extent GPS is subsumed or utilized by any PhaseNet node. Just as shepherds whistle to dogs, not simply to convey instructions (round 'em up) but to impart timing and positioning information between whistles; Qlocks, by way of descriptions of the relationships between specific whistles heard (the data) and by way of actions taken in a spatial and timing sense (the solutions) belong as members of the H_family_struct.

This analogy emphasizes that equation (3) and its H element are interpreted as broadly as possible. The idea here is that PhaseNet protocols incorporate and support past, present and future methods of calculating time and position. This compatibility allows PhaseNet to be universally scalable not simply across small to vast spatial scales, but also across all industrial and scientific applications as well. The PhaseNet platform is flawed without this aspect. Thus, the H_Family label and its associated structure may potentially become a very complicated repository for signaling and numeric methods associated with a Qlock. Applications-level software engineers need only know how to relate vectors using equation (3); the H_family class of structures and functions tracks the details as directed by a Qlock.

This flexibility regarding contents of the H_family_struct does not imply that there is no preference from the start. A preferred embodiment of PhaseNet explicitly chooses the 'multiple-epoch waveform equations' or MEWEs as the default and recommended primary relationship between data and solutions, and hence the normal and default member of the H_family_struct.

Figure 45:
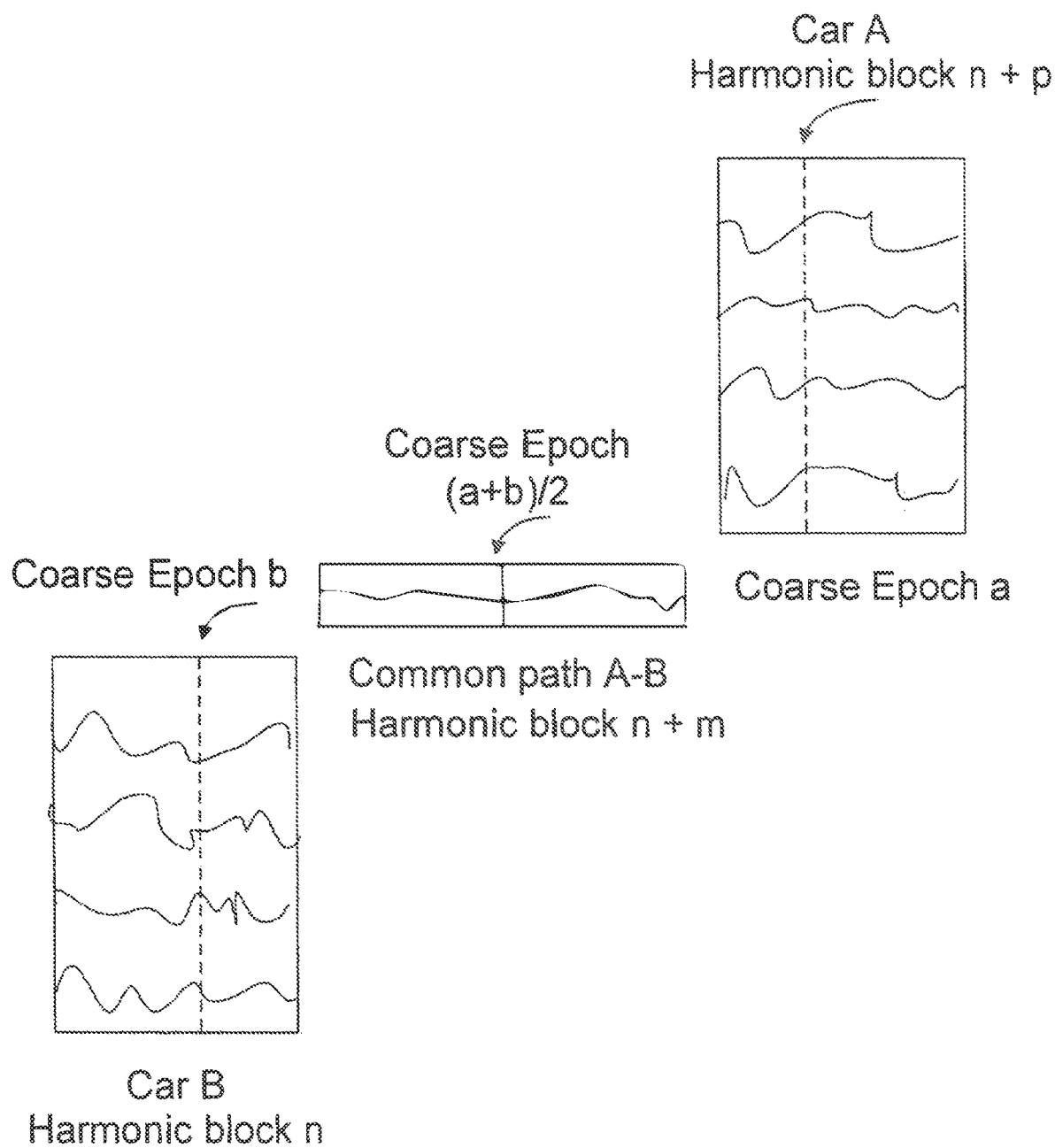
FIG. 45 is a set of diagrams presenting an intuitive representation of waveforms corresponding to the waveform equations set out in FIG. 44.

These MEWEs are laid out conceptually in FIGS. 44-48. FIG. 44 formally introduces a MEWE, and FIG. 45 lays out a specific harmonic-block formulation for it. The interpolation may "spill over" into adjacent harmonic blocks, though this is a fairly straightforward programming issue to deal with. FIG. 44 shows the explicit parametric forms of the equations, while FIG. 45 gives the intuitive view. The waveforms in FIG. 45 are depicted as generic wiggles that represent the trajectories of a car and its clock/count drift. The waveforms can also represent the car's orientation, electronic delays, or a parametric waveform that may play a role in affecting the 'darrival' raw data.

Figure 46:
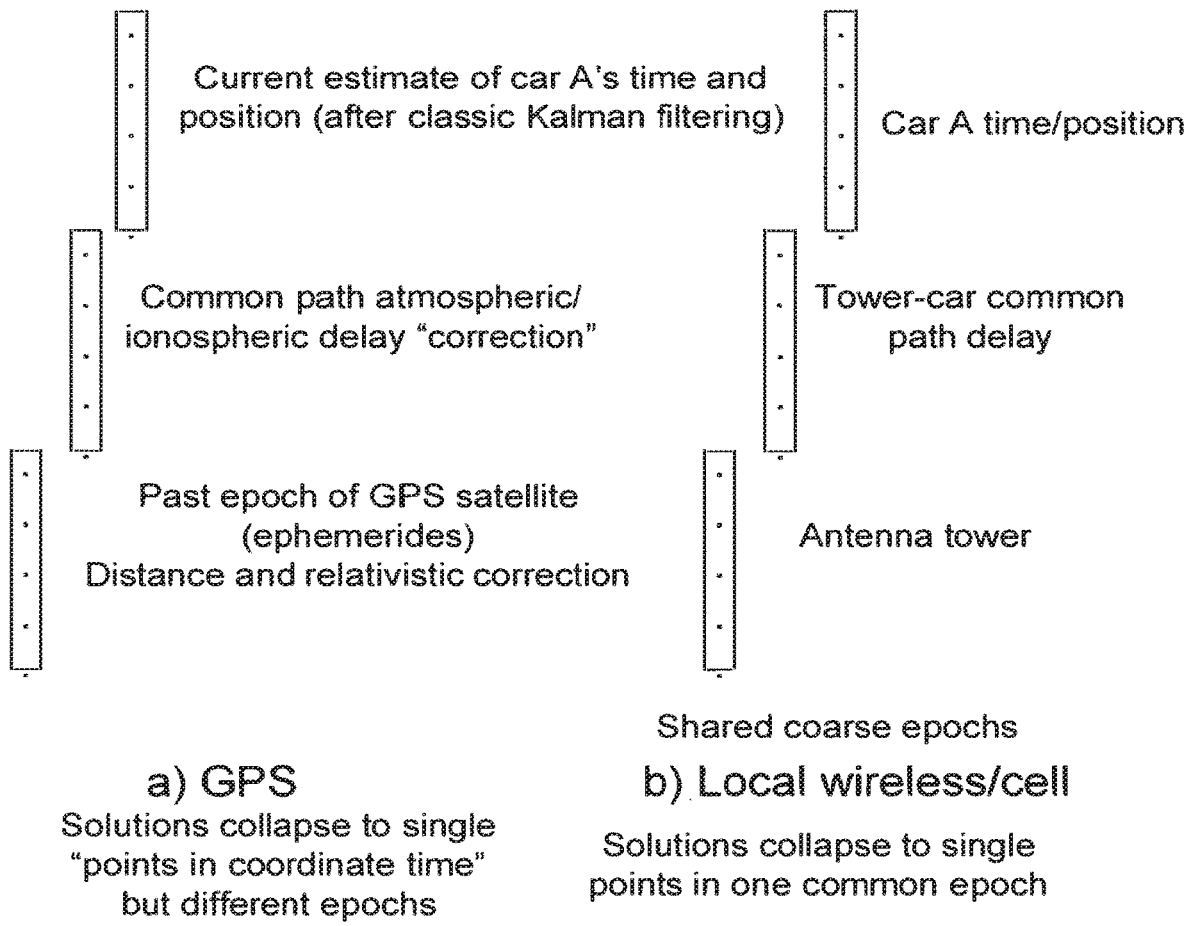
FIG. 46 is a set of diagrams depicting two subclasses of MEWEs, including GPS and local wireless/cellular networks.

FIG. 46 then introduces two very important sub-classes of MEWEs that are familiar to both GPS cellular/wireless positioning system engineers. FIG. 46 depicts the (non-pejorative) degenerate MEWE cases of (a) GPS and related systems, where the past-epoch sending of a ping from a satellite becomes a "correction factor" in an otherwise single-notional-epoch N×4 matrix formulation; and (b) localized cellular/wireless networks, wherein the transmission of electromagnetic waves is effectively instantaneous relative to the timescale of spatial movements being measured. In both degenerate cases, geometric solutions can easily be formed using classic triangulation methods and pseudo-ranging. The difference between full MEWEs and degenerate MEWEs boils down to two aspects: (1) the use of continuous waveforms as opposed to "point in time" methods in the degenerate cases; and (2) the a posteri versus a priori introduction of an explicit metric space.

The reason the two degenerate cases are immediately introduced along with the formal definition of MEWEs is to emphasize that even MEWEs are rather broad in the assumptions, approximations and constraints that can potentially be applied to them. A "PhaseNet-wrapper description" of most prior art space-time measurement systems is accommodated by the basic PhaseNet protocols and architecture.

Later sections give examples of the full MEWE approach for the audio-based cars, followed by replacing the audio with EM-based 802.11 where it is shown that degenerate MEWEs can perform quite well in gymnasium-scale applications for position measurement (though they begin to break down for higher bandwidth phase-noise measurement). Measuring higher phase noise bandwidth within a group of nodes is a factor behind using full MEWEs versus degenerate MEWEs.

Figure 47:
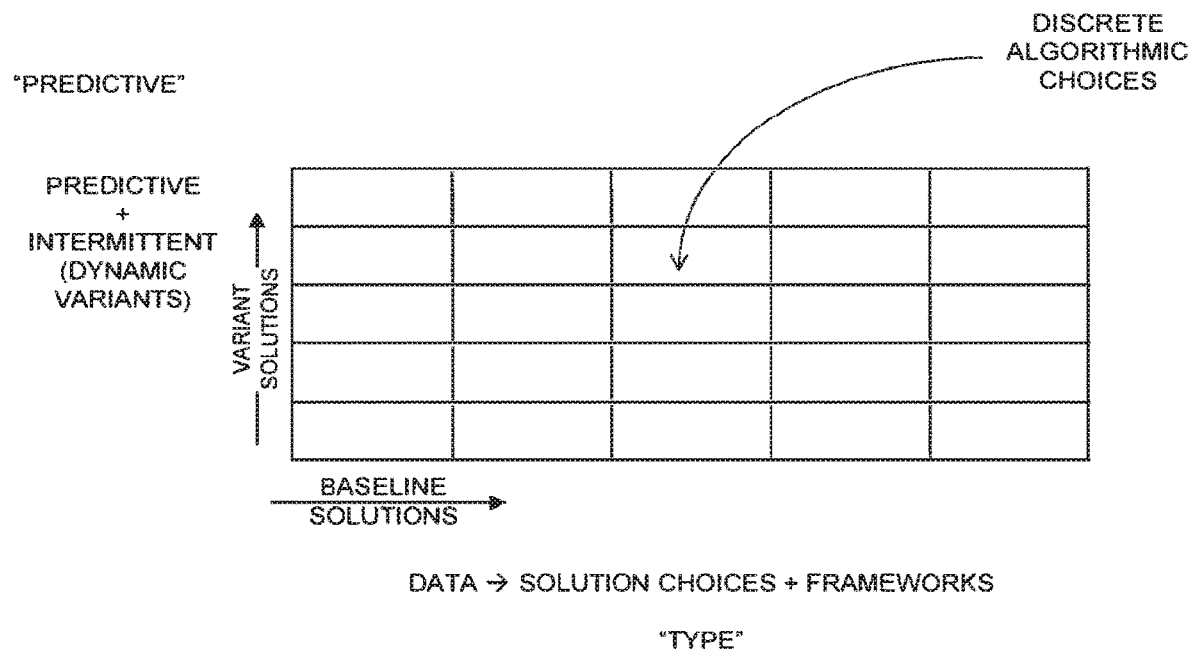
FIG. 47 is a diagram depicting the organization of families of H matrices.

Before moving on to specific examples of H_family creation, however, it is advantageous to discuss the two discrete axes of H_family members, depicted in FIG. 47. The horizontal axis has already been described: the vast range of relationships between raw data, vector g, and solutions, vector f, with the favorite and default child being MEWEs. The vertical axis will be summarized here, with a few specific examples later described.

The vertical axis is the "Predictive and Intermittent" distinction between H_family members, a key pragmatic aspect of how PhaseNet operates. The PhaseNet architecture is designed to operate in increasingly dynamic, harsh conditions. The structures employed must be capable of evolving to more dynamic applications, and to more intermittent channels and data sources in the millisecond range. This may not be required for audio-cars not to collide in the gymnasium, but it can become important in life safety applications such as collision avoidance in urban canyons or on the open road. The 'predictive' aspect of H_family structures goes to the heart of this pragmatic goal.

The simple way it does this is by not just calculating one single H matrix or one single H-relationship between g's and f's, but a range of H's that may apply within the next few seconds to minutes of operation. The range can include statistics on whether a given channel will be available during a specific harmonic block period (10 milliseconds in the baseline embodiment). This is particularly important in packet-based communication systems such as 802.11 in which a given channel may be inoperative for seconds or more, at least from a ping-sending if not ping-receiving point of view. The range may also include predictive dynamics in the local group, in which coarse range and coarse direction vectors move through their tolerance ranges on sub-second timescales, indicating slow evolution of the H structure in relation to the harmonic block period.

The predictive axis of the H_family structure is primarily a real-time efficiency mechanism that takes into account what kind of CPU resources are available to a Qlock, how to best utilize register-level circuitry within the CPUs and how to properly schedule H inversion calculations in time for the solutions_loop computes f solution snippets as simple vector processing steps. While the predictive axis of the H_family structure is not absolutely necessary to PhaseNet operations, it is central to PhaseNet's application in harsh, jammed and intermittent environments. The baseline embodiment of the cars illustrates some rudimentary examples of H_family members within the two axes of FIG. 47.

Figure 48:
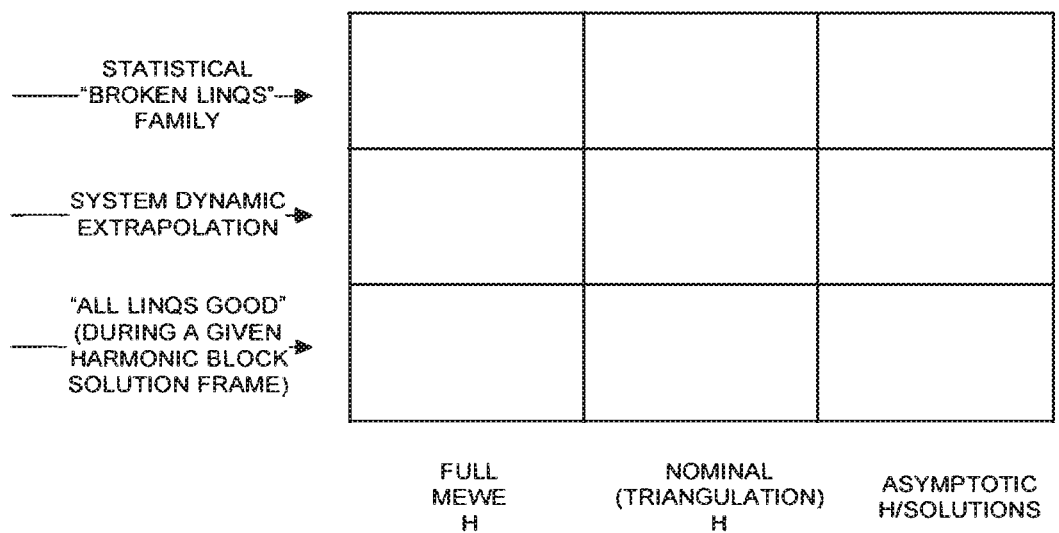
FIG. 48 presents an example of three H matrix family solutions for the baseline embodiment of 10 cars described in part with reference to FIGS. 3b and 5.

FIG. 48 shows an examination of three 'type' families of solutions in the baseline embodiment, along with 'predictive' variants on two of the types because the third type does not entail much prediction and advanced calculation. This range of H-family examples is sufficient to illustrate the software-function aspects of the H_family_struct as well as presaging a more detailed discussion about solution types and the solution structures.

The initial horizontal position (vertical column) on the bottom of FIG. 48 is naturally the MEWE-type of H solution, with the current state of the network as the top example, followed by some example predictive variants based on the current state. There is also a 'nominal' H type, which will use quite classic triangulation methods in forming solutions, as well as an asymptotic type H structure. These H-types correspond to the three basic classifications of the solution types.

Figure 49:
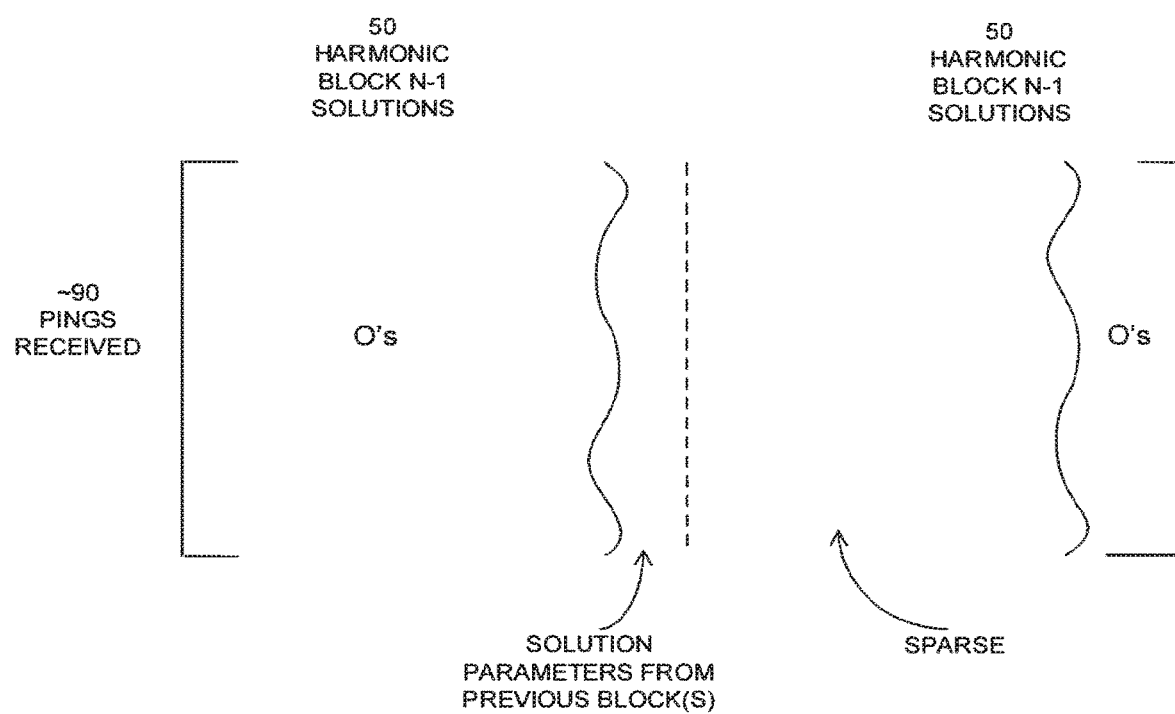
FIG. 49 is a diagram depicting data flow associated with numerically populating H matrix rows.

Recalling FIG. 5 and imagining a top-view of the starting positions of the cars (assuming that the cars have performed the coarse range and coarse direction operations as previously described), followed by FIG. 49, which is a graphic depiction of the pings received during a single harmonic block period for this specific configuration. This FIG. 49 describes how H matrix rows are populated numerically, using a "what data have I received during this specific harmonic block" approach: pings sent out during this harmonic block may or may not have been received during this period, while some pings received during this period were launched during a previous harmonic block. The solutions_loop discussion examines the details of this "double frayed edge challenge," while this section simply highlights the raw harmonic block's structure.

The particular example of FIG. 49 reveals that the formation of one raw harmonic block gives M pings being received and N parametric solution points. The M/N ratio, in this case X, is much smaller than the over-sampling ratios (indicating an expectation of Y discussed earlier) because of interpolations in the parametric solution waveforms and the double frayed edge issues. Quick approaches outlined in the next few paragraphs will produce a ratio closer to the expected values, and asymptotic solutions do in fact converge on the ratio Y. FIG. 49's representation does contain all 10 cars' worth of ping data and all ten cars' parametric solutions. This implies that each car will need to receive all appropriate pung data from the other nine cars before the g vector is complete and can give rise to an f-vector snippet solution.

One option not taken in the baseline embodiment is to simply invert the implied H matrix of FIG. 49. Significant regularization is required in inverting a single harmonic block (except in the PhaseNet case where the harmonic block is relatively long and the time-scales of the local group minimize or even practically eliminate the double frayed edge challenge). This inversion would be an H-family composed of one member.

A preferred approach is to string together a few harmonic blocks into a single H and its inverse that represented the optimal current state of the system, then to consider likely variants around that optimal state. The fate of the single optimal H's inverse will be placement into the current_ Hinv_ struct structure of the solutions_loop as, usually, the most likely vector processing array within the solutions_loop (the most likely H-family member).

FIG. 13 (which is drawn more abstractly in FIG. 50) depicts two harmonic blocks strung together along with 'clamps' on both edges. FIG. 50 shows its associated H-matrix on the left, and the inversion of the H-matrix on the right, where the inversion entails regularization methods alluded to in FIG. 50. The inverted H-matrix depicted on the right is the current_Hinv_struct for the baseline embodiment. It is calculated in the linqs_loop and placed into the solutions_loop sub-structure, the most-used structure in the solutions_loop. In the baseline embodiment, this encapsulates the relationship between raw input data, pings, and raw position and timing variation output.

Figure 51:
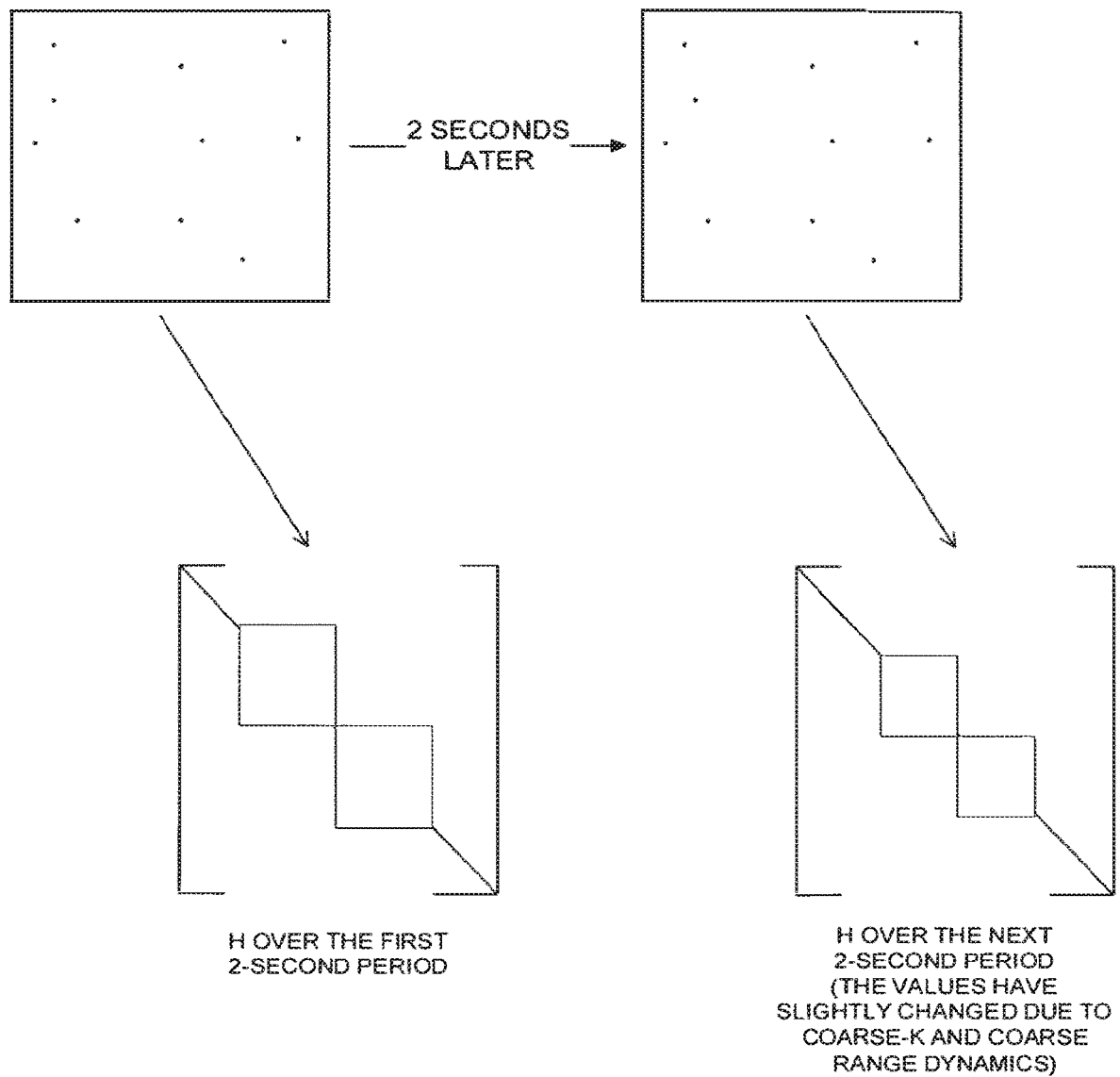
FIGS. 51 and 52 are simplified diagrams showing examples of two variants on a nominal inverted H matrix.
Figure 52:
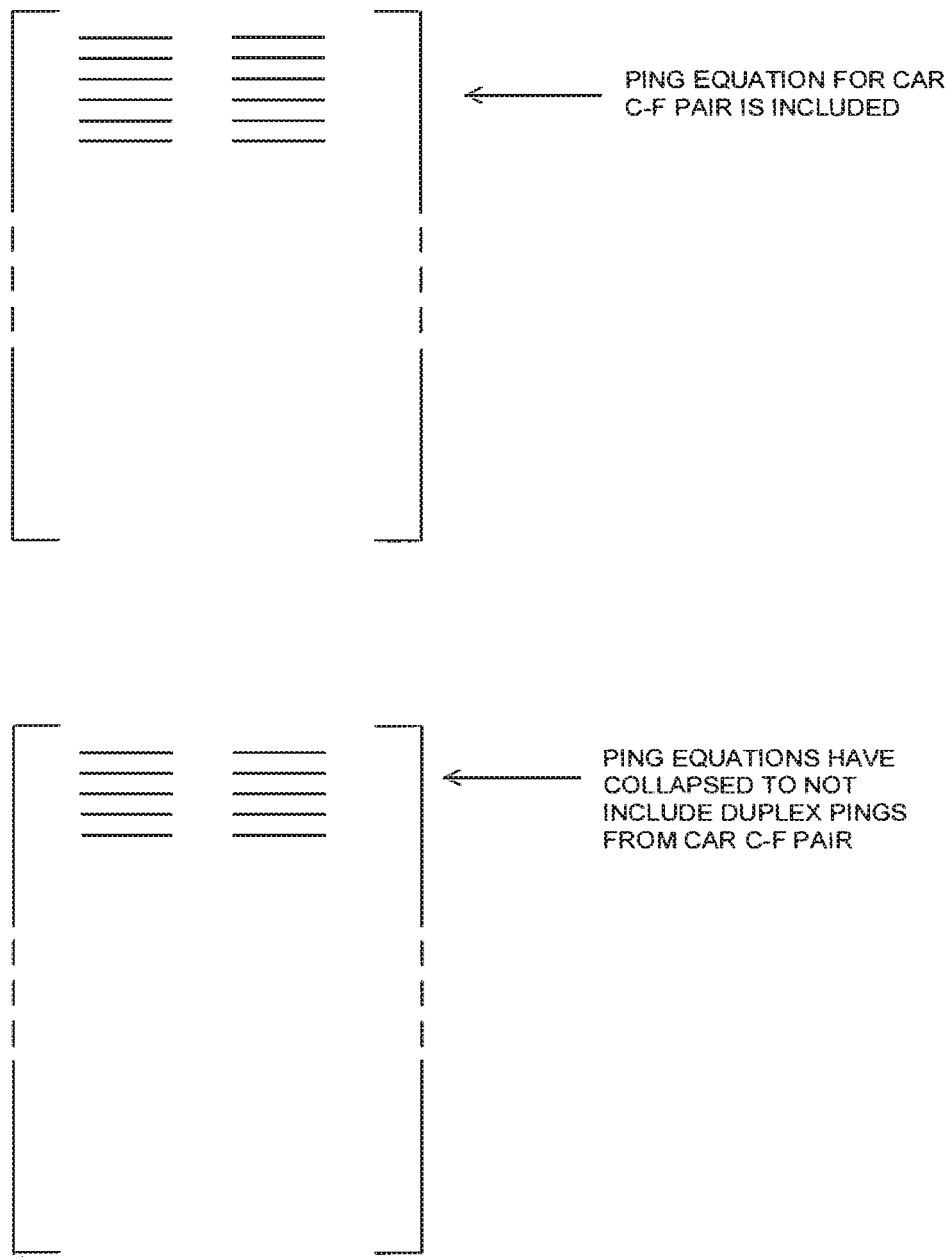

FIG. 51 sketches two examples of variants on the nominal inverted H-matrix. FIG. 51 shows how a small sub-routine (that one practiced in the art of basic dynamical systems can readily create) predicts that the motions of the cars will bring them into an "out-of-specification" condition in approximately two seconds from the current epoch—where enough of the direction vectors k will have changed by 10 to 15 degrees—and the new predicted direction vectors are already being processed by the linqs_loop, loaded into a predictive H-family structure, and possibly even inverted, if the confidence on the prediction is sufficiently high and CPU usage can justify it. Likewise, a simpler example is presented in FIG. 52, where, for example, it is expected that the line-of-site audio communications path between car C and car F is partly occluded by car B over a roughly half-second period, and bi-directional data in the C-F channels may become suspect during this period. An H-matrix and associated H-inverse are thus calculated under the assumption that certain two to three harmonic block strings will ignore the C-F channels as determined on a block-by-block basis by the solutions_loop, and therefore the alternate or predictive H-matrix thus calculated will be performed with the C-F channels completely removed. Those practiced in the art of dynamic systems programming will appreciate that this description of the lings_loop is necessarily brief and that there exists a wide variety of options available to implementers of these kinds of PhaseNet systems. Nevertheless, in FIGS. 51 and 52 and their associated discussion make readily apparent how PhaseNet can adapt to network configurations at the harmonic-block timescale.

The Solutions_Loop: Weaving f-Vector Snippet Solutions into Error-Estimated Solution Families The method by which the solutions_loop performs these collective operations at the component level has already been laid out in previous sections, with explanations of specific data structures and explanations of the info_loop, data_loop and lings_loop operations.

It has been shown how ping data and pung data accumulate through data_loop processes and are available to the solutions_loop. It has also been shown how the lings_loop keeps track of harmonic-block-level network topologies. The discussion now turns to how f-vector snippet solutions are formed in the baseline embodiment, and how these snippets can be strung together into error-bar encapsulated continuous space-time solutions for a given Qlock, its relationship to neighboring Qlocks, and their collective placement into one or more external frames.

For example, f-snippet solutions have already been described with associated discussions on how snippets can be strung together in a pseudo Kalman-type fashion. This section emphasizes on software-hardware processes inherent in the solutions_loop as a defined entity. The job of this entity is to compute space-time solutions and their associated error estimates. There exists a myriad of options available to implementers for specific algorithms and accommodating families of algorithms and solutions. The solutions_loop may be seen as a vesicle for a range of evolving algorithms, with an initial high level organization between classic triangulation-based solutions that ignores speed-of-communications delays between nodes or treat them as post-hoc corrections, interim harmonic solutions that isolate group-level intervariability, and the more scalable and robust MEWE-derived asymptotic solutions and the unavoidable reality that realtime data collection systems of any kind can only asymptotically define past metricized states.

Node-Centric, Local Network Space-Time Solutions

The most general form of PhaseNet solutions entails that a single node should determine its own space-time solutions based on neighboring nodes it is in communications with, where the notion of the linq extends this somewhat by treating internal instrumentation as linqs to some form of external node. This property of a single node is fundamental to the scalability and network robustness of PhaseNet.

As with all aspects of PhaseNet, the choices and details of precisely how to do this are deliberately and maximally flexible and adaptable to both application directives as well as improvements in technology and information sciences. This flexibility is built into the protocols and structures utilized to formulate ongoing matrix solutions and governs the time-dependent evolution of the matrices involved.

Figure 53:
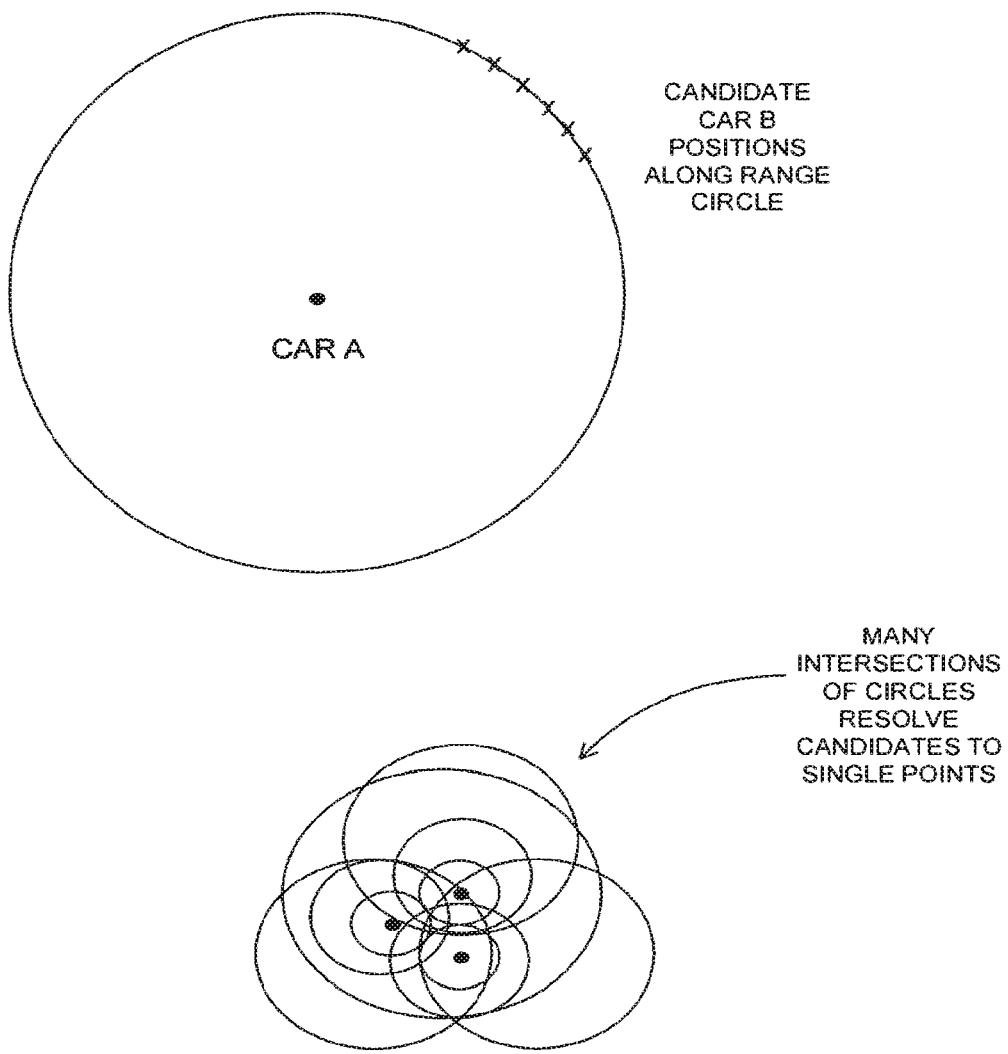
FIG. 53 is a diagram demonstrating a node using classic range circles to determine its location.

Perhaps the simplest form of this node-centric point of view is a combination of external de facto trust combined with a classic pre-defined metric space that forms the mathematical basis to express trust. In other words, a given node simply accepts the estimate of a neighboring node in that it was definitively at location $x_i$, $y_i$ when it sent out ping; at globally synchronized (coordinate) time $t_i$, the same given node trusts its own clock in that it received ping; at time $t_j$, the given node collects such pings from several neighbors accordingly, and determines its location based on classic range circles as indicated in FIG. 53. For pings that the given node sends out very close in time to $t_j$, the node will report this spatial estimate to its own neighboring nodes that in turn those nodes will rely on. This essential concept lies behind the 'nominal' solution family and, giving credit where credit is definitely due, nominal solutions can become extremely refined and accurate especially as set within a relativistic reference metric as with GPS, GLONASS and the upcoming Galileo time/positioning satellite constellations.

Likewise, perhaps the most general form of this node-centric point of view is that a node's solution family exists within embedded and (using coarse-metric definitions) spherically expanding clouds of set-wide nodes, where quicker error-prone solutions can be initially formed relying only on local sets of nodes, while eventual global set-wide asymptotic solutions can eventually be formed for any given node as set-wide pung information is globally shared and made available to the node in question. Fortunately, this most general form of node-centric solution can be kept as an exercise in reference frame creation and operation.

The solutions_loop independently quantifies its own linqs, relying upon implied network topologies both local and global, incorporates pung-channel data into its own solution framework, treats nominal versus harmonic versus asymptotic solutions relative to the specified needs of its host instrument or device (the car), and how it presents (and represents) its solutions to other Qlocknodes.

Pre-Defined Metric Framework Solutions: The Nominal Solution Family

Referring to FIG. 53, skilled persons can appreciate the simplicity inherent in non-relativistic formulations of nominal space-time solutions. Adding relativity to the party provides critical correction factors when viewed at global spatial scales and nanosecond time scales, but the underlying location solution concepts remain generally the same.

In GPS nominal solution approaches, clock-drift on client receiving devices becomes a central parameter in the known and anticipated deviations from geometric ideals, and thus there are more circles depicted in FIG. 53 than straightforward geometric triangulation would require, such that the additional circle (through linear algebraic combination) allows solution for client clock drift as well.

The strength of this "pre-defined metric" approach is that it follows time-honored standard ideas. It works quite well for many applications in which meter-level spatial accuracies suffice or nanosecond-level time accuracies. The weakness of this method for use in PhaseNet-based networks is that it encompasses a whole host of "ultimate standards" questions (e.g., 'who knows where who is and what gives them that authority?'), that questions do not affect PhaseNet's basic operation and tend to be responsible for at least some of the inaccuracy in solutions. PhaseNet harmonic and asymptotic solutions focus on the interactions and inter-relationships between elements in sets and subsets. Whereas nominal solutions attempt to account for errors in external-trust-based frameworks, harmonic solutions proactively try to measure the variational in the error. With harmonic solutions, it is as though corrections to the official ephemeredes of the GPS satellites that were updated every hour or minute are now updated every millisecond, not just because there are more efficient communication processes in place, but because the GPS satellites themselves can actively participate in group-harmonic solutions.

Figure 54:
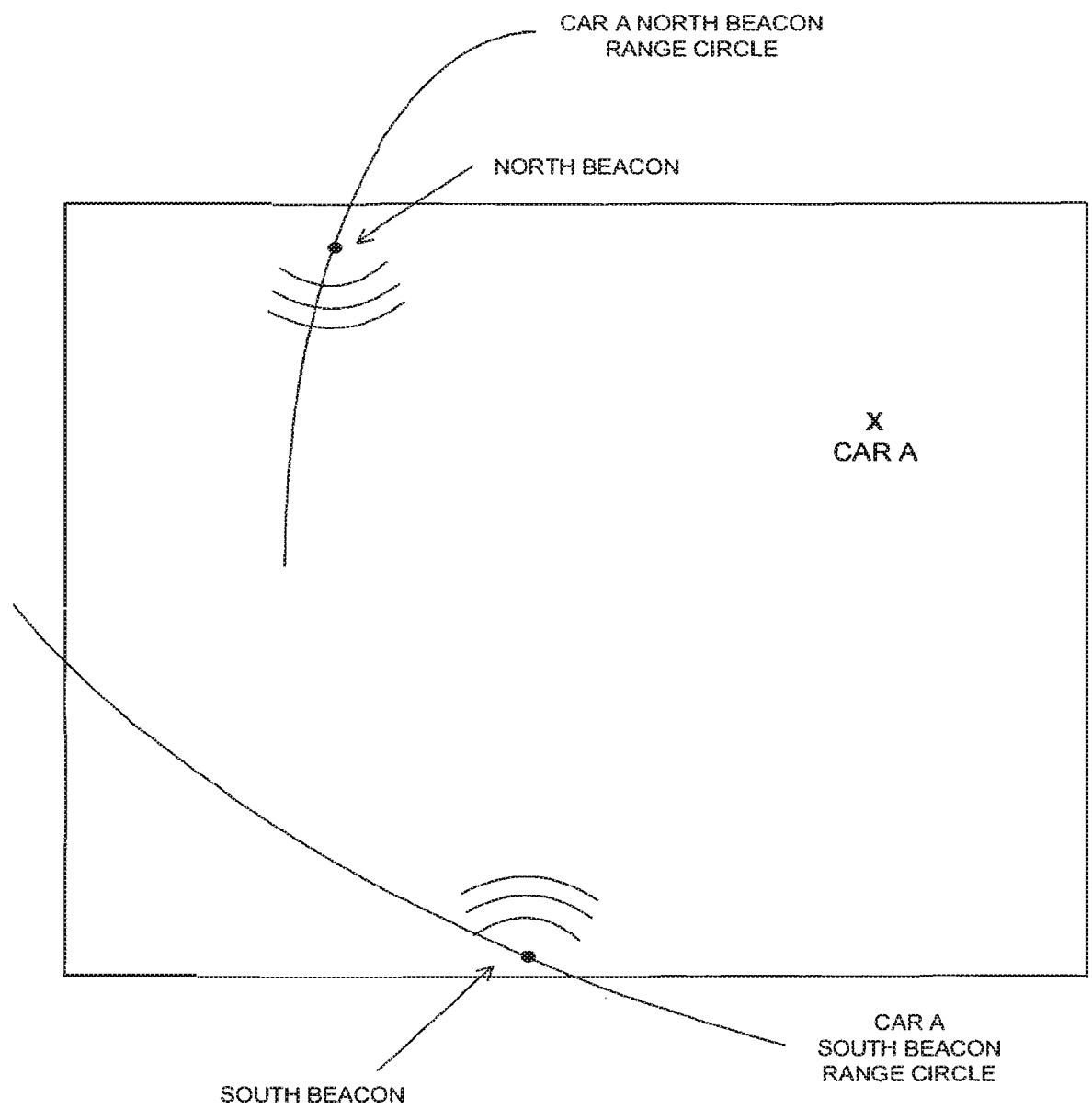
FIGS. 54 and 55 are diagrams demonstrating a nominal solution approach and presenting nominal solution waveforms, respectively, for the baseline embodiment of 10 cars.
Figure 55:
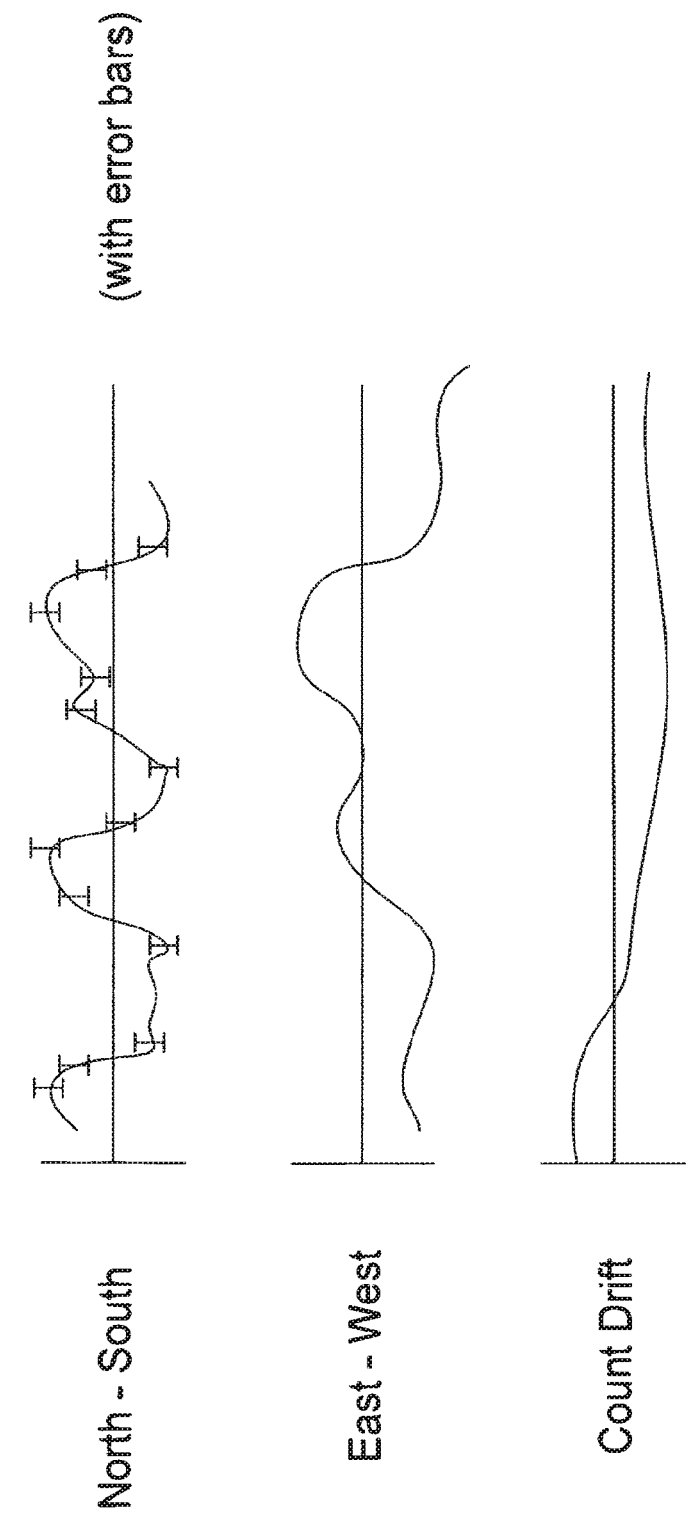

FIG. 54 depicts an explicit nominal solution approach for the baseline embodiment of the ten cars. For simplicity, two north-south audio reference beacons are placed at opposite sides of the gymnasium to initialize a set-wide agreement on an external framework, also serving to ground the X-Y grid system of the gymnasium floor. The beacons could establish a standard for set-wide timekeeping by transmitting clean uniform timing signals (beeps), that cars could either directly use as delay-adjusted time or as a master timing signal against which the cars may check their own clocks. In most aspects, this nominal solution enables the baseline embodiment to function at a rudimentary level. Using bar plots alongside nominal solutions is also a straightforward algorithmic approach, with FIG. 55 depicting the resultant output waveforms that would be placed into the solutions_struct.nominal data structure, and the error bars would either be explicitly stored in the ratings structure or some coarse general value of the error bars would be stored there. 'Nominal' solutions thus enable PhaseNet, albeit with known limitations that the harmonic and asymptotic solutions attempt to address.

The Harmonic Solutions Family

Harmonic solutions get their name 'harmonic' from the utilization of harmonic blocks as a practical method to construct equations within sets/groups that either or both exhibit: (a) unknown interacting waveforms with inherently different underlying time constants (bandpass characteristics); and (b) non-trivial and essentially arbitrary delays between the waveforms of one node and another node. Said another way, the harmonic block approach replaces classic discrete-time interaction descriptions with short-snippet harmonic waveforms that retain delay characteristics according to the coarse direction vectors and coarse ranging. A huge motivating factor in the choice of using harmonic blocks, beyond the added fidelity afforded in handling mixed time-constant parameters, was the simplification of H-matrix row and column logistics that otherwise becoming unwieldy in discrete-time formulations for relatively dynamic systems and/or local solutions involving more than a few nodes.

The formal use of the term 'harmonic solution' in PhaseNet expands beyond its generative aspect of using harmonic block waveforms by also encompassing the purely variational nature of both input data and solution output. In simpler terms, the inputs are variations/changes in some otherwise intuitively defined metric, as well as the outputs being the same kind of changes or variations. As mentioned earlier, a 'dx' is just as legitimate as an 'x' as an element of the f-vector solution being calculated. One of the great benefits of using a variational foundation for the harmonic solutions, in conjunction with the approximation represented by the coarse direction and coarse range variables, is the construction of purely linear H matrix formulations for the interactions of arbitrary sets of dynamic nodes.

Raw algorithms used to produce the harmonic solutions are, subject to change, hence earning the title of 'families.' The basic solution method has already been laid out in earlier discussions of equation (3) and the associated H-matrix and f/g vectors. Taking into account the generic need for regularization because of the "double frayed edge" issues and the inherent singularities in variational formulations, harmonic solutions simply represent repeatedly solving equation (3). Streams of g-vector values pour in and f-vector solutions come out the other side of the vector processing core:

$$f_i = H_i^{-1} g_i, i=1,2,3, \ldots \quad (4)$$

A given node defines its own version of a local group of cooperative nodes (which could include GPS satellites as part of the 'local group') defining the structure of the f and g vectors themselves (and, by extension, the structure of H). Thus, a node actively solves for its neighbors' f-vector solutions as well as its own, and likewise, neighboring nodes solve for the given node's f-vector simultaneously. Obviously if a local group is strictly defined as in the case of the ten cars, and an identical stream of equation (4)'s are created that apply to the whole local group, only one node needs to actually perform f-vector vector processing for the whole group and then it can simply broadcast solutions via the pung channel(s). The potential for time-multiplexed CPU and vector-processing loading across nodes is manifest, if all computing resources were kept fully busy, anticipating various network topologies, pre-computing H inverses continuously, thus creating a low maintenance f-vector solution engine.

Figure 56:
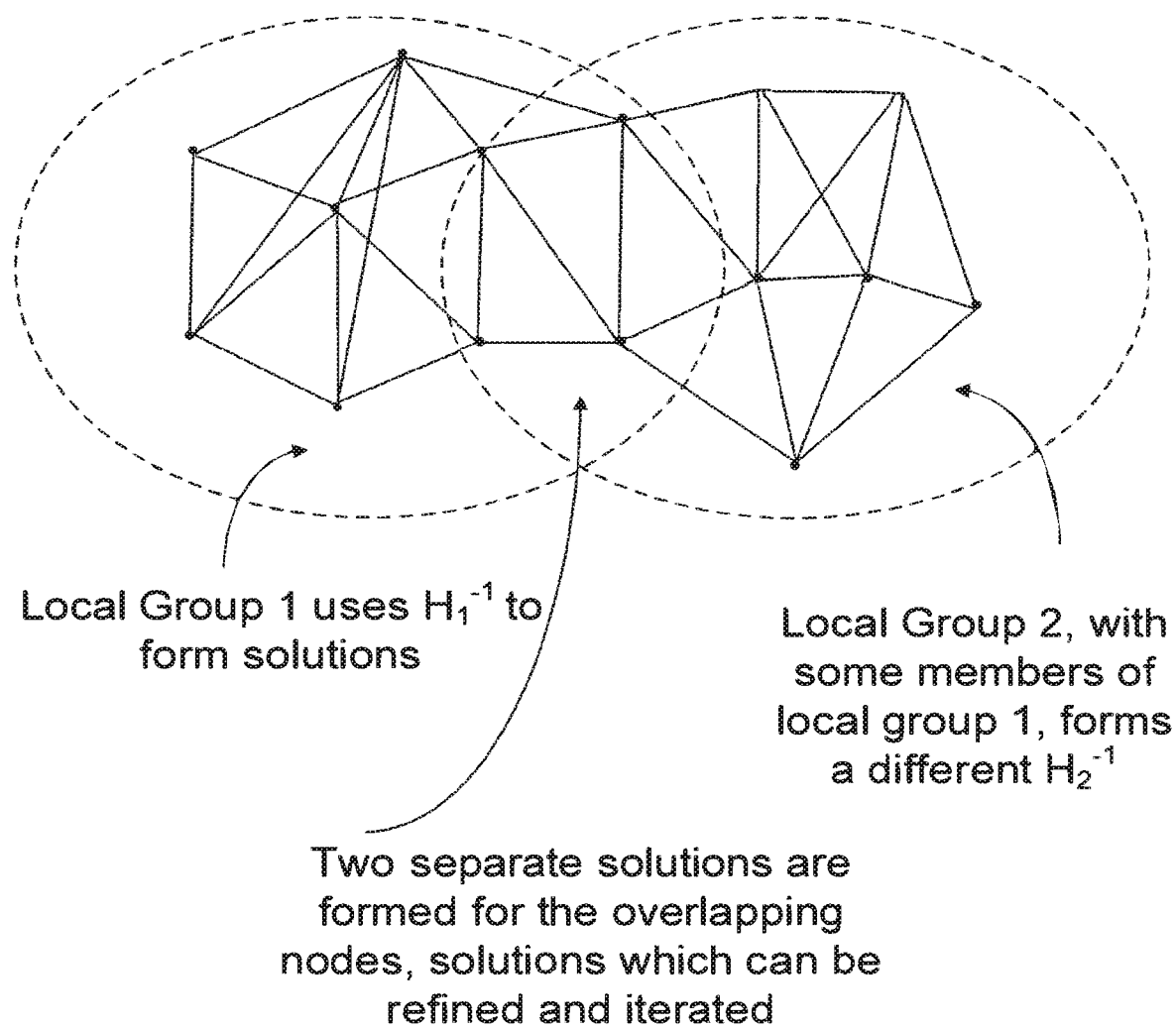
FIG. 56 is a diagram depicting the generation of solutions for overlapping nodes.

Error-mitigation in loosely connected overlapping subsets of local groups is summarily depicted in FIG. 56. The possibilities for implementation are familiar to those practiced in the art of distributed sensing and hierarchical group mensuration, extending well beyond the baseline embodiment of the ten cars. Iterations of equation (4) solutions can be performed when disparate yet overlapping local groups bring bias or regularization information to bear on the matrix H, and its inverse. In words, a local group over here with a few node members also belonging to a local group over there can bias solutions of the waveforms of those shared members based on the initial results of applying equation (4) within the initially isolated local groups. In pseudo equation form:

$$f_{i\_1} = H_{i\_1}^{-1} g_{i\_1}, i\_1 = 1,2,3, \ldots ;$$

$$f_{i\_2} = H_{i\_2}^{-1} g_{i\_2}, i\_2 = 1,2,3, \ldots ;$$

$$H_{i\_1,2}^{-1} = f(H_{i\_1}^{-1}, f_{i\_2});$$

$$H_{i\_2,2}^{-1} = f(H_{i\_2}^{-1}, f_{i\_1});$$

$$f_{i\_1,2} = H_{i\_1,2}^{-1} g_{i\_1}, i\_1 = 1,2,3, \ldots ;$$

$$f_{i\_2,2} = H_{i\_2,2}^{-1} g_{i\_2}, i\_2 = 1,2,3, \ldots ; \quad (5)$$

The initial solution from local group one, which may have one or more group members shared with local group two, can use the f-vector solutions it has to reformulate the H matrix (and its inverse) for group 2, and group 2 can thus perform a second iteration of solving for its own f vector using this additional information. Doing the same operation for local group two is also possible, hence the six total equations in 'equations (5).'

One of the primary solutions_loop operations associated with calculating f vector harmonic solutions is to ensure that the proper $H^{-1}$ matrix is being used in the vector processing step that actually calculates the f vector. The linqs_loop monitors the general current epoch and anticipated near-future epoch topologies as well as trying to anticipate intermittent ping channels, producing a small family of 'potential H inverse' candidates for the solutions_loop to use, but it is the solutions_loop that makes the final call on which exact $H^{-1}$ to use for any given harmonic-block epoch (or short string of harmonic blocks). This gets to the heart of PhaseNet's realtime adaptability to deal with harsh and ever-changing network conditions in the hundredth of a second to hundredth of a second timescale: the harmonic solutions vector engine can constantly swap in and out $H^{-1}$ from a small family of likely matrices associated with the current epoch, and if an $H^{-1}$ is required that is not part of the pre-calculated family, the solutions_loop must flag the linqs_loop that a proper $H^{-1}$ was not available for a given epoch and that a custom $H^{-1}$ must be calculated for that epoch and supplied to the solutions_loop before it can proceed with a solution for the f-vector.

For the baseline embodiment of the ten cars, the harmonic solutions portion of the solutions_loop includes the steps described in the preceding paragraphs. For applications such as multi-aperture coherent data collection wherein differential drift between collection points is sufficient to "phase up" data collection, the harmonic solution generally suffices and there is little need to place solutions back into an external framework. For many other applications, however, there is either a general desire or critical demand to package harmonic solutions back into external metric frameworks. The experienced reader may recognize that this operation should essentially be an integration activity turning variations into absolute metric entities. Integration constants and "random walk" divergence of solutions are addressed in the process of obtaining an asymptotic solution.

The Asymptotic Solutions Family

It would not be entirely unfair to view the asymptotic family as simply the integration of the harmonic family, or as an independent peer to the two previously described solution families. Though the strictest 'observables only' mathematical formalism will always find the harmonic family of solutions to be on more solid ground, special classes of nodes cannot be easily defined that form the basis of the intuitive world of three-dimensional space and commonly understood time. The gravitational accumulation of nodes into semi-rigid structures is the historical precedent here: the Earth-centered earth-fixed coordinate systems. Consideration of 'semi-rigid' structures is akin to the previously introduced concepts of a coarse direction vector and coarse range variable, concepts that are central to the practical implementation of the harmonic solutions themselves. In any event, an objective is to maintain a level of rigor in defining core differences between solution families, where the accumulation of nodes into semi-rigid structures bridges the intuitive transom between the harmonic solutions world and a world using absolute metrics and defined standards such as UTC, ITRF, ICRF, and GPS (formally defined).

In the baseline embodiment of ten cars, while the nominal solutions sub-routine of the solutions_loop is providing coarse estimates of a car's location within the gymnasium using classic triangulation methods, and the f-vectors are being produced from the harmonic solutions sub-routine of the solutions_loop letting cars know in some detail how they are moving relative to one another, one of the cars may ask the question: 'so where am I really?' This is the job of the asymptotic solutions family to answer. Asymptotic solutions have emphasized the word 'family' over the member term 'algorithm.'

Figure 57:
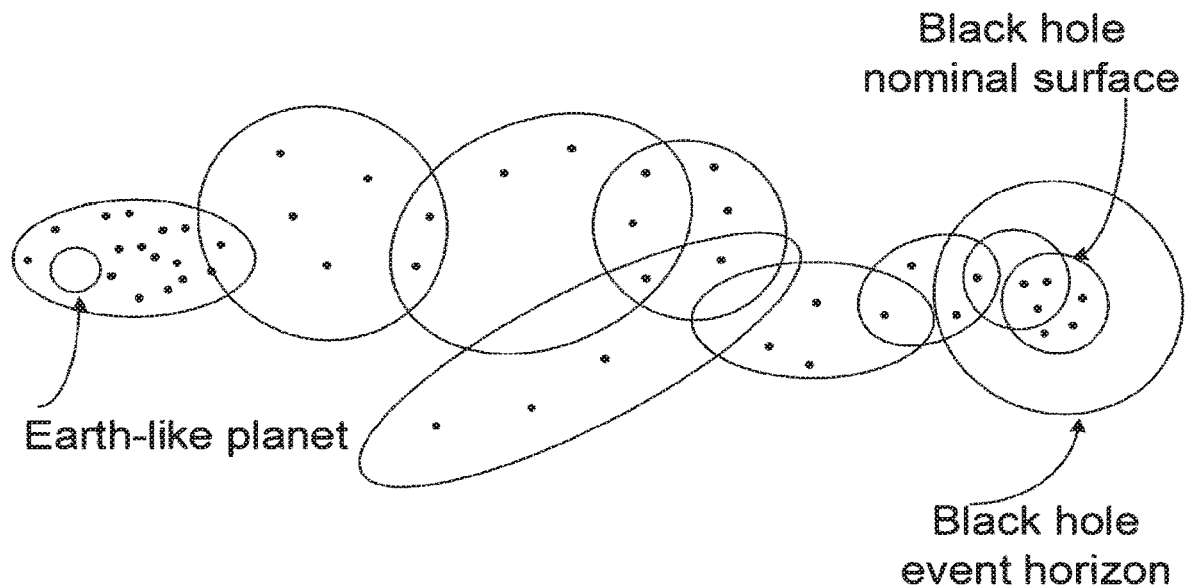
FIG. 57 is a diagrammatic metaphorical rendering of an Earth-like planet sharing a common asymptotic collision frame with a neighboring relatively low mass black hole.

The 'background collision frame' or 'asymptotic collision frame' are two phrases that the set physics materials describe wherein the very messy problem of rotationally interacting relativistic frames can be recast into a functional (and conventions-defined) absolute space-time. The set physics materials go to lengths to dissuade readers from considering this absolute space-time framework as anything philosophical or in some sense 'real,' it is simply a shared space-time metric wherein after some information is gathered by many nodes over a long time period, a globally defined (shared) space-time asymptotically aligns wherein two otherwise disconnected relativistic frames can describe collisions and other events in their past. A fascinating implication of such an asymptotic frame is the possibility of exploring black hole physics through an overlapping neighboring local-groups approach as opposed to a pre-metricized relativistic approach that produces physically unrealistic singularities. FIG. 57 depicts an Earth-like planet in the neighborhood of a low mass black hole, sharing with it a common asymptotic collision frame.

In the baseline embodiment, simpler questions can be asked, such as how can the best of both worlds—the elegance of the nominal solutions and the detail of the harmonic solutions—be obtained? The following outlines a fairly straightforward hybrid choice.

Recalling the harmonic solutions derived from equation (2), wherein the coarse direction vector was introduced, and the coarse range that accounts for finite delays between nodes, a question arises as to whether these coarse entities can be made more accurate as more ping data is collected across an entire set. The short answer is yes: collecting more and more data may determine what the coarse direction vectors and coarse ranges 'were' in the past.

Figure 58:
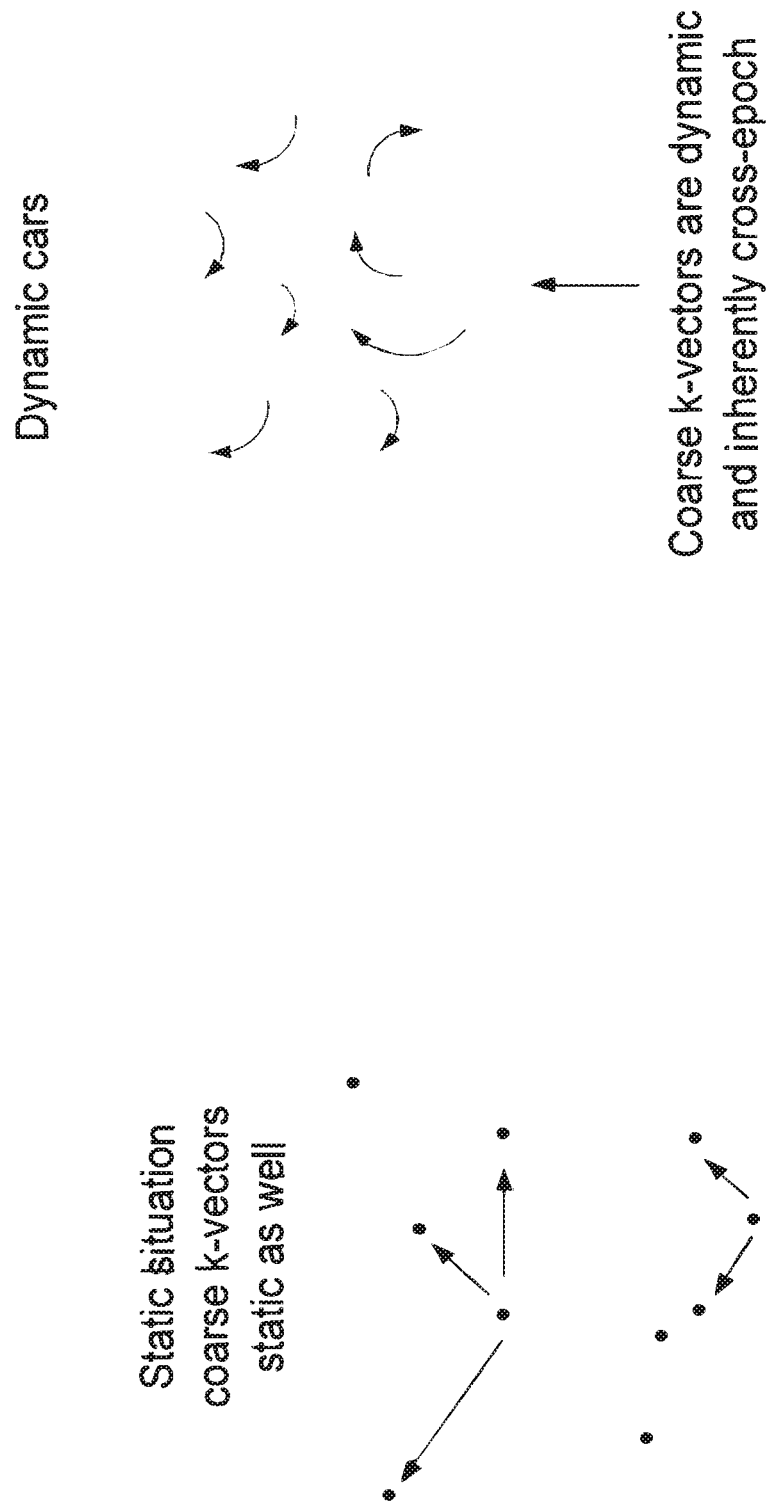
FIG. 58 is a diagram depicting coarse vectors of nodes under static and dynamic conditions.

FIG. 58 attempts to represent graphically the problem at hand. On the left-hand side of FIG. 58 all ten cars are stationary so that the only asymptotic process required is the most simple exercise of time-averaging coarse ranging measurements, leaving only instrumental bias as the residual error in assigning absolute distances between the cars (and the beacons that represent the gymnasium floor, if desired). The right-hand side of FIG. 58 shows the more general PhaseNet condition where cars/nodes are continuously in motion and absolute ranging is not limited to instrumental bias.

The right hand side of FIG. 58 contains parallel node-node situations, depicted in FIG. 59, which may be described as follows: Car A sends out a ping, and continues moving along its circuitous path, while its internal clock drifts. Car B senses the ping sent by car A, as car B proceeds along its twisted path, caught at some random drift of its own internal clock; car B records receipt of the ping using its own counter and notes its fraction between the pings it has sent out, both immediately prior to receipt of car A's ping and immediately after receipt; car B of course moves and its clock drifts between its own pings, but classic Nyquist sampling stipulates that the changes in position measured will be only those occurring slower than the ping rates; if car A and car B are a significant fraction of a ping-length away from each other, then all the dynamic twists and clock drifts become appreciable; by the time car A hears the two pings from car B, which sandwiched the receipt of car A's ping by car B, much variation has occurred along with phase noise waveforms on both car A and car B. It would seem that such a turbulent collection of nodes can never be tamed into an asymptotic collision frame.

Topologically Defined Metric Frames

A given topology of a set or subset of PhaseNet nodes can form the definitional basis for a metric space. Nodes in this definitional set are referred to as metric nodes. An ideal topology of metric nodes would be stable and node-node connections would be constant, whereas real implementations of metric nodes are highly redundant and expect occasional minor breakdowns in connections. The word topology is used here in its classic form: the description of connectivity and relationships in and amongst elements in a set.

Figure 60:
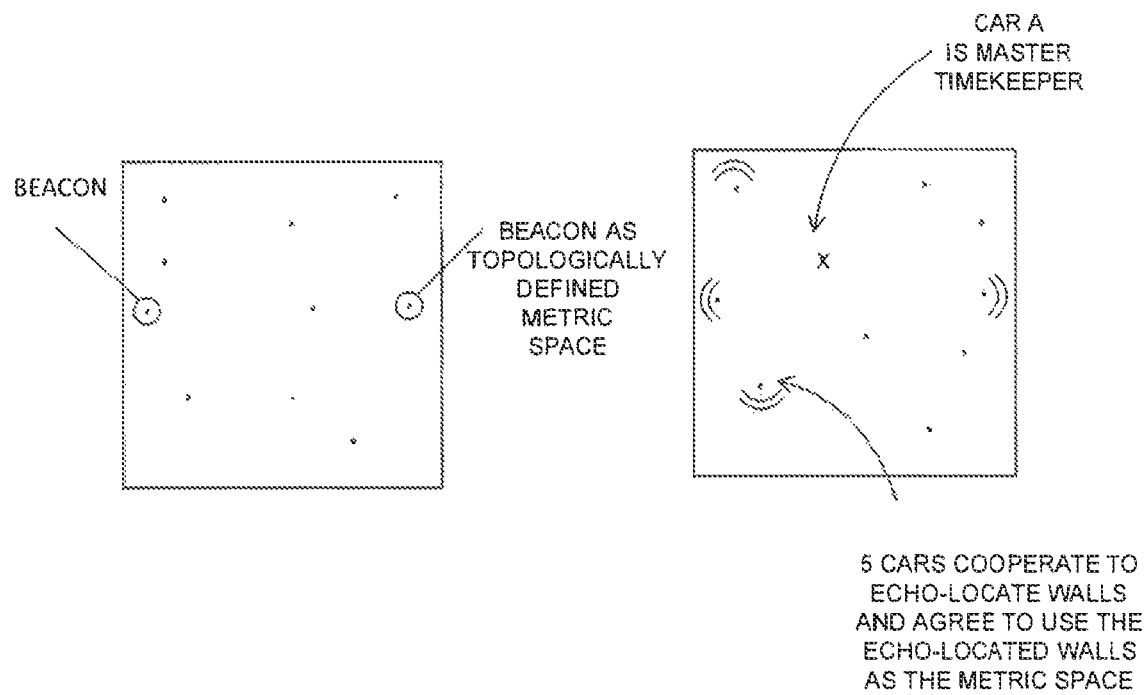
FIG. 60 is a set of two diagrams illustrating two alternative examples of topologically defined metric spaces for the baseline embodiment of 10 cars.

FIG. 60 illustrates two alternate examples of topologically defined metric spaces for the baseline embodiment of ten cars. On the left of FIG. 60, two static beacons have been added as in FIG. 54, these two beacons acting as metric nodes. On the right there are no beacons but the cars are capable of echo-locating walls; car A is designated as master timekeeper for the group of ten cars and the four outside walls become passive PhaseNet metric nodes that are being determined by the cars. Likewise, the GPS satellite constellation and the periodic correction of ephemeredes for each satellite are a topologically defined metric frame. Establishing a metric frame through node connectivity continues to reinforce that metric frames are created through interaction as opposed to pre-existing.

Asymptotic Solution Example

Figure 59:
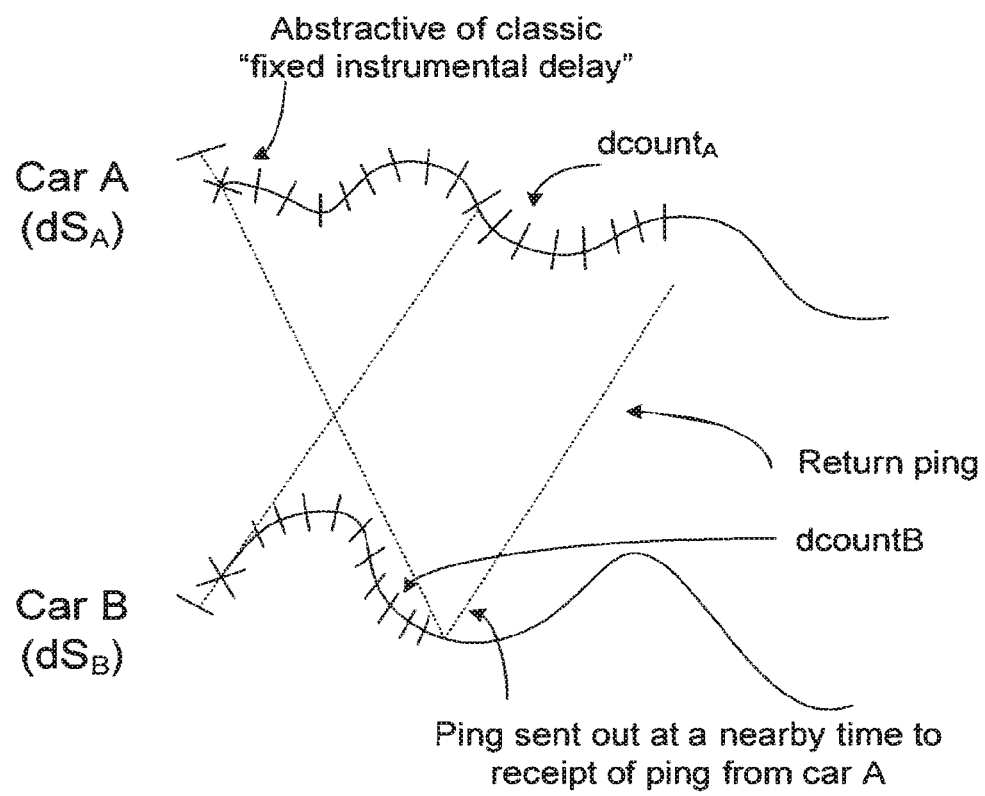
FIG. 59 is a diagram of 2 nodes shown isolated in a 10-node network to demonstrate metric space solution error resulting from node motion.

FIG. 59 isolates two cars in the ten car baseline embodiment, depicting an arbitrary window in coarse network time where the two cars exchange pings. A return ping is shown that is very similar to the previously described coarse ranging exercise. FIG. 59 shows that the coarse ranging measurement alone, without additional information, cannot account for subsequent motion of the cars during the coarse ranging operation, and hence its result strictly applied to a metric space solution will be in error due to car motion.

In summary, the asymptotic solution family approaches must take into account these motions, while continuously re-examining coarse range and coarse direction estimates and the effect of noise on coarse ranging measurements and the application of harmonic solution data in the asymptotic solution formulation. Low bandwidth (classically 'fixed') delays in the instrumentation utilized by all cars is a non-trivial nuisance.

Figure 61:
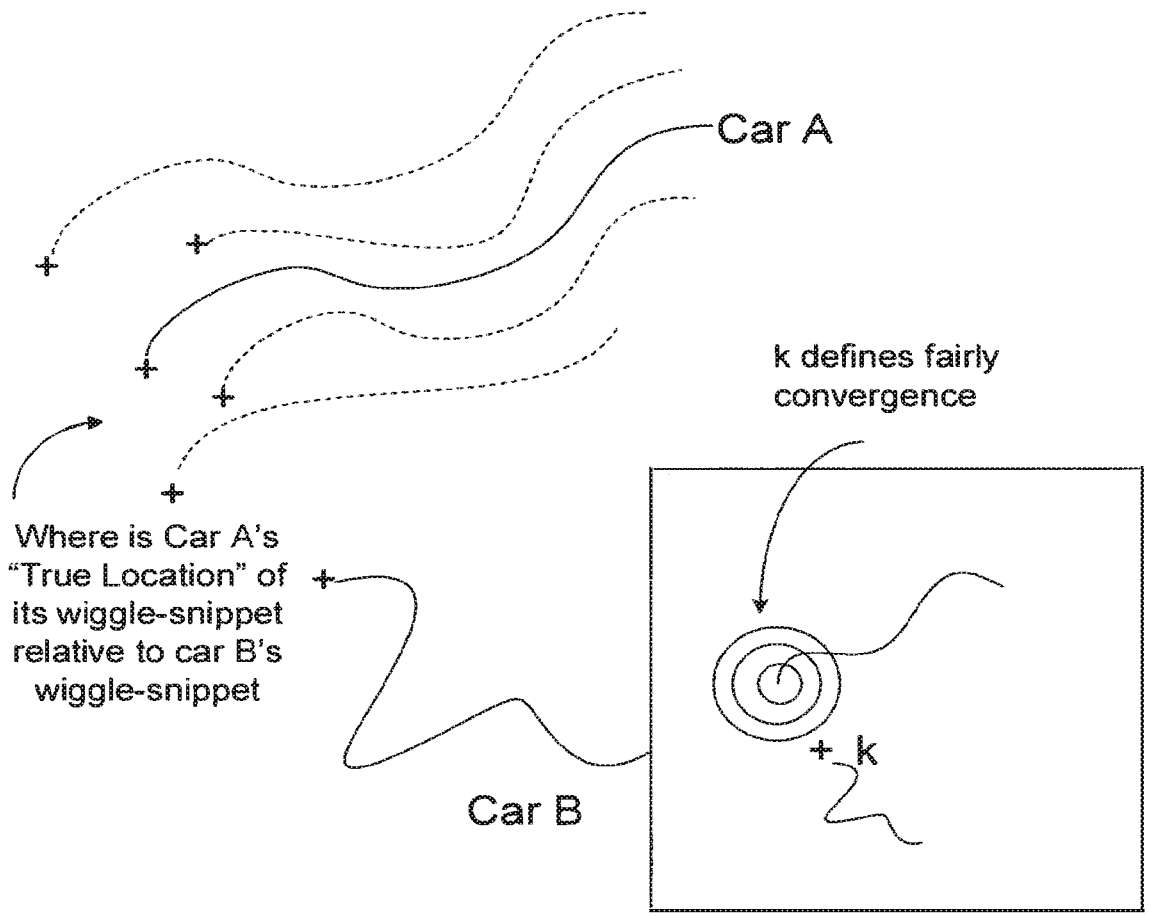
FIG. 61 presents car travel paths illustrating a well-defined range of asymptotic location solutions neighboring an available nominal location solution.

Of the many choices for algorithms that can handle all of these motion issues, classic noise, and delays, FIG. 61 illustrates the preferred choice for the baseline embodiment and most PhaseNet electromagnetic applications. Other choices use classic triangulation formulae with appropriate 'post-corrections,' and from an accuracy standpoint, most of these approaches can converge to the same information asymptotes as the one chosen here that utilizes the harmonic solutions family.

FIG. 61 depicts a situation reminiscent of the classic triangulation geometry of FIG. 54, but rather than positing cars as points with circles around them, allowing straightforward trigonometry to locate intersection points of these circles, instead the cars are represented by wiggles indicating the harmonically measured motion of the cars over the back-and-forth time (coarse) for a ping to go out from car A and return with a ping from car B. In other words, the motion of the two cars here isolated is explicitly represented, as supplied by the harmonic solutions family. Since the availability of a harmonic solution requires several exchanges of ping data, it can be readily seen that formulation of the asymptotic solutions family will be delayed longer than the delay from the basic harmonic solution.

The inset to FIG. 61 attempts to illustrate the practical consideration that given that initial coarse range and coarse direction solutions in the nominal solutions family are also available, a well defined range of expected asymptotic solutions are in a tight neighborhood around the available nominal solution (except in extremely high dynamic situations or instrumentation subject to significant phase noise). The inset also attempts to show that there are effectively only two 'unknowns' in the thus-refined pseudo-ranging operation, with two inherent pseudo-ranging pings being matched to the two unknowns. These unknowns correspond to the integration constants in the differential formulation of the harmonic solutions. When a web of cars is considered (not just two isolated cars), these unknowns become over-determined as the number of networking connections grows. It is not too surprising that the asymptotic solution family that is attempting to 'fix' absolute position against a globally defined time also has the luxury of over-determination.

Equations (6), follow the simplified two-car metric outlined in the inset of FIG. 61, where one car is arbitrarily set to the origin at the launch of the initial ping. Time is also set to zero, for simplicity, and the interim ping time '1' sent from car 2 back to car 1 is not included in the actual equations since fractional ping values are used at the 'far node' such that the raw ranging data value is measured at the launch of a ping and the receipt of a virtual ping back at the car/node that launched the ping. When a web of multiple cars generate sets of equations, it is a standard exercise to sort out the offsets between the cars:

$$\text{rangepings1} = (\text{count1}\_2 - \text{count1}\_0) - d\text{count1}\_2\_0;$$

$$\text{rangepings2} = (\text{count2}\_2 - \text{count2}\_0) - d\text{count2}\_2\_0;$$

$$\text{dist1}\_1 = \text{sqrt}((x2\_0 + dx2\_1)^2 + (y2\_0 + dy2\_1)^2);$$

$$\text{dist1}\_2 = \text{sqrt}((x2\_0 + dx2\_1 - dx1\_2)^2 + (y2\_0 + dy2\_1 - dy1\_2)^2);$$

$$\text{dist2}\_1 = \text{sqrt}((x2\_0 - dx1\_2)^2 + (y2\_0 - dy2\_1)^2);$$

$$\text{dist2}\_2 = \text{sqrt}((x2\_0 + dx2\_2 - dx1\_2)^2 + (y2\_0 + dy2\_2 - dy2\_1)^2);$$

$$\text{rangepings1} = \text{dist1}\_1 + \text{dist1}\_2;$$

$$\text{rangepings2} = \text{dist2}\_1 + \text{dist2}\_2; \quad (6)$$

The last two lines in equations (6) a set of two equations and two unknowns, x2_0 and y2_0, representing the offset of car 2 at time 0. The 'count' values in the first two lines are directly measured from the raw pseudo-range values, and all of the 'd_XXX' variables are provided by the harmonic solutions family, thus being treated as constants.

Figure 62:
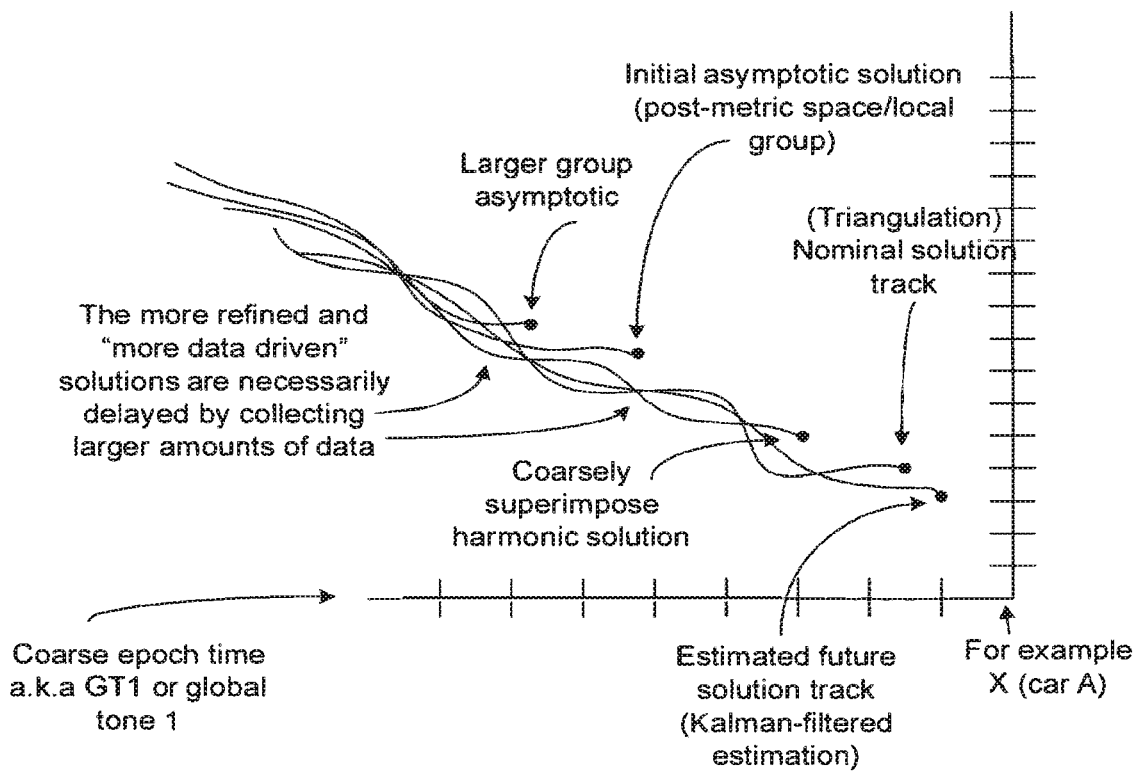
FIG. 62 is a plot of location solution waveform families delay vs. precision/accuracy.

The 'asymptotic' term in asymptotic solution families refers to refining and connecting assumptions and approximations made by the methods and algorithms. This is a central topic for the set physics material that deals with Planck-scale assemblies of PhaseNet nodes. In terrestrial applications of PhaseNet, where the speed of communications is significantly faster than the motion of the nodes, a one-step or possibly a two-step iterative process is possible with strong convergence properties. This convergence approach is used to correct for the coarse metrics in the nominal solution families and the coarse range and coarse direction vectors used to generate harmonic solutions. This convergence may barely justify use of the term 'asymptotic,' but as larger groups of PhaseNet nodes create better harmonic solutions, these benefits also accrue to the final asymptotic solution families of large defined groups and super-groups, with ever-refining space-time solutions as more past data are used to place nodes within the asymptotic collision frame. FIG. 62 is a quick sketch of one particular parameter in which the progression of solution types is a kind of asymptotic convergence, with increasing time lags being the price paid for finer and finer solutions.

Space-Time Calibration Unit (SCU) Output

All three solution families are available to the client node, which contains the SCU. FIG. 62 thus represents the forms of output available, various time waveforms of position and clock drift (with X position of car A being the chosen example). Other parameters such as low bandwidth instrumental delay are also possible as an internal parametric waveform within the harmonic solutions, as is orientation of the cars as an independent variable (each car's compass direction of the front of the car, for example). Interestingly, the 'dcount' family of waveforms is a kind of correction to the coarse time representation in the horizontal axis of FIG. 62, thus representing a given car/node's slight variance from the global set-wide definition of constant time. This has been described in the set physics material and been dubbed 'global tone 1' or GT1, where a given node and small groups of nodes can actively solve for their minor deviations about the global average, adjusting their rates as needed.

The previous disclosure described in detail the versatility of the design and application of systems implemented with the PhaseNet space-time calibration technique. The following description presents a specific implementation of the computations performed and solutions generated to achieve overall system operation with error correction.

Figure 63:
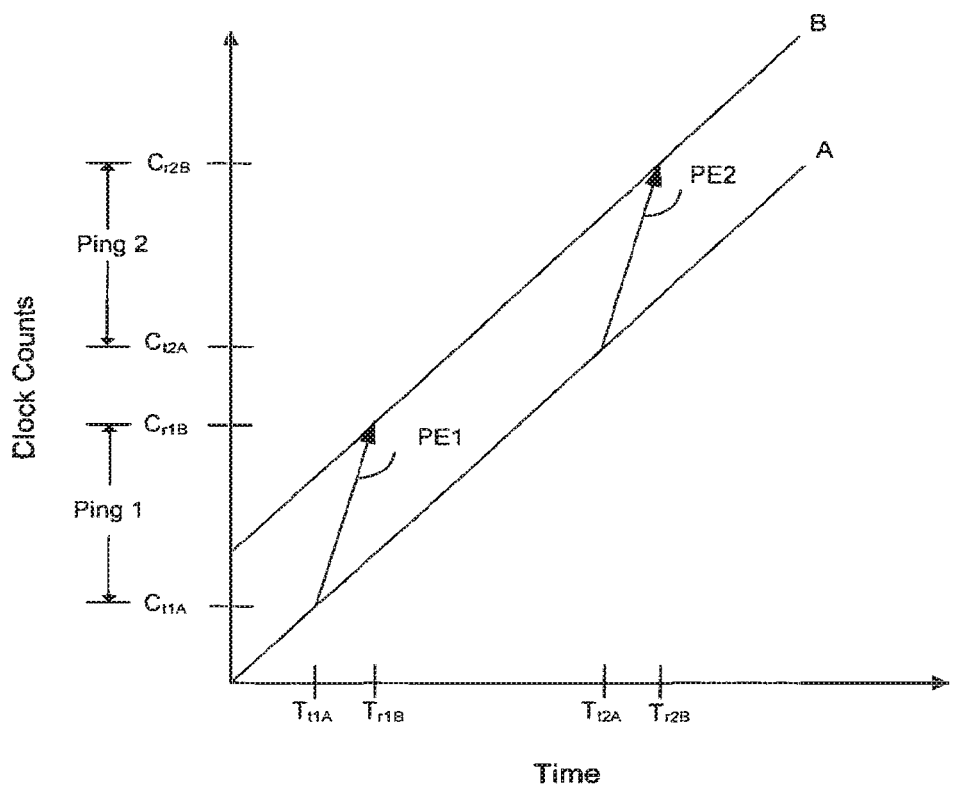
FIG. 63 is a graph showing clock counts corresponding to two time-displaced ping events transmitted from a first node and received by a second node under conditions in which the nodes are the same distance apart from each other during two ping events.

FIG. 63 is a graph showing clock counts corresponding to two time-displaced ping events transmitted from a node A and received by a node B under conditions in which nodes A and B are the same distance apart from each other during two ping events. With reference to FIG. 63, a vector PE1 represents a first ping event, which has a clock count value, Ping 1, expressed as $$\text{Ping } 1 = C_{r1B} - C_{t1A}, \quad (7)$$

where $C_{t1A}$ is a clock count (or count stamp) accumulated by a counter driven by a digital clock residing at node A and transmitted by node A at a time, $T_{t1A}$, and $C_{r1B}$ is a clock count (or count stamp) accumulated by a counter driven by a digital clock residing at Node B and associated with a time, $T_{r1B}$, at which node B receives the first ping event transmitted by node A at $T_{t1A}$. A vector PE2, represents a second, later ping event, which has a clock count value, Ping 2, expressed as $$\text{Ping } 2 = C_{r2B} - C_{t2A}, \quad (8)$$

where $C_{t2A}$ is the clock count transmitted by node A at a time, $T_{t2A}$, and $C_{r2B}$ is the clock count associated with a time, $T_{r2B}$, at which node B receives the second ping event transmitted by node A at $T_{t2A}$. The straight line (ignoring incremental count quantization) plot of clock counts as a function of time for each of nodes A and B indicate that their respective digital clocks, $CLK_A$ and $CLK_B$, operate at the same or a "system nominal" rate.

A differential clock count value representing the difference between Ping 2 and Ping 1, $\Delta \text{Ping}_{AB}$, can be expressed as $$\Delta Ping_{AB} = \text{Ping}2 - \text{Ping}1 \quad (9)$$

$$= (C_{r2B} - C_{t2A}) - (C_{r1B} - C_{t1A}).$$

The entity $\Delta \text{Ping}_{AB}=0$ when nodes A and B are the same distance apart from (i.e., not moving relative to) each other at the times of ping events PE1 and PE2. This is the situation represented in FIG. 63, in which $(T_{r1B}-T_{t1A})$ and $(T_{r2B}-T_{t2A})$ are equal.

Figure 64:
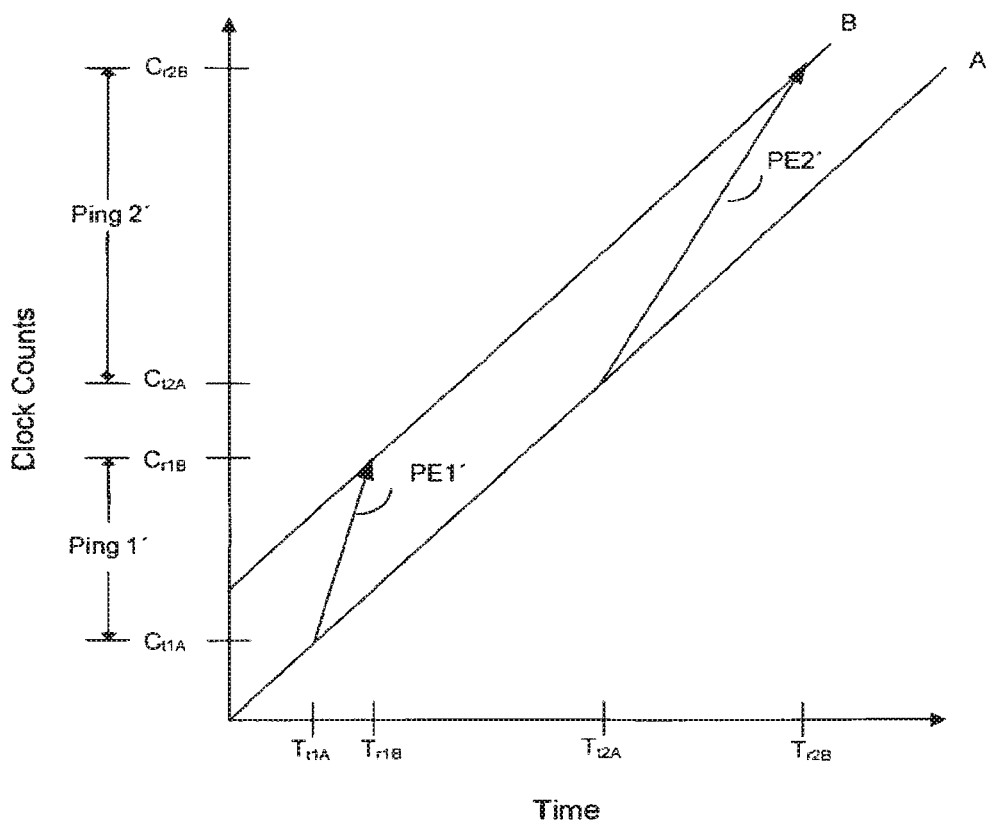
FIG. 64 is a graph showing clock counts corresponding to two time-displaced ping events transmitted from a first node and received by a second node under conditions in which the nodes are different distances apart from each other during the two ping events.

FIG. 64 is a graph showing clock counts corresponding to two time-displaced ping events transmitted from node A and received by node B under conditions in which nodes A and B are different distances apart from each other during the two ping events. With reference to FIG. 64, a vector PE1' represents a first ping event having a Ping 1' value that is the same as the Ping 1 value of vector PE1. A vector PE2' represents a second, later ping event having a Ping 2' value that is greater than the Ping 2 value of vector PE2. A change in distance between nodes A and B for the first and second ping events is expressed as $\Delta \text{Dist}_{AB}$. The inequalities $\Delta \text{Ping}_{AB}>0$ and $\Delta \text{Dist}_{AB}>0$ indicate that nodes A and B moved farther apart from each other between the times of the first and second ping events, as represented in FIG. 64. Similarly, the inequalities $\Delta \text{Ping}_{AB}<0$ and $\Delta \text{Dist}_{AB}<0$ indicate that nodes A and B moved closer to each other between the times of the first and second ping events.

Figure 65:
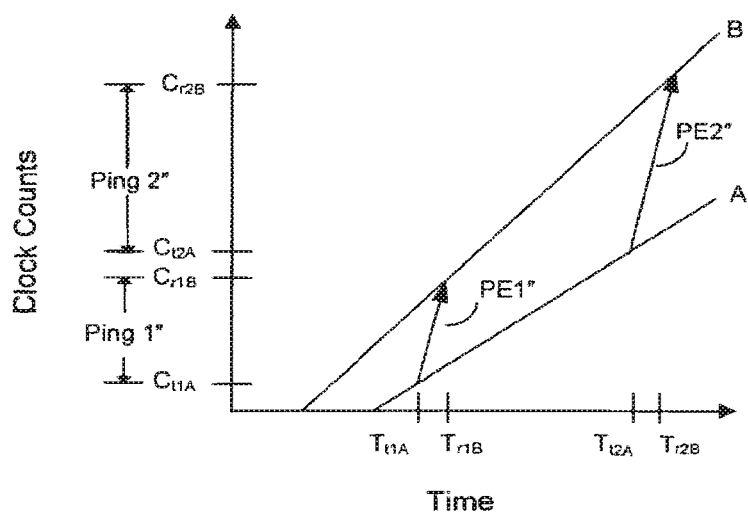
FIG. 65 is a graph showing clock counts corresponding to two time-displaced ping events transmitted from a first node and received by a second node under conditions in which the nodes are the same distance apart from each other during the two ping events but their clock rates are dissimilar.

FIG. 65 is a graph showing clock counts corresponding to two time-displaced ping events transmitted from node A and received by node B under conditions in which nodes A and B are the same distance apart from each other during the two ping events but their clock rates are dissimilar. With reference to FIG. 65, $(T_{r1B}-T_{t1A})$ and $(T_{r2B}-T_{t2A})$ are equal; therefore, nodes A and B are not moving relative to each other at the times of the first and second ping events PE1" and PE2". The clock count plots of nodes A and B indicate that they are not parallel and that the node A clock, $CLK_A$, counts at a slower rate than the count rate of the node B clock, $CLK_B$. FIG. 65 indicates that when the clock rate of $CLK_A$ decreases relative to the system nominal rate, Ping 2" increases relative to Ping 2 of FIG. 63. In general, the following relationships characterize in ping counts changes in rate of node clock A, $\Delta CLK_A$, and node clock B, $\Delta CLK_B$:

$\Delta CLK_A$ decreases $\Rightarrow \Delta \text{Ping}_{AB}$ increases $\Delta CLK_B$ decreases $\Rightarrow \Delta \text{Ping}_{AB}$ decreases.

The following two equations express, in terms of ping counts, changes in the distance between nodes A and B, assuming that ping events are also transmitted from node B and received and count stamped by node A:

$$\Delta \text{Ping}_{AB} = K_1 \Delta \text{Dist}_{AB} - K_2 \Delta CLK_A + K_3 \Delta CLK_B \quad (10)$$

$$\Delta \text{Ping}_{BA} = K_1 \Delta \text{Dist}_{BA} + K_2 \Delta CLK_B - K_3 \Delta CLK_A. \quad (11)$$

Figure 66:
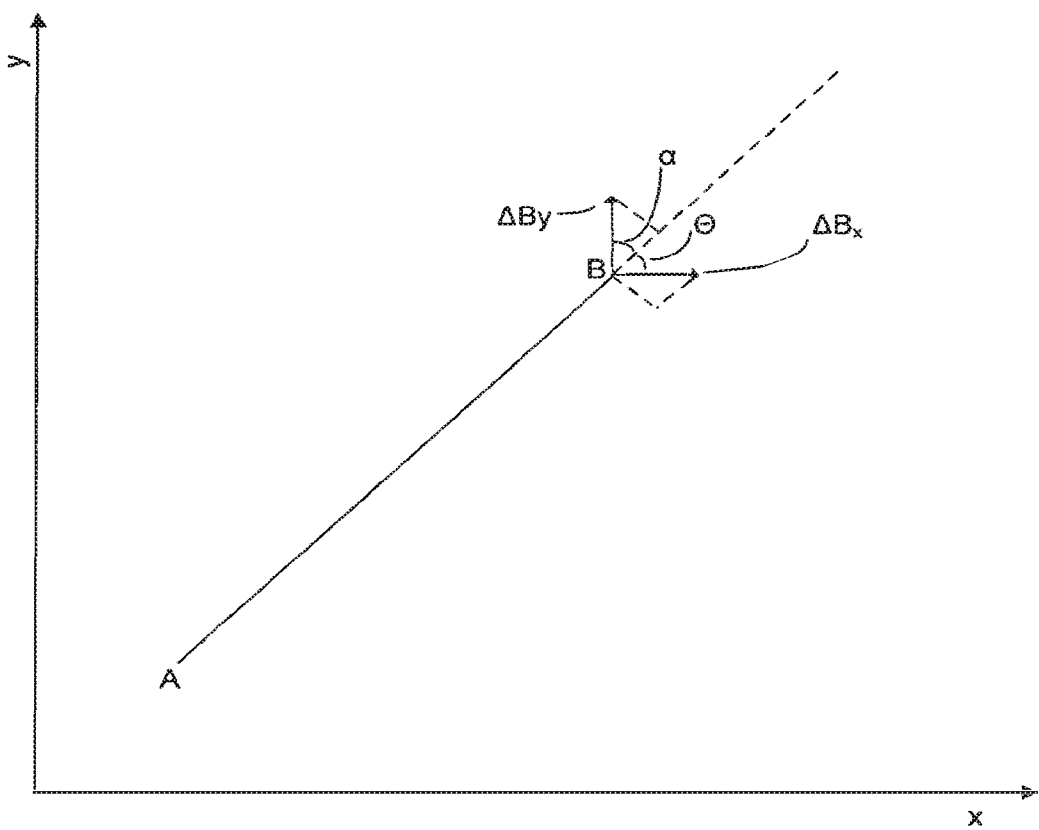
FIG. 66 is a diagram for use in illustrating the calculation of a change in distance between the first and second nodes.

FIG. 66 is a diagram for use in illustrating the calculation of $\Delta\,\text{Dist}_{AB}$. For small displacements during a unit ping interval (i.e., during a short interval between successive pings), the term $$\Delta\text{Dist}_{AB} = \sqrt{\Delta X_{AB}^2 + \Delta Y_{AB}^2 + \Delta Z_{AB}^2} \tag{12}$$

can be approximated. FIG. 66 is a diagram showing a straight line path segment between nodes A and B. With reference to FIG. 66, a straight line 20 connecting nodes A and B represents in x, y coordinate space the displacement of node B relative to node A for two successive ping events. FIG. 66 shows that, for short time intervals between successive ping events and when node A remains stationary, the x and y components of $\Delta\,\text{Dist}_{AB}$ at node B can be expressed as $\Delta B_x \cos\theta$ and $\Delta B_y \cos\alpha$, respectively, where $\Delta B_x$ and $\Delta B_y$ are the changes in the respective x and y coordinates of node B from its receipt of Ping 1 to its receipt of Ping 2, $\theta$ is the angle between line 20 and its projection onto the x axis, and $\alpha$ is the angle between line 20 and its projection onto the y axis. Similarly, in x, y, z coordinate space, the z component of $\Delta\,\text{Dist}_{AB}$ can be expressed as $\Delta B_z \cos\varphi$.

When the three components are combined and the coordinates of node A are included, $\Delta\,\text{Dist}_{AB}$ can be expressed as $$\Delta Dist_{AB} = \Delta B_x \cos\theta + \Delta B_y \cos\alpha + \tag{13}$$
$$\Delta B_z \cos\varphi - [\Delta A_x \cos\theta + \Delta A_y \cos\alpha + \Delta A_z \cos\varphi].$$

Substituting into equation (10) the expression for $\Delta\,\text{Dist}_{AB}$ in equation (13) and taking into account the speed of light, c, for the E-M implementation provides $$\Delta Ping_{AB} = \Delta B_x\left(\frac{\cos\theta}{c}\right) + \Delta B_y\left(\frac{\cos\alpha}{c}\right) + \Delta B_z\left(\frac{\cos\varphi}{c}\right) + \Delta A_x\left(\frac{-\cos\theta}{c}\right) + \tag{14}$$
$$\Delta A_y\left(\frac{-\cos\alpha}{c}\right) + \Delta A_z\left(\frac{-\cos\varphi}{c}\right) - K_2\Delta CLK_A + K_3\Delta CLK_B.$$

Simplifying equation (14) by relabelling the constant coefficients of the terms of $\Delta\,\text{Dist}_{AB}$, $$\Delta Ping_{AB} = \Delta A_X K_{AX} + \Delta B_X K_{BX} + \Delta A_Y K_{AY} + \Delta B_Y K_{BY} + \Delta A_Z K_{AZ} + \Delta B_Z K_{BZ} - K_2\Delta CLK_A + K_3\Delta CLK_B. \tag{15}$$

Figure 67:
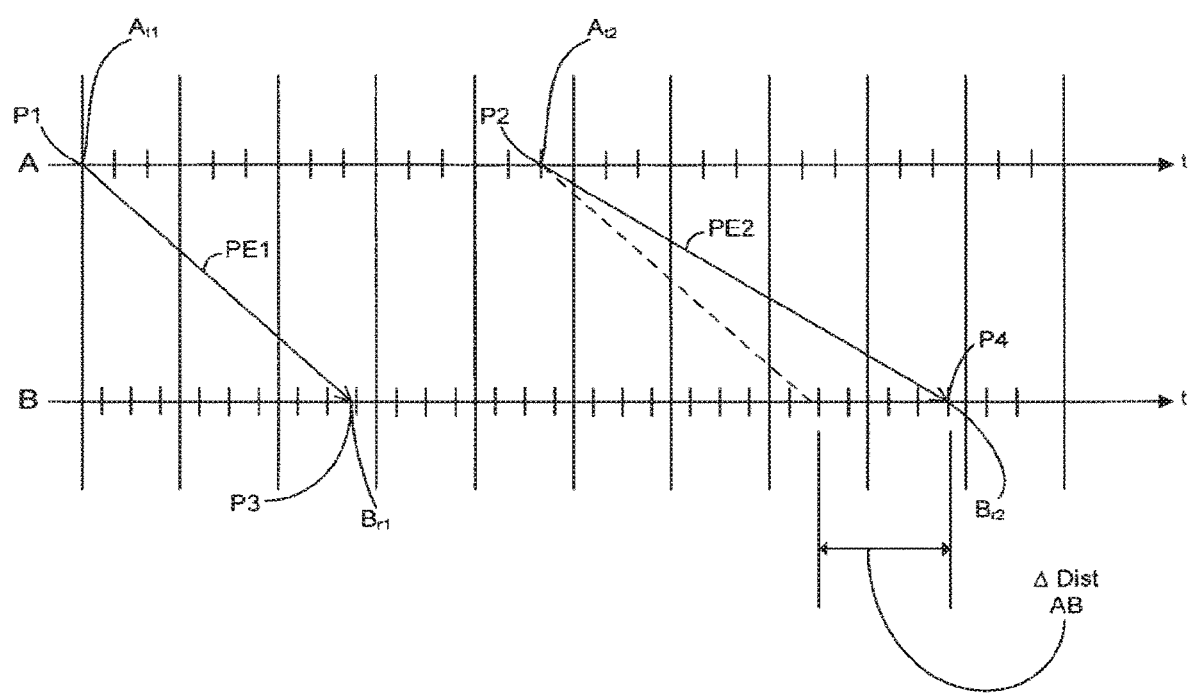
FIG. 67 is a diagram showing two timelines of ping events transmitted by the first node and received by the second node for calculating changes in rates of the clocks of the first and second nodes.

The solution of the $\Delta\,CLK_A$ and $\Delta\,CLK_B$ terms is developed with reference to FIG. 67. In FIG. 67, the horizontal line A represents a timeline of ping events transmitted by node A, and the horizontal line B represents a timeline of the ping events received by node B. The vertical lines intersecting horizontal lines A and B are mutually spaced apart by a unit time interval, which represents the period of the system nominal clock rate. The shorter-length tick marks on lines A and B indicate the actual clock rates of $CLK_A$ and $CLK_B$, respectively. A vector PE1 represents a first ping event transmitted by a node A at a time $A_{t1}$ established by $CLK_A$ and received by node B at a time $B_{r1}$ established by $CLK_B$. A vector PE2 represents a second ping event transmitted by node A at a later time $A_{t2}$ established by $CLK_A$ and received by node B at a time $B_{r2}$ established by $CLK_B$. Transmit times $A_{t1}$ and $A_{t2}$ define respective time points $P_1$ and $P_2$, and receive times $B_{r1}$ and $B_{r2}$ define respective time points $P_3$ and $P_4$. Inspection of FIG. 67 reveals that $$\overline{P_1P_2} + \overline{P_2P_4} = \overline{P_1P_3} + \overline{P_3P_4}. \tag{16}$$

The term $\overline{P_1P_2}$ represents the time interval, measured in system nominal time, between the transmission of PE1 and the transmission of PE2. Similarly, the term $\overline{P_3P_4}$ represents the system nominal time interval between the reception times for these ping events. The terms $\overline{P_2P_4}$ and $\overline{P_1P_3}$ represent the system nominal time intervals between, respectively, the transmission and the reception of PE2 and PE1. More specifically, with reference to FIG. 63, $$\overline{P_1P_2} = (C_{t2A} - C_{t1A}) - \Delta CLK_{A12} \tag{17}$$

$$\overline{P_3P_4} = (C_{r2B} - C_{r1B}) - \Delta CLK_{B12}, \tag{18}$$

where $\Delta\,CLK_{A12}$ and $\Delta\,CLK_{B12}$ represent the number of clock ticks needed to correct to the system nominal clock rate for, respectively, $CLK_A$ from the transmission time of first ping event PE1 to the transmission time of second ping event PE2 and for $CLK_B$ from the receive time of PE1 to the receive time of PE2. Moreover, with reference to FIG. 67, $$\overline{P_1P_3} = \frac{Dist_{1AB}}{c} \text{ and} \tag{19}$$

$$\overline{P_2P_4} = \frac{Dist_{2AB}}{c}, \tag{20}$$

where $Dist_{1AB}$ represents for the first ping event, PE1, the distance between nodes A and B from the transmit time recorded at node A to the receive time recorded at node B, and $Dist_{2AB}$ represents for the second ping event, PE2, the distance between nodes A and B from the transmit time recorded at node A to the receive time recorded at node B. Thus, equation (12) also can be expressed as $$\frac{\Delta Dist_{AB}}{c} = \frac{Dist_{2AB}}{c} - \frac{Dist_{1AB}}{c}. \tag{21}$$

Substituting into equation (16) the right-hand side terms of equations (17), (18), (19), and (20) provides the following expression $$(C_{t2A} - C_{t1A}) - \Delta CLK_{A12} + \frac{Dist_{2AB}}{c} = \tag{22}$$
$$\frac{Dist_{1AB}}{c} + (C_{r2B} - C_{r1B}) - \Delta CLK_{B12}.$$

Rearranging the terms of equation (16) provides $$-\Delta CLK_{A12} + \frac{Dist_{2AB}}{c} = \tag{23}$$
$$\frac{Dist_{1AB}}{c} + (C_{r2B} - C_{t2A} - C_{r1B} + C_{t1A}) - \Delta CLK_{B12}.$$

Substituting into equation (23) the left-hand side terms of equations (9) and (21) results in the following expression $$\Delta Ping_{AB} = \frac{\Delta Dist_{AB}}{c} + \Delta CLK_{B12} - \Delta CLK_{A12}, \tag{24}$$

where $\Delta\,CLK_{B12}$ and $\Delta\,CLK_{A12}$ represent corrections to, respectively, $CLK_B$ and $CLK_A$ to comport with the system nominal clock rate.

Equation (24) is in the form of the equation to which matrix algebra is applied to solve for the unknown displacement values and changes in clock rates. The matrix equation is expressed as $$g = Hf, \qquad (25)$$

where g is a column vector of Δ Pings, the number of which is the number of ping events minus 1; H is a two-dimensional matrix of coefficients constructed from the ping events; and f is a column vector of unknowns that include changes in clock rate and location changes in x, y, and z displacements. The computation is carried out using harmonic blocks, in which there is a selected number of harmonic blocks for each equation and selected numbers of clock solutions and location solutions for each harmonic block. The number of system nodes can change (above a certain minimum number of nodes), depending on whether certain nodes remain in the system. Before equation (25) can be solved, all of the ping information is accumulated by at least one node in the network. Each node uses a pung broadcasting schedule to transmit to other nodes in the network the ping information the node has received. By combining pings and pungs that have been received, a node is able to reconstruct information for all of the ping events of the network.

The table below presents qualitatively how the system of equations that can be developed becomes more overdetermined as nodes are added to a network. The first row of the table indicates that two nodes present eight unknowns with two equations. The eight unknowns include, for each node, changes in clock time and changes in location in x, y, and z displacements. An example of the two equations is presented by equations (10) and (11). The table also reveals that, for an increasing number of nodes, there is a widening difference between a larger number of equations and a smaller number of unknowns. This difference indicates that a system network of a sufficient number of nodes can undergo changes to (by addition or subtraction of) the number of observed ping events and still generate unique time and location solutions for the system nodes operating.

| Number of Nodes | Number of Unknowns | Number of Equations |
|---|---|---|
| 2 | 8 | 2 |
| 3 | 12 | 6 |
| 4 | 16 | 12 |
| 5 | 20 | 20 |
| 6 | 24 | 30 |
| 7 | 28 | 42 |
| 8 | 32 | 56 |

The word "qualitatively" used in the previous paragraph connotes a need for particular attention in the design of working systems around the generic networking principles expressed in the table set forth immediately above. In particular, as but one of many examples, many systems in which there are short communication baselines on the order of a few kilometers or less begin to erode the independence of the duplex channels. Likewise, nontrivial and highly variable instrumental delay error sources also can become appreciable, explicit unknowns in H matrix formulations. Yet further subtleties in actual implementations entail the use of "knowns" associated with one or both of the nodes and the environment, such as, for example, one node being immobile or a node happening to be slaved to an optical clock and treated as a master clock. The primary important point of the table is to highlight the benefit of the presence of more nodes in a network.

Figure 68:
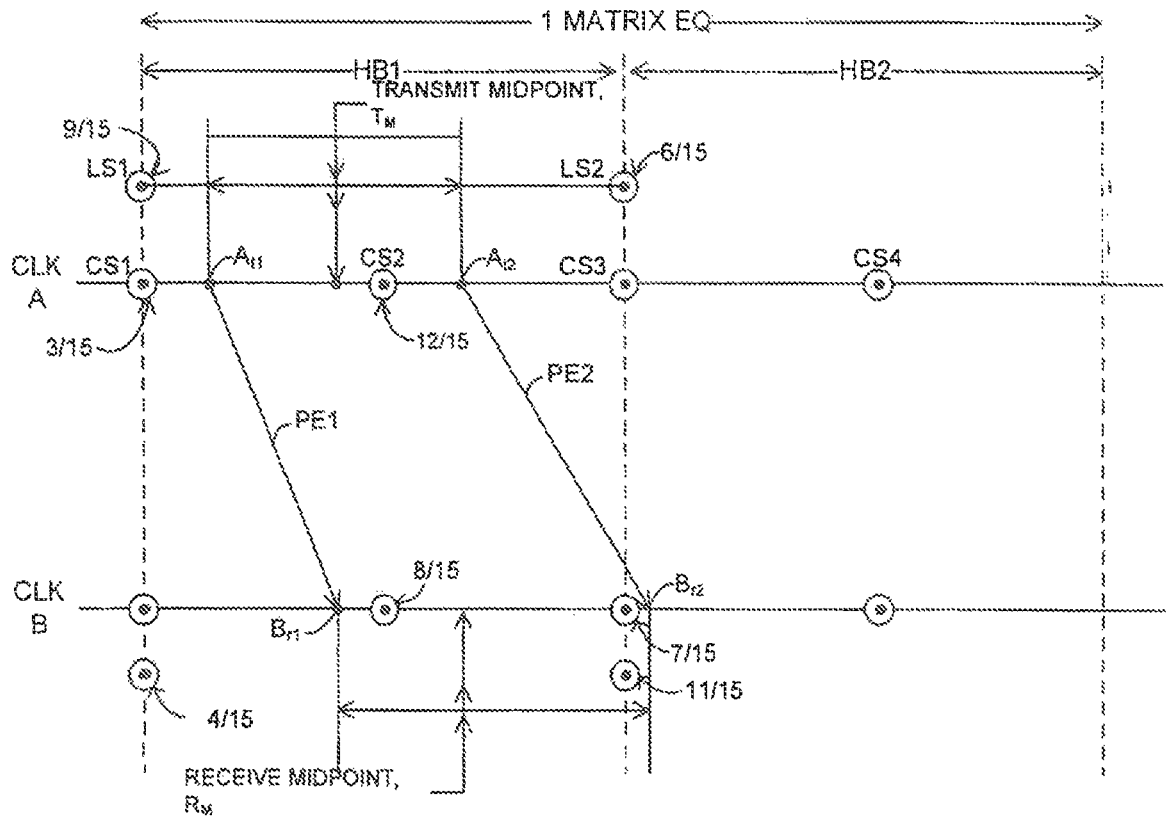
FIG. 68 is a diagram showing two exemplary harmonic block intervals for solving a matrix equation generating solutions for changes in clock rate and node location.

FIG. 68 is a diagram showing two exemplary harmonic block intervals, which are used to solve one matrix equation (25). For each harmonic block, for example, there are one location solution and two clock solutions generated for each node of, for example, a system of five operating nodes. Ping events PE1 and PE2 are associated with a first harmonic block, $HB_1$. Because there are specified two clock solutions for each equation and one location for each equation, the length of column vector f=50 (4 clock variables×5 nodes+2 locations×3 displacement variables (x, y, z)×5 nodes).

With reference to FIG. 68, the two horizontal lines represent timelines of $CLK_A$ and $CLK_B$, and the spaced-apart vertical lines define the boundaries for harmonic blocks $HB_1$ and $HB_2$. Harmonic blocks are formed between a priori regular intervals to generate solutions for clock and location variables relating to the transmission and receipt of ping events at arbitrary times within the harmonic block intervals. A harmonic block encompasses typically between five and ten ping events. The left-hand side vertical line of $HB_1$ is marked as location solution 1, LS1, where one location solution and one clock solution are generated for each of $CLK_A$ and $CLK_B$. The right-hand side vertical line of $HB_1$ is marked as location solution 2, LS2, where one location solution and one clock solution are generated for each of $CLK_A$ and $CLK_B$. A second clock solution for each of $CLK_A$ and $CLK_B$ is generated at a time chosen a priori midway between LS1 and LS2. Because two clock solutions for each node are computed in $HB_1$, the first and second clock solutions are identified as $CS_1$ and $CS_2$, respectively, for each node.

A first ping event, PE1, and a second ping event, PE2, appear as shown in $HB_1$ and partly in $HB_2$. The transmit time difference between ping events PE1 and PE2 is represented by $(A_{t2}-A_{t1})$, which is the time interval when Δ $CLK_{A/2}$ occurs. FIG. 68 shows that the transmit time interval between $A_{t1}$ and $A_{t2}$ has a transmit midpoint, $T_M$, and harmonic block $HB_1$ spans 15 time units. The clock solution $CS_2$ for node A takes place 3 time units after $T_M$, and the clock solution $CS_1$ for node A takes place 12 time units before $T_M$. Interpolation weighting between successive time solutions provides, therefore, a $-3/15$ weighting for time solution $t_{11}$ and a $-12/15$ weighting for time solution $t_{12}$, where $t_{11}$ and $t_{12}$ are time solution matrix elements in which the left subscript represents the node and the right subscript represents the solution index within the equation. (The minus sign indicates transmit time counts.) The receive time difference between ping events PE1 and PE2 is represented by $(B_{r2}-B_{r1})$, which is the time interval when Δ $CLK_{B12}$ occurs. FIG. 68 shows that the receive time interval between $B_{r1}$ and $B_{r2}$ has a receive midpoint, $R_M$. The clock solution $CS_2$ for node B takes place 7 time units before $R_M$, and the clock solution $CS_3$ for node B takes place 8 time units after $R_M$. Interpolation weighting between successive time solutions provides, therefore, an $8/15$ weighting for time solution $t_{22}$ and a $7/15$ weighting for time solution $t_{23}$. The time weighting is zero for $t_{21}$ because clock solution CS2 lies between $R_M$ and CS1.

The location solution LS1 for each of nodes A and B entails location interpolation weighting between successive location solutions, using the $T_M$ and $R_M$ interpolation benchmarks described for the time interpolation weighting. FIG. 68 shows that, for node A, LS1 lies 6 time units before $T_M$ and LS2 lies 9 time units after $T_M$. Interpolation weighting between successive location solutions provides, therefore, a $-9/15$ weighting for each of location solutions $hx_{11}$, $hy_{11}$, and $hz_{11}$ and a $-6/15$ weighting for each of location solutions $hx_{12}$, $hy_{12}$, and $hz_{12}$. FIG. 68 shows that, for node B, LS1 lies 11 time units before $R_M$ and LS2 lies 4 time units after $R_M$. Interpolation weighting between successive location solutions provides, therefore, a $4/15$ weighting for each of location solutions $hx_{21}$, $hy_{21}$, and $hz_{21}$ and an $11/15$ weighting for each of location solutions $hx_{22}$, $hy_{22}$, and $hz_{22}$.

With reference to equation (14), the following are location coefficient values of LS1:

$$hx_{11} = -9/15\left(\frac{\cos\theta}{c}\right)$$

$$hy_{11} = -9/15\left(\frac{\cos\alpha}{c}\right)$$

$$hz_{11} = -9/15\left(\frac{\cos\varphi}{c}\right)$$

$$hx_{21} = 4/15\left(\frac{\cos\theta}{c}\right)$$

$$hy_{21} = 4/15\left(\frac{\cos\alpha}{c}\right)$$

$$hz_{21} = 4/15\left(\frac{\cos\varphi}{c}\right)$$

and the following are location coefficient values of LS2:

$$hx_{12} = -6/15\left(\frac{\cos\theta}{c}\right)$$

$$hy_{12} = -6/15\left(\frac{\cos\alpha}{c}\right)$$

$$hz_{12} = -6/15\left(\frac{\cos\varphi}{c}\right)$$

$$hx_{22} = 11/15\left(\frac{\cos\theta}{c}\right)$$

$$hy_{22} = 11/15\left(\frac{\cos\alpha}{c}\right)$$

$$hz_{22} = 11/15\left(\frac{\cos\varphi}{c}\right).$$

For the five nodes, location solution 1 and clock solution 1 are arranged as $x_{11}, y_{11}, z_{11}, t_{11}, X_{21}, y_{21}, z_{21}, t_{21}, \ldots, x_{51}, y_{51}, z_{51}, t_{51}$ to form the first 20 entries of the f column vector, and the time solution is arranged as $t_{12}, t_{22}, t_{32}, t_{42}, t_{52}$ to form 5 time entries concatenated to the first 20 entries of the f column vector.

Similarly, for the five nodes, location solution 2 and clock solution 3 are arranged as $x_{12}, y_{12}, z_{12}, t_{13}, x_{22}, y_{22}, z_{22}, t_{23}, \ldots, x_{52}, y_{52}, z_{52}, t_{53}$, and the time solution 4 is arranged as $t_{14}, t_{24}, t_{34}, t_{44}, t_{54}$ to form 25 entries of the f column vector.

The values of $\theta$, $\alpha$, and $\varphi$ are realizable based upon coordinates assigned to nodes A and B in the nominal solution. The remaining location coefficient values of LS1 and LS2 for the remaining solution indices and for successive harmonic blocks are determined in analogous manner.

In this embodiment, the system clock is defined as the average of the node clocks. Skilled persons will appreciate that many other system clock determination techniques are possible. For example, if one of the system nodes operates with an atomic clock, that clock can establish the system clock with extremely small clock drift. Also, in this embodiment, the first four nodes are specified as fixed fiducial nodes. They are placed in fixed and known locations and can provide a reference for the solution of other node(s). Additional equations are added to the system of equations described above to provide this clock and location determination. The equations used in this embodiment to aid in clock determination are:

$$0 = t_{11} + t_{21} + t_{31} + t_{41} + t_{51}$$

$$0 = t_{12} + t_{22} + t_{32} + t_{42} + t_{52}$$

$$0 = t_{13} + t_{23} + t_{33} + t_{43} + t_{53}$$

$$0 = t_{14} + t_{24} + t_{34} + t_{44} + t_{54}.$$

The scalar equations used in this embodiment to aid in location determination are:

$0 = x_{11}$ $0 = y_{11}$ $0 = z_{11}$ $0 = x_{21}$ $0 = y_{21}$ $0 = z_{21}$ $0 = x_{31}$ $0 = y_{31}$ $0 = z_{31}$ $0 = x_{41}$ $0 = y_{41}$ $0 = z_{41}$ $0 = x_{12}$ $0 = y_{12}$ $0 = z_{12}$ $0 = x_{22}$ $0 = y_{22}$ $0 = z_{22}$ $0 = x_{32}$ $0 = y_{32}$ $0 = z_{32}$ $0 = x_{42}$ $0 = y_{42}$ $0 = z_{42}$

Figure 69:
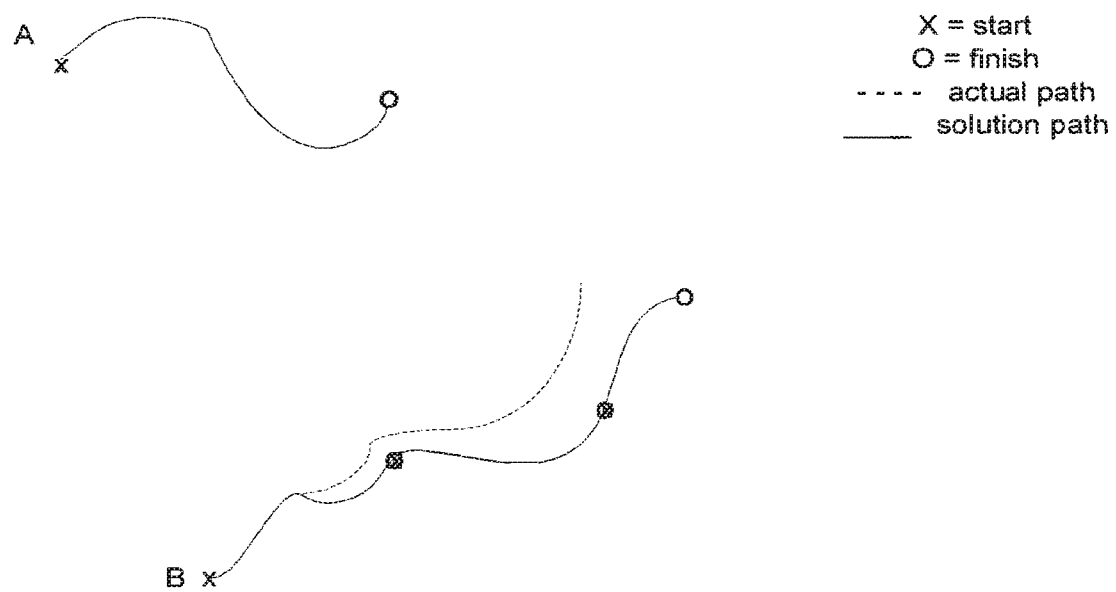
FIG. 69 is a diagram showing an example of a solution path formed by concatenation of three solution path segments of a node and the corresponding actual path traveled by the node.

In the example of solution vector calculation given with reference to FIGS. 63-68, the iterative location and time solutions generated for nodes A and B in harmonic block intervals define solution path segments. Each solution path segment is generated without reference to previous solution path segments; therefore, without correction, solution path segment errors accumulate in the concatenation of successive path segments. FIG. 69 is a diagram showing in solid lines for node B an example of a solution path formed by concatenation of three solution path segments, each having a start location (indicated by "x") and a finish location (indicated by "o"). FIG. 69 also shows in dashed lines the corresponding actual path traveled by node B. The objective of a referenced solution, which in this example is an asymptotic solution, is to form a corrected solution path by positioning the start location of a second (i.e., next succeeding) location solution at the optional location, without regard to the actual finish location of a first (i.e., immediately preceding the second) location solution.

The following analysis presents a derivation of a system equation, in which on one side of the equal sign there is one scalar observable (or already solved) quantity and on the other side of the equal sign there is a linear combination of starting times for, and locations at the start of, the transmitting and receiving nodes. The start is defined as the beginning of a current solution iteration.

The following is a set of definitions of terms:
t(–) is system time at event–
ping_tx=a ping transmit event
ping_rx=a ping receive event
raw_ping_dist=actual (system) distance of ping travel
rx_time(–) is receive node's (noisy) proper clock at event–
tx_time(–) is transmit node's (noisy) proper clock at event–
tx_iter_blk_start=start of transmit iteration block event
rx_iter_blk_start=start of receive iteration block event
The analysis begins with equations (26) and (27):

$$t(\text{ping\_}rx)-t(\text{ping\_}tx)=\text{raw\_ping\_dist}/\text{speed\_of\_light} \quad (26)$$

$$\text{raw\_ping\_time}=rx\_\text{time}(\text{ping\_}rx)-tx\_\text{time}(\text{ping\_}tx). \quad (27)$$

Adding and subtracting equation (26) on the right-hand side of equation (27):

$$\text{raw\_ping\_time}=\text{raw\_ping\_dist}/\text{speed\_of light}-t(\text{ping\_}rx)+t(\text{ping\_}tx)+rx\_\text{time}(\text{ping\_}rx)-tx\_\text{time}(\text{ping\_}tx) \quad (28)$$

$$\text{raw\_ping\_time}=\text{raw\_ping\_dist}/\text{speed\_of light}+[rx\_\text{time}(\text{ping\_}rx)-t(\text{ping\_}rx)]-[tx\_\text{time}(\text{ping\_}tx)-t(\text{ping\_}tx)]. \quad (29)$$

Recasting to terms of start of a solved iteration blk:

$$tx\_\text{start}=t(tx\_iter\_\text{blk\_start})=\text{desired value for asymptotic solution} \quad (30a)$$

$$rx\_\text{start}=t(rx\_iter\_\text{blk\_start})=\text{desired value for asymptotic solution}. \quad (30b)$$

The tx harmonic time solution at ping_tx is:

$$tx\_harmonic\_clk(\text{ping\_}tx)=[tx\_\text{time}(\text{ping\_}tx)-t(\text{ping\_}tx)]-[tx\_\text{time}(tx\_iter\_\text{blk\_start})-t(tx\_iter\_\text{blk\_start})]. \quad (31a)$$

The rx harmonic time solution at ping_rx is:

$$rx\_harmonic\_clk(\text{ping\_}rx)=[rx\_\text{time}(\text{ping\_}rx)-t(\text{ping\_}rx)]-[rx\_\text{time}(rx\_iter\_\text{blk\_start})-t(rx\_iter\_\text{blk\_start})]. \quad (31b)$$

Adding equation (31a) and −1* equation (31b) to equation (29):

$$\text{raw\_ping\_time}+tx\_harmonic\_clk(\text{ping\_}tx)-rx\_harmonic\_clk(\text{ping\_}rx)=\text{raw\_ping\_dist}/\text{speed\_of light}-[tx\_\text{time}(tx\_iter\_\text{blk\_start})-t(tx\_iter\_\text{blk\_start})]+[rx\_\text{time}(rx\_iter\_\text{blk\_start})-t(rx\_iter\_\text{blk\_start})]. \quad (32)$$

Placing the ping distance back in terms of start of solved iteration blk;

$$\text{nominal\_dist}=\|\text{nominal\_}tx(tx\_iter\_\text{blk\_start})-\text{nominal\_}rx(rx\_iter\_\text{blk\_start})\| \quad (33)$$

$$\text{raw\_ping\_dist}=\text{nominal\_dist}-tx\_\text{delta\_start}*\text{dir\_cos}(tx\_rx)+rx\_\text{delta\_start}*\text{dir\_cos}(tx\_rx)-[tx\_harmonic\_loc(\text{ping\_}tx)*\text{dir\_cos}(tx\_rx)+rx\_harmonic\_loc(\text{ping\_}rx)*\text{dir\_cos}(tx\_rx)]. \quad (34)$$

Figure 70:
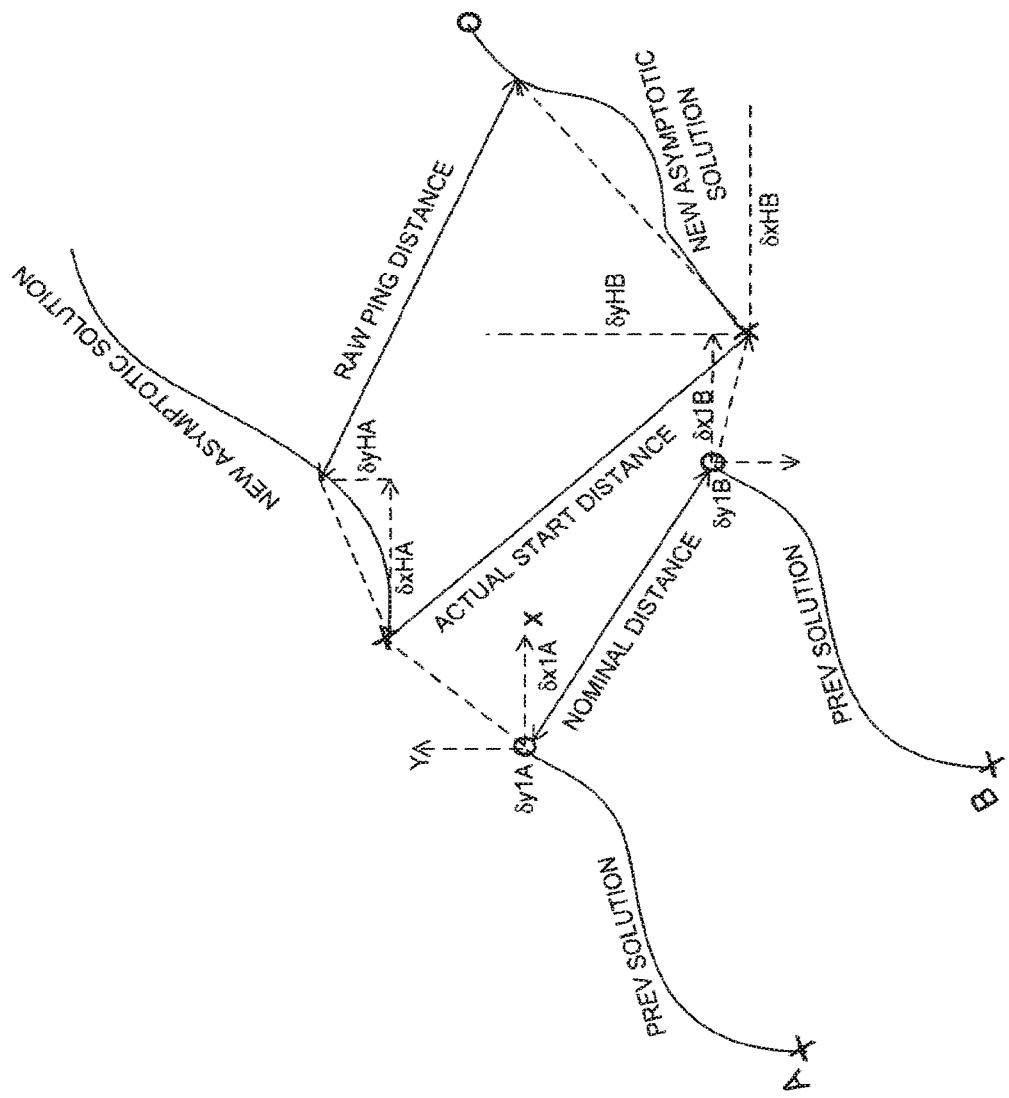
FIG. 70 is a diagram showing an example in x, y coordinate space the repositioning of new asymptotic solutions to finish locations of previous solutions for two nodes.

In equation (34), the terms "tx_delta_start" and "tr_delta_start" refer to the quantities δx, δy, and δz for node A (transmit node) and node B (receive node) shown in FIG. 70, referenced below. The term "dir_cos(tx_rx)" refers to the ping event vector components in x, y, z coordinate space, as discussed above with reference to FIG. 66. Substituting equation (34) into equation (32), and placing observables and pre-existing solutions on left-hand side:

$$\text{raw\_ping\_time}+tx\_harmonic\_clk(\text{ping\_}tx)-rx\_harmonic\_clk(\text{ping\_}rx)+[tx\_\text{time}(tx\_iter\_\text{blk\_start})-rx\_\text{time}(rx\_iter\_\text{blk\_start})]+[tx\_harmonic\_loc(\text{ping\_}tx)*\text{dir\_cos}(txc\_rx)-rx\_harmonic\_loc(\text{ping\_}rx)*\text{dir\_cos}(tx\_rx)-\text{nominal\_dist}]/\text{speed\_of light}=t(tx\_iter\_\text{blk\_start})-t(rx\_iter\_\text{blk\_start})+[rx\_\text{delta\_start}*\text{dir\_cos}(tx\_rx)-tx\_\text{delta\_start}*\text{dir\_cos}(rx\_tx)]/\text{speed\_of light}. \quad (35)$$

Solving now for delta time, rather than absolute time:

$$t(tx\_iter\_\text{blk\_start})=tx\_\text{time}(tx\_iter\_\text{blk\_start})+tx\_\text{delta\_start\_clk}$$

$$t(rx\_iter\_\text{blk\_start})=rx\_\text{time}(rx\_iter\_\text{blk\_start})+rx\_\text{delta\_start\_clk}. \quad (36)$$

The time-related terms "tx_delta_start_clk" and "rx_delta_start_clk" are the unknown quantities for which solutions are generated.

The following matrix equation corresponds to equation (18).

$$\begin{bmatrix} \text{Ping1} \\ \text{Ping2} \\ \text{Ping3} \\ \text{Ping4} \\ \text{Ping5} \\ \vdots \end{bmatrix} = [A] \begin{bmatrix} \delta_{x1} \\ \delta_{y1} \\ \delta_{z1} \\ \delta_{t1} \\ \delta_{x2} \\ \vdots \end{bmatrix}$$

The left-hand side is a column vector of ping events, the right-side is a product of a column vector of the delta location (x, y, z) and delta time solution variables and a two-dimensional "A" matrix of coefficients already known. For each node, the solutions for δx, δy, and δz are start position offsets and the solution for δt is a start time offset from, respectively, the finish location and the finish time of the previous solution interval. FIG. 70 is a diagram showing an example in x, y coordinate space, as a result of the solutions generated from equation (37), the repositioning of new asymptotic solutions to the finish locations of the previous solutions for node A and node B.

$$\text{raw\_ping\_time}+tx\_harmonic\_clk(\text{ping\_}tx)-rx\_harmonic\_clk(\text{ping\_}rx)+[tx\_harmonic\_loc(\text{ping\_}tx)*\text{dir\_cos}(tx\_rx)-rx\_harmonic\_loc(\text{ping\_}rx)*\text{dir\_cos}(tx\_rx)-\text{nominal\_dist}]/\text{speed\_of light}=tx\_\text{delta\_start\_clk}-rx\_\text{delta\_start\_clk}+[rx\_\text{delta\_start}*\text{dir\_cos}(tx\_rx)-tx\_\text{delta\_start}*\text{dir\_cos}(rx\_tx)]/\text{speed\_of light}. \quad (37)$$

Equation (37) above is the equation sought, and the objective is to find a value for the left-hand side. The coefficients on the right are already known.

In this embodiment, equations are added to the system of equations described above. The following equation is added to provide clock correction solutions:

$$0=\delta_{t1}+\delta_{t2}+\delta_{t3}+\delta_{t4}+\delta_{t5}.$$

The following equations present the unknowns $\delta_{x1}$, $\delta b_{y1}$, and $\delta_{z1}$ that represent the start position for the location solution of node 1.

$$\text{Node}_1(x)=\delta_{x1}$$

$$\text{Node}_1(y)=\delta_{y1}$$

$$\text{Node}_1(z)=\delta_{z1}.$$

There are similar equations added for the other four nodes of the network.

It will be obvious to those having skill in the art that many changes may be made to the details of the above-described embodiments without departing from the underlying principles of the invention. The scope of the present invention should, therefore, be determined only by the following claims.

The invention claimed is:

1. A space-time calibration method of determining position and timing information relating to one or more nodes of multiple nodes occupying locations in a spatial region and communicating with one another, comprising:
    establishing wireless communication among multiple nodes in a spatial region, including transmitting nodes and receiving nodes, the transmitting nodes transmitting ping events with transmit count stamps and the receiving nodes receiving and associating receive count stamps to the transmitted ping events, the transmit and receive count stamps based on independent clocks operating in the transmitting and receiving nodes and characterized by clock rate differences;
    developing pung signals representing a record of the ping events during a data recording time interval, the record including the transmit and receive count stamps corresponding to the ping events between transmitting nodes and receiving nodes that are recorded during the data recording time interval; and
    processing the pung signals to determine, for a moving node of the multiple nodes, location information corresponding to a location occupied by the moving node in the spatial region, the location information being derived from the transmit and receive count stamps recorded in the data recording time interval from independent clocks in the transmitting nodes and the receiving nodes.

2. The method of claim 1, further comprising associating with transmit count stamps the ping events transmitted by the transmitting nodes, the transmit count stamps based on independent clocks operating in the transmitting nodes and characterized by clock rate differences, and in which the transmitted ping events received by the receiving nodes include transmit count-stamped ping events.

3. The method of claim 1, in which the multiple nodes include a set of transmit nodes, and in which the processing of the pung signals determines from the location information a spatial distribution of member nodes of the set of transmit nodes in the spatial region.

4. The method of claim 1, in which the multiple nodes include a set of receive nodes, and in which the processing of the pung signals determines from the location information a spatial distribution of member nodes of the set of receive nodes in the spatial region.

5. The method of claim 1, in which the multiple nodes include a set of duplex nodes, and in which the processing of the pung signals determines from the location information a spatial distribution of member nodes of the set of duplex nodes in the spatial region.

6. The method of claim 1, in which the record of the ping events includes differential count stamp values corresponding to differences between the receive count stamps and the associated transmit count stamps.

7. The method of claim 1, comprising associating the transmit count stamps to ping events by applying the transmit count stamps to the ping events transmitted.

8. The method of claim 1, comprising associating the receive count stamps to ping events by applying the receive count stamps to the ping events received.

9. The method of claim 1, further comprising deriving a system clock from the clock rate differences of the multiple nodes.

10. The method of claim 1, in which the moving node changes location with time to describe a path of motion characterized by concatenated path segments having start and finish locations, and the processing of pung signals further comprises determining from a previous one of the path segments a corrected start location of and a corrected clock for a current one of the path segments to reduce cumulative error in the determination of the location occupied by the moving node and a clock rate difference of the clock operating in the moving node relative to an independent clock in another node.

11. The method of claim 10, in which the processing of the pung signals generates a referenced solution for the corrected start location and corrected clock.

12. A device, comprising:
    an input configured to receive count-stamped information signals propagating through a medium from multiple nodes occupying a spatial region, the multiple nodes including transmitting and receiving nodes operating with independent clocks characterized by clock rate differences, and the count-stamped information signals carrying information relating to transmit and receive events of the transmitting and receiving nodes; and
    a processor configured to record ping events during a data recording time interval, the record including transmit and receive count stamps corresponding to the ping events between transmitting nodes and receiving nodes during the data recording time interval, and determining from the transmit and receive count stamps of the data recording time interval, for a moving node of the multiple nodes, location information corresponding to a location occupied by the moving node in the spatial region, the transmit and receive count stamps being captured from independent clocks in the transmitting and receiving nodes, and the independent clocks having a clock rate difference.

13. The device of claim 12, in which at least one of the count-stamped information signals propagating from the multiple nodes is generated remotely from the moving node.

14. The device of claim 12, in which at least one of the count-stamped information signals propagating from the multiple nodes is generated within the moving node.

15. The device of claim 12, in which the moving node changes location with time to describe a path of motion characterized by concatenated path segments having start and finish locations, and in which the processor determines from a previous one of the path segments a corrected start location of and a corrected clock for a current one of the path segments to reduce cumulative error in the determination of the location occupied by the moving node and clock rate difference of the clock operating in the moving node.

16. The device of claim 15, in which the processor generates a referenced solution for the corrected start location and corrected clock.

17. The device of claim 12, in which the input and the processor are implemented at a remote location from the locations of the multiple nodes.

18. The device of claim 12, further comprising multiple ones of the input and multiple ones of the processor recited in claim 12, and in which each of at least some of the multiple nodes is implemented with one of the inputs and one of the processors.

19. The device of claim 12, in which the processor determines the location information and clock rate differences by generating, over solution intervals, solutions indicating changes in location occupied by the moving node and changes in clock rate characterizing the clock operating in the moving node.

* * * * *